United States Patent
Op Den Camp et al.

(10) Patent No.: US 12,460,224 B2
(45) Date of Patent: Nov. 4, 2025

(54) MODIFIED PROMOTER OF A PARTHENOGENESIS GENE

(71) Applicant: Keygene N.V., Wageningen (NL)

(72) Inventors: Rik Hubertus Martinus Op Den Camp, Wageningen (NL); Peter Johannes Van Dijk, Wageningen (NL)

(73) Assignee: Keygene N.V., Wageningen (NL)

( * ) Notice: Subject to any disclaimer, the term of this patent is extended or adjusted under 35 U.S.C. 154(b) by 0 days.

(21) Appl. No.: 18/133,392

(22) Filed: Apr. 11, 2023

(65) Prior Publication Data

US 2023/0383308 A1     Nov. 30, 2023

Related U.S. Application Data

(63) Continuation of application No. PCT/EP2021/078281, filed on Oct. 13, 2021.

(30) Foreign Application Priority Data

Oct. 13, 2020 (EP) ............................. 20201578

(51) Int. Cl.
*C12N 15/82* (2006.01)
*A01H 1/02* (2006.01)

(52) U.S. Cl.
CPC ......... *C12N 15/8287* (2013.01); *A01H 1/022* (2021.01)

(58) Field of Classification Search
None
See application file for complete search history.

(56) References Cited

FOREIGN PATENT DOCUMENTS

| WO | WO-2007/066214 A2 | 6/2007 |
|---|---|---|
| WO | WO-2020/239984 A1 | 12/2020 |

OTHER PUBLICATIONS

Underwood, C. J., Vijverberg, K., Rigola, D., Okamoto, S., Oplaat, C., Camp, R. H. O. D., . . . & Van Dijk, P. J. (2022). A Parthenogenesis allele from apomictic dandelion can induce egg cell division without fertilization in lettuce. Nature Genetics, 54(1), 84-93. (Year: 2022).*
Conner, J. A., Mookkan, M., Huo, H., Chae, K., & Ozias-Akins, P. (2015). A parthenogenesis gene of apomict origin elicits embryo formation from unfertilized eggs in a sexual plant. Proceedings of the National Academy of Sciences, 112(36), 11205-11210. (Year: 2015).*
Marand, A. P., Zhang, T., Zhu, B., & Jiang, J. (2017). Towards genome-wide prediction and characterization of enhancers in plants. Biochimica et Biophysica Acta (BBA)—Gene Regulatory Mechanisms, 1860(1), 131-139. (Year: 2017).*
International Search Report and Written Opinion issued in PCT Application No. PCT/EP2021/078281 dated Feb. 8, 2022 (14 pages).
Van Dijk Peter J. et al (2020) "Genetic Dissection of Apomixis in Dandelions Identifies a Dominant Parthenogenesis Locus and Highlights the Complexity of Autonomous Endosperm Formation", Genes, vol. 11, No. 9, Aug. 20, 2020, 19 pages.
Van Dijk Peter J. et al (2016) "Plant Breeding: Surprisingly, Less Sex is Better", Current Biology, Current Science, GB, vol. 26, No. 3, Feb. 8, 2016, pp. R122-R124.
Van Moerkercke, Alex et al (2011) "The transcription factor Emission of Benzenoids II activates the MYB ODORANT1 promoter at a MYB binding site specific for fragrant petunias", The Plant Journal, vol. 67, No. 5, Jul. 1, 2011, pp. 917-928.

* cited by examiner

*Primary Examiner* — Charles Logsdon
*Assistant Examiner* — Jessica Nicole Stockdale
(74) *Attorney, Agent, or Firm* — Sunit Talapatra; Foley & Lardner LLP

(57) ABSTRACT

The invention provides a method to produce a mutant gene, wherein said gen comprises a modified promoter and wherein said gene is capable of inducing the parthenogenesis phenotype to a plant. The invention further provides said mutant gene, isolated nucleic acid molecule, construct or vector comprising the same. Also, the invention provides for a method to produce a parthenogenetic plant comprising the mutant gene, and the parthenogenetic plant thus obtained.

20 Claims, 3 Drawing Sheets

Specification includes a Sequence Listing.

Fig. 1A

| Construct | Transformed plant | Complementing lines (n/total) |
|---|---|---|
| ToPARpromoter \| LsPAR | | 4/8 |
| AtEC1promoter \| ToPAR | CRISPR *LoP* mutant | 5/9 |

Fig. 1B

| Construct | Transformed plant | Lines with parthenogenesis (n/total) |
|---|---|---|
| AtEC1promoter \| ToPAR | Sexual *Lactuca sativa* | 7/7 |

Fig. 1C   Fig. 1D   Fig. 1E
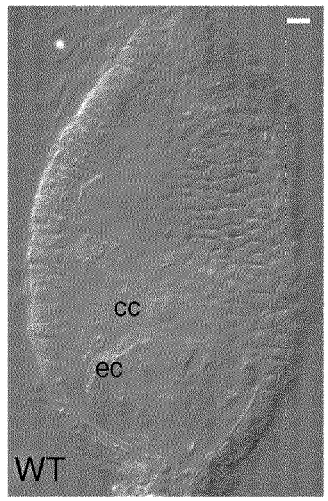  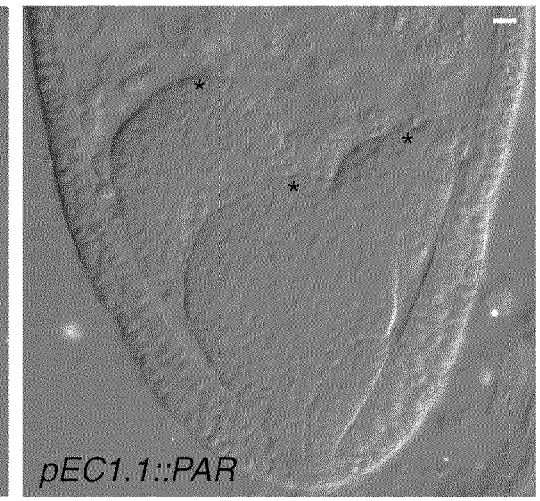
Fig. 1G   Fig. 1F
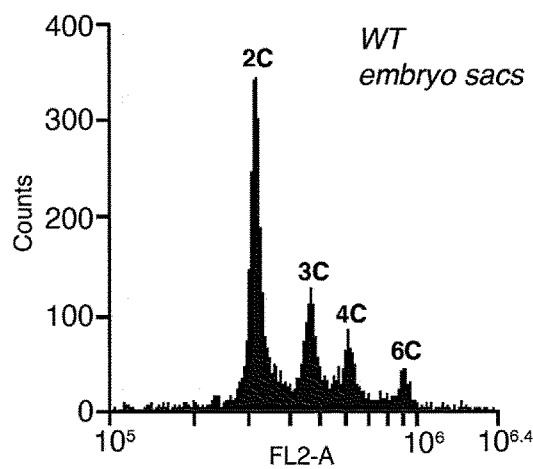 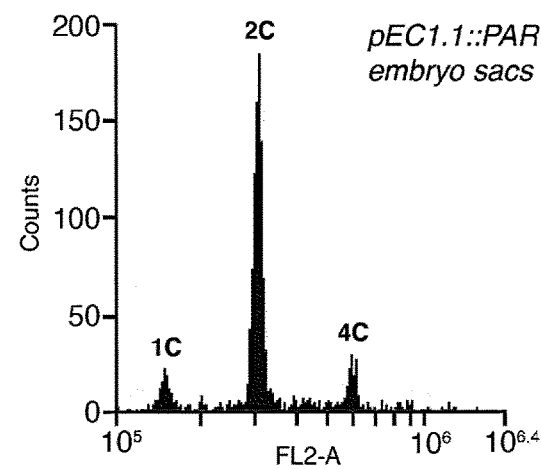

Fig. 2

| | | |
|---|---|---|
| ToPAR-prom-MITE | TAATTAATATGTG<u>C</u>ATGTTTAAATTTAGAATATCCTGAATTTATATTTAGTGCGCAACCC | |
| Topar-1prom | TAATTAATATGTGTATGTTTAAATTTAGAATATCCTGAACTTATATTTAGTTCGCAACCC | |
| Topar-2prom | TAATTAATATGTGTATGTTTAAATTTAGAATATCCTGAACTTATATTTAGTTCGCAACCC | |
| Tkpar-prom | TAAATAATAATGTGTATGTTTAAATTTAGAATATCCTGAATTTATATTTAGTGCGCAACCC | |
| | | |
| ToPAR-prom-MITE | TATGTAAGATCGAACTAATTTTAAACCGTAACCAGACATGCATGTTTGATCAGTAATAAA | |
| Topar-1prom | TATGTAAGATCGAACTAATTTTAAACCGTAACCAGACGTGCATGTTTGATCAGTAATAAA | |
| Topar-2prom | TATGTAAGATCGAACTAATTTTAAACCGTAACCAGACATGCATGTTTGATCAGTAATAAA | |
| Tkpar-prom | TATGTAAGATCGAACTAATTTTAAACCGTAACCAGACATGCATGTTTGATCAGTAATAAA | |
| | | |
| ToPAR-prom-MITE | AAGGCTATTATCGTCGAAAATATTAAACAAAATATAATATCTTATTTGGCGCCATTTCA | |
| Topar-1prom | AAGGCTATCATCGTCGAAAATATTAAACAAAATATAATATCTTATTTGGCGCCATTTCA | |
| Topar-2prom | AAGGCTATCATCGTCGAAAATATTAAACAAAATATAATATTTCTTATTTGGCGCCATTTCA | |
| Tkpar-prom | AAGGCTATTATCGTCGAAAATATCGAAAATATTAAACAAAATATAATATCTTATTCGGCGCCATTTCA | |
| | | |
| ToPAR-prom-MITE | TGTCAACGGTTG<u>A</u>AAAGCAAGTTACCAACCGATCATTTCTCCGGTA<u>A</u>C<u>A</u>ACC | |
| Topar-1prom | TGTCAACGGTTAAAAGCAAGTTATCAACGCCTCCAACCGATCATTTCTCCGGTAACCACC | |
| Topar-2prom | TGTCAACGGTTAAAAGCAAGTTATCAACGCCTCCAACCGATCATTTCTCCGGTAACCACC | |
| Tkpar-prom | TGTCAACGGTTAAAAGCAAGTTACCAACGCCCTCCAACCGATCATTTCTCCGGTAACCACC | |
| | | |
| ToPAR-prom-MITE | AACTGCTACTAATAACCGCCACCGCCAAAAACCTATAAATACAACTTCCATCACAATTCTG | |
| Topar-1prom | AACTGCTACTAATAACCGCCACCGCCAAAAACCTATATATACAACTTCCATCACAATTCTG | |
| Topar-2prom | AACTGCTACTAATAACCGCCACCGCCAAAAACCTATATATACAACTTCCATCACAATTCTG | |
| Tkpar-prom | AACTGCTACTAATAACCGCCACCGCCAAAAACCTATAAATACAACTTCCATCACAATTCTG | |
| | | |
| ToPAR-prom-MITE | TCCCCTACTCCCATTTCAATCCAAAAAAAGGCTACACAGACATATACAGCGATG | SEQ ID NO: 66 |
| Topar-1prom | TCCCCTACTCCCATTTCAATCCAAAAAA-GGCTACACAGACATATACAGCGATG | SEQ ID NO: 67 |
| Topar-2prom | TCCCCTACTCCCATTTCAATCCAAAAAA-GGCTACACAGACATATACAGCGATG | SEQ ID NO: 68 |
| Tkpar-prom | TCCCCTACTCCCATTTCAATCCAAAAAAAGGCTACACAGACATATACAGCGATG | SEQ ID NO: 69 |

SEQUENCE LISTING

```
Sequence total quantity: 69
SEQ ID NO: 1              moltype = AA   length = 170
FEATURE                   Location/Qualifiers
source                    1..170
                          mol_type = protein
                          organism = Taraxacum officinale
SEQUENCE: 1
MADNGNTGRQ KDDDGGHDGP RQNPTTPPSP SRTPRRPRRN TSPPKHSPGA SSSTMPAPPT    60
PPAPTGITGA SSSSVGTNII SFIPPKTKRT KSVICPICNK DMCHEKALCG HIRWHTQEER   120
LAASIAIARA LSSNVVVSGN GDEDEGPSKK YKLPDLNKSP PPEEEDEDAA              170

SEQ ID NO: 2              moltype = DNA   length = 1900
FEATURE                   Location/Qualifiers
source                    1..1900
                          mol_type = unassigned DNA
                          organism = Taraxacum officinale
SEQUENCE: 2
taaggccata acaaggttat ttgaacattc gcctaaaccc taaaccaact atatctattc     60
ggatttgtta cgagttttag agtttctaga aaatcagtta tatatcgatt aggcttggtt    120
ctaggttata agaaaaaatg attctctatc ccggtatgaca tagagacaaa ccggtctact   180
tttataagaa aatcatattt gaaacaatgt ctagttaata attaattaat atgtgcatgt    240
ttaaatttag aatatcctga atttatattt agtgcgcaac cctatgtaag atcgaactaa    300
ttttaaaccg taaccagaca tgcatgtttg atcagtaata aaaaggctat tatcgtcgaa    360
aatattaaaa caaaatataa tatcttattt ggcgccaatc catgtcaacg gttgaaagca    420
agttaccaac gcctccaacc gatcatttct ccggtaacaa ccaactgcta ccagggccgg    480
ccagaaggct gtgcggcttg ggctgtggca caggggcagc agatttagtc catttattat    540
ggtctgctat ttatttgggt ccaataagat cagggcacta aaactcaaat acatcaattc    600
aagtcggcgg caaaagaata aaaagcgcca atttttagaa gacaaggaga cagcacaata    660
atcatgcttt tccaatggcc aattaatttt agcctttgtg aggtataaat atgaatcact    720
ttttctccaa atatcattat tgtaaactag taaagagcgt aaattgtttt atcgctaatc    780
ttcttctttt tcaaatataa ttgtttgatt ctttgtagta ggtacgttaa gttttatatc    840
attcgtcctg gaaaccttt cttatgcccc ttcaatttat gaatttgtgt tttgtattgt     900
cttgctatta atccaatgca aactaattct gccgcatcga tctcacagag ttggagcagc    960
ttaaaaggag ttttggggca acttaaaatg agggtagctt ttttgttgtt gttggtctac   1020
tatttacttt ggtccttatc gttttagttt tgtgttcatt gaggatttga atgactttga   1080
acacaagttt ataaaactaa gttttgtga ttctaaattt ttgatgtgtg caaccgacta    1140
aatgaatata aaattctgat ttgtgtattt ctgatttctg atttaccggt tattcattat   1200
gttttctgg atctcatatg aatttagtat ataaaatct caggttcttc ttactcagtc     1260
tagtatattt tggcattggg gatcagggtt aaaatcatca tttttctaag cactaacaag   1320
ctttaaaacc atcaattaaa agttagttct ccatacctgg aattgtttat tgctttagta   1380
ttcatttcat agtgtcaata ccttacaact gtttattgtt ttcaaatgtt tactgttttg   1440
cactttagtt gttttagca tgtttcaact ttcaaagtta attgacgata gtgtcatata    1500
cgaaatatca tcactcatac aaaattaaac tggatagaat ttttccgat gaaatctatt    1560
tttaaatagt tacgaatata ataggagact taatatgttt gtttcaaaat tacacaaaaa   1620
caccatggaa atgggcatta gtttgtataa gcatccttt aaatataaag ctttgttaca    1680
ttgatgcctt ctaaatatat aatattgtaa tgatttgtag taaacaccat ggaaatgggc   1740
attattaaga tgtttcgccc agggcatgaa aaactatcgg accggccctg actgctacta   1800
ataaccgcca ccgcaaaaac ctataaatac aacttccatc acaattctgt cccctactcc   1860
catttcaatc caaaaaagg ctacacagac atatacagcg                          1900

SEQ ID NO: 3              moltype = DNA   length = 513
FEATURE                   Location/Qualifiers
source                    1..513
                          mol_type = unassigned DNA
                          organism = Taraxacum officinale
SEQUENCE: 3
atggcagata atggcaacac cggccgtcaa aaggatgacg acggtggcca tgatggacca     60
cgccaaaacc caactactcc accctcccct tcccgcaccc ctcgaagacc aaggcggaac    120
acatcaccgc ccaaacattc tccggggcg tcttcaagca ccatgccagc gccgcctact    180
cccctgcgc cgacgggaat caccggtgct tctagttctt ctgtgggtac taatataatt    240
tcatttattc cacccaaaac caaagaacg aagtcggtga tctgcccgat ctgcaacaaa    300
gatatgtgcc atgagaaggc gctgtgtggc cacatccggt ggcatacaca ggaggaaaga    360
ttggcggcca gcatcgctat agcaagagcg ctatcttcta acgttgttgt ttctggcaat    420
ggcgatgaag atgaaggtcc atctaaaaag tataaactcc cggacctgaa caaatctcca    480
ccgccggagg aggaggacga ggacgctgcc tga                                513

SEQ ID NO: 4              moltype = DNA   length = 5356
FEATURE                   Location/Qualifiers
```

| source | 1..5356 |
| --- | --- |
| | mol_type = unassigned DNA |
| | organism = Taraxacum officinale |

SEQUENCE: 4

```
ttttcttgcg ggagaggcat gcatgtatgt gtggcctttt tgcaataata ctatgcatgg    60
gagatgcata aagtttatct ttattttttt tagtttaata atgtgtggca aactttatat   120
catttatgat ttcggccatg tactgctaca tcgttctagg atggttattc cctagaattt   180
gctttatgta tttgttttct ttgttaattc ttctcttcct taaacgttat ttcatgtgaa   240
ttgcgatgtc atgatattgc aggaatgtaa cttagaactc aacgataaaa agtgtgttga   300
gatcgtggaa gttgatcatt tatcttgaat tcataagata agcaacatga gataggataa   360
ttaattactg tggggatttc tttttatatt catattattc gttgtaatgc aaattttaa    420
gtagaataac gaatgtgtct tattatttac ggttaaatgc aaaagatcat taacatatct   480
ccattgattt gtttactgat gtattctcat gtgttctgtt gctaaattct attttgaaaa   540
gtatattcaa ttaaagcaat gcattttaga tataaagcaa ctccataact tataattgtg   600
tagattttta ccaattcaat gtcttaaaag aaaaataaaa attgaaagtt taattaattg   660
ccatagtgat cccgttcccg tcaattatgt gatcaatttt taccagagca aaaccccaca   720
tttcttgtag tgaacaatct gtggatgata accgatcgaa gacttttgtg gggatttcac   780
taaccaacta tttggctctc attaattact attagttata taaggccatc ccaagtattt   840
tggcaatatt caaaacgagt aaactataaa attcactttt tggttcttgt atttctaact   900
tttagaatta tgtatttggt tcttatagtt ttttatttgt atgaattaca ttacttttgg   960
tccacaatat tttttatttt ctataattcc attttagtc attgtagttt taatttgcaa   1020
taaaaaatta atttatattt ttaatccata tatatagttg gcaatattct atattttagg   1080
ttcagattgt atcttttata aaaagagtc ttaaaagact aaaccttttg gatccttata   1140
gttttcacaa tcacttgtga ttttttaat gaacatatca tatttcttaa attacatcag   1200
taatctacgt ataacattta ataatttt atttaatcag aaatatagga ttcgtataat   1260
aacttgctg aacttaggct tcattttaa caaaggataa tgcatcatgc atgacataaa   1320
aatttgtaat atttctaatg tgcatgcact acaagaacct gacccttcat atacattaat   1380
gaatgattct cttttcttat ttaatcttag caagcggttt ggataattgt ctgcacaata   1440
ttaagaattg cactagctag ctaggggagt ccatgacgta ataagcaaat taactagagg   1500
acttgtagga ggcttgatca cttcattgta tatctaatgg cactatcgat atatgattgg   1560
cttgtgtgta tctatggaat ttaacactat taaaaaatat atctttaatg acaatcaaca   1620
acacacagta atttatgact tacaaaatca tgtgtgatta aaaaaaatgt catgtttttt   1680
aaaattatag aggatttacg acttacataa ttatgtgtca taattatatg tcatcttgtg   1740
taatatttat gacttacaaa aatgtatgtc atgttttatc atcataaaat ctaaaaaaaa   1800
aaatagaaac acgaggatac tttcagtgta tgttatctgt aaaaaaaaat aaaaactcgg   1860
aggacactaa aagtgtagaa acttgacagc ataaacgaat ttatttaccct tcatcaaaac   1920
ttatttact tcaatctctg aaccagctcc cttcattaat ctcttcgaga tgtaggttga   1980
ttttaatgct aaatgaactt tcaaatgta taaataaaac ttttctgtgc cagatttgac   2040
attgatggag atgaagatac acaagtgaat tcacctttca atgatcatac tgacatacca   2100
agtactccta tcccctctcc acctccacaa aacgaacctc aatttcaaaa acgtaactat   2160
catttaaata tttaatcatt tttcaattgg attcatgcgg taatagaagt tactggactt   2220
taaactttt gtagctgatg agattcatga gcaacagtcc atggacattt tccaaatcaa   2280
caagtttctg atgaggacaa cgtaaaaaaa gtttttcaat tattaaacat atgatttttgg   2340
tttttaaaag ataattaatt atggaaaatc ttcagaaaag tctcaatact ttgggtttat   2400
taatgaaaaa gtctcaaaaa aaaatttgaa taaaaagtc cataaaattg gataaattat   2460
tcgatttagc ccaatttgcc aagtaaatct ggtaaaatta ggctaaatcg aataatttag   2520
ccagtttggt gggccttttt gcgcaaaaac attatttttgg gacttaatcg ttaatttcc   2580
ccaaattca gtttattac agtcttggag taaaaccgaa cctagtgcgc taatttttggc   2640
ttttggtgtt tggaattatt tgggtttatt gggctcggtt tctgaacgag tttgattttt   2700
ggtttcttga ttcaattttt tggttttggg gttgaaccca tggattttcg atttggttttc   2760
ggcttttgata atatttttgt gcaatcgttc aaaatatccg agttagattg ggtttaaatg   2820
ttatcaaaac cgaaaccgag ggtagaaccc caaaactgaa cccaatcgaa aatccataggg   2880
ttgaacccca gaaccgaacc caataaactc taaaaaccaa aagccaaaat taaccgataa   2940
aaaacttaaa atacatgttt gttaaatcta gtaaggtgtt tttgcacactt tatgtaaatt   3000
atagaaaaaa atggattaac tgtttgctta ttaagataaa aacgacgtaa aaatagaatt   3060
ggattagaaa tgaaccattt ttttacatcg tttactttat ttactaggtt ataaccccgtg   3120
tattacacgg gttgacgata aaaaattgta taaaaaaaaca acatataatg gtaagttgtt   3180
aatcgtacat gggttgcttc aattttaatt taaaaattgt aattccaaat gaatatatg   3240
taggatgata taacatactt gtaaatgtaa atgagagttt gttggcattt tcatacattta   3300
gcccatcaaa tcaaacgcaa aaaatctttt taatcctata atacatgtgg cacaaatata   3360
cgattagcat ttcgctgaga gagaggcttt aagtgaggat gtgaaaagaa aggaacatag   3420
caacttggaa tttaaagatc aaaaaaccctt gaaaggcttt tggaatgtaa aaatatagaa   3480
atgaataaat gtggcttctt gtatgtatca agagtaggac ctgtattaga aactaaaaaa   3540
atttgtgtct aataaaaatc aacaaaaaca gaacgtaaac gaaagagtt attggtaaaa   3600
aaagatttca aaaatagttt ttttttgaac cggttcaaaa atagttattt tacttattta   3660
tccatttaat ccaaacttttt ttttgtcaaa tatctcatgg aattagttgg ctgcgtcact   3720
cttgtcactg ggcgttataa cttttgcctt gtggtttgca acaccacctt aaataacata   3780
gacaaataac attaaatatc atgataatac ataataactc acaaaagatg cattctatag   3840
aacggtataa ttgattagaa caaaatatc taaatagttt atgaggatta ccttgataat   3900
tcccttggag tgaatactat ccacgatgtc atcttccaaa ggtattcaat ggctttttatt   3960
agaacccaat ttcagaatta cattgatgcc acagttacat tcactaaata tcttcctctt   4020
aggctttag tttgactata ttttaaccat tttcacatca cactttaacc accccctttg   4080
gttattaatg tcaaaggaa caaaactcac aaatcaaatg cgtggtgttt atactattgg   4140
tacaatgttt ataaatttct taaaatgag caaaacttaa acaaatgtca   4200
atggtcacca tgtggtatta atattataaa gttctaaaaa taccattcca ccccaacatg   4260
gtactaacca gttagaaaat caagaaacag aaacatactc tttaatctaa aacaatataa   4320
tatgggatg tgttatgagt ttagtttcat ctaaccatga attcatatag gattgtacgt   4380
ttctcctcga aattgcaaag aatttttgttc gactaagcaa tctacatatt aatggatttg   4440
tatggtttct cggtttgtag gtaagttaag agctaccagg aaagagaaaa tttgcaccat   4500
```

```
aggtactaaa cacattctac aatggtggct ttaacgtgag agagaataga gaggtcgaaa  4560
catatttccg ttaaataagc aaacataagt ttctatttgg gatcaataag tttcttccta  4620
tagtggtaaa tggatctgta cttgttaagc tcttaaacat atttgttgtc actgttcact  4680
tcctattttg cagtgctctt ctattactta cattcttctt atgacattct tttaataagg  4740
aaaaataacc acttattcta gtattctatt gttttgttag agtcaatatc agataagaac  4800
ctaaaaaggt gggacaaatt gataacttaa tcaatatatc aaactgtcat atgtctcaag  4860
tctcaaccca aattgatatg tttaagaaaa attcagaaaa gatatgtcca tgggacatgt  4920
gcatgtatat gtataagtgt acattcctaa aaaagtagg  ctcatatgac atgagcatgt  4980
atgtgcttat tgttataaag attacaaatt ttcttaaaaa tgaacacaat ttcaaaatac  5040
ctataccaaa gcccatgatc aacatagcat ctgatattaa tattataaag ctctaaacaa  5100
atctaccccg acatcaagtg gtacttacaa gttggaaaat caagatacaa aaacatagct  5160
tttaatctaa gtaaaaacac aataaatatag ggatatgacc tatatgcatg tttaaaatct  5220
taagtctgta aagattgata ggattggaaa actcttctat tcaacacaag aaaagaatta  5280
cagtaggagg agggactctc acactcaact actacaaaaa aaccaaccct cacttactaa  5340
cactctcaca ctagtg                                                  5356

SEQ ID NO: 5          moltype = DNA  length = 7769
FEATURE               Location/Qualifiers
source                1..7769
                      mol_type = unassigned DNA
                      organism = Taraxacum officinale
SEQUENCE: 5
taaggccata acaaggttat ttgaacattc gcctaaaccc taaaccaact atatctattc    60
ggatttgtta cgagttttag agtttctaga aaatcagtta tatatcgatt aggcttggtt   120
ctaggttata agaaaaaatg attctctatc cggtatgaca tagagacaaa ccggtctact   180
tttataagaa aatcatattt gaaacaatgt ctagttaata attaattaat atgtgcatgt   240
ttaaatttag aatatcctga atttatattt agtgcgcaac cctatgtaag atcgaactaa   300
ttttaaaccg taaccagaca tgcatgtttg atcagtaata aaaaggctat tatcgtcgaa   360
aatattaaaa caaaatataa tatcttattt ggcgccattt catgtcaacg gttgaaagca   420
agttaccaac gcctccaacc gatcatttct ccggtaacta ccaactgcta ccagggccgg   480
ccagaaggct gtgcggcttg gctgtggca  caggggcagc agatttagtc catttattat   540
ggtctgctat ttatttgggt ccaataagat cagggcacta aaactcaaat acatcaattc   600
aagtcggcgg caaaagaata aaaagcgcca atttttagaa gacaaggaga cagcacaata   660
atcatgcttt tccaatggcc aattaatttt agcctttgtg aggtataaa  atgaatcact   720
ttttctccaa atatcattat tgtaaactag taaagagcgt aaattgtttt atcgctaatc   780
ttcttcttt  tcaatataa ttgtttgatt ctttgtagta ggtacgttaa gtttatatc    840
attcgtcctg gaaacctttt cttatgcccc ttcaatttat gaatttgtgt tttgtattgt   900
cttgctatta atccaatgca aactaattct gccgcatcga tctcacagag ttggagcagc   960
ttaaaaggag ttttggggca acttaaaatg aggtagctt ttttgttgtt gttggtctac    1020
tatttacttt ggtccttatc gttttagttt tgtgttcatt gaggatttga atgactttga   1080
acacaagttt ataaaactaa gttttgtgaa ttctaaattt ttgatgtgtg caaccgacta   1140
aatgaatata aaattctgat ttgtgtattt ctgatttctg atttaccggt tattcattat   1200
gttttttctgg atctcatatg aatttagtat ataaaaatct caggttcttc ttactcagtc   1260
tagtatattt tggcattggg gatcagggtt aaaatcatca ttttctaag  cactaacaag   1320
ctttaaaacc atcaattaaa agttagttct ccatacctgg aattgtttat tgctttagta   1380
ttcatttcat agtgtcaata ccttacaact gtttattgtt ttcaaatgtt tactgttttg   1440
cacttttagtt gttttttagca tgtttcaact tccaaagtta attgacgata gtgtcatata   1500
cgaaatatca tcactcatac aaaattaaac tggatagaat tttttccgat gaaatctatt   1560
tttaaatagt tacgaatata ataggagact taatatgttt gtttcaaaat tacacaaaaa   1620
caccatgaa  atgggcatta gtttgtataa gcatcctttt aaatataaag ctttgttaca   1680
ttgatgcctt ctaaatatat aatattgtaa tgatttgtag taaacaccat ggaaatgggc   1740
attattaaga tgtttcgccc agggcatgaa aaactatcgg accggccctg actgctacta   1800
ataaccgcca ccgcaaaaac ctataaatac aacttccatc acaattctgt ccctactcc   1860
catttcaatc caaaaaaagg ctacacagac atatacagcg atggcagata atggcaacac   1920
cggccgtcaa aaggatgacg acggtggcca tgatggacca cgccaaaacc caactactcc   1980
acccctcccct tcccgcaccc ctcgaagacc aaggcggaac acatcaccgc ccaaacattc   2040
tccgggggcg tcttcaagca ccatgccagc gccgcctact ccccctgcgc cgacgggaat   2100
caccggtgct tctagttctt ctgtgggtac taatataatt tcatttattc cacccaaaac   2160
caaaagaacg aagtcggtga tctgcccgat ctgcaacaaa gatatgtgcc atgagaaggc   2220
gctgtgtggc cacatccggt ggcatacaca ggaggaaaga ttggcggcca gcatcgctat   2280
agcaagagcg ctatcttcta acgttgttgt ttctggcaat ggcgatgaag atgaaggtcc   2340
atctaaaaag tataaactcc cggacctgaa caaatctcca ccgccggagg aggaggacga   2400
ggacgctgcc tgatttcttt gcgggagagg catgcatgta tgtgtggcct ttttgcaata   2460
atactatgca tgggagatgc ataaagttta tctttatttt tttttagttta ataatgtgtg   2520
gcaaacttta tatcatttat gatttcggcc atgtactgct acatcgttct aggatggtta   2580
ttccctagaa tttgctttat gtatttgttt tctttgttaa ttcttctctt ccttaaacgt   2640
tatttcatgt gaattgcgat gtcatgatat tgcaggaatg taacttagaa ctcaacgata   2700
aaaagtgtgt tgagatcgtg gaagttgatc atttatcttg aattcataag ataagcaaca   2760
tgagatagga taattaatta ctgtgggat  ttctttttaa attcatatta ttcgttgtaa   2820
tgcaaatttt taagtagaat aacgaatgtg tcttattatt tacggttaaa tgcaaaagat   2880
cattaacata tctccattga tttgtttact gatgtattct catgtgttct gttgctaaat   2940
tctattttga aaagtatatt caattaaagc aatgcatttt agatataaag caactccata   3000
acttataatt gtgtagattt ttaccaattc aatgtcttaa aagaaaaata aaaattgaaa   3060
tttaattaa  ttgccatagt gatcccgtc  ccgtcaaatta tgtgatcaat ttttaccaga   3120
gcaaaacccc acatttcttg tagtgaacaa tctgtggatg ataaccgatc gaagactttt   3180
gtggggattt cactaaccaa ctatttggct ctcattaatt actattagtt atataaggcc   3240
atcccaagta ttttggcaat attcaaaacg agtaaactat aaaattacac ttttggttct   3300
tgtatttcta acttttagaa ttatgtattt ggttcttata gttttttatt tgtatgaatt   3360
acattacttt tggtccacaa tatttttttat tttctataat tccatttttta gtcattgtag   3420
```

```
ttttaatttg caataaaaaa ttaatttata tttttaatcc atatatatag ttggcaatat 3480
tctatatttt aggttcagat tgtatctttt ataaaaaaga gtcttaaaag actaaaccttt 3540
ttggatcctt atagttttca caatcacttg tgattttttt aatgaacata tcatatttct 3600
taaattacat cagtaatcta cgtataacat ttaatataat tttatttaat cagaaatata 3660
ggattcgtat aataactttg ctgaacttag gcttcatttt taacaaagga taatgcatca 3720
tgcatgacat aaaaatttgt aatatttcta atgtgcatgc actacaagaa cctgacccctt 3780
catatacatt aatgaatgat tctcttttct tatttaatct tagcaagcgg tttgataat 3840
tgtctgcaca atattaagaa ttgcactagc tagctagggg agtccatgac gtaataagca 3900
aattaactag aggacttgta ggaggcttga tcacttcatt gtatatctaa tggcactatc 3960
gatatatgat tggcttgtgt gtatctatgg aatttaacac tattaaaaaa tatatcttta 4020
atgacaatca acaacacaca gtaatttatg acttacaaaa tcatgtgtga ttaaaaaaaa 4080
tgtcatgttt tttaaaatta tagaggattt acgacttaca taattatgtg tcataattat 4140
atgtcatctt gtgtaatatt tatgacttac aaaaatgtat gtcatgtttt atcatcataa 4200
aatctataaa aaaaaataga aacacgagga tacttttcagt gtatgttatc tgtaaaaaaa 4260
aataaaaact cggaggacac taaaagtgta gaaacttgac agcataaacg aatttattta 4320
ccttcatcaa aacttatttt acttcaatct ctgaaccagc tcccttcatt aatctcttcg 4380
agatgtaggt tgatttttaat gctaaatgaa ctttccaaat gtataaataa aacttttctg 4440
tgccagattt gacattgatg gagatgaaga tacacaagtg aattcaccctt tcaatgatca 4500
tactgacata ccaagtactc ctatcccctc tccacctcca caaaacgaac ctcaatttca 4560
aaaacgtaac tatcatttaa atatttaatc atttttcaat tggattcatg cggtaataga 4620
agttactgga ctttaaactt tttgtagctg atgagattca tgagcaacag tccatggaca 4680
ttttccaaat caacaagttt ctgatgagga caacgtaaaa aaagttttttc aattattaaa 4740
catatgattt tggttttttaa aagataatta attatggaaa atcttcagaa aagtctcaat 4800
acttgggtt tattaatgaa aaagtctcaa aaaaaaattt gaataaaaaa gtccataaaa 4860
ttggataaat tattcgattt agcccaattt gccaagtaaa tctggtaaaa ttaggctaaa 4920
tcgaataatt tagccagttt ggtgggcctt tttgcgcaaa aacattattt tgggacttaa 4980
tcgttaattt tccccaaatt tcagtttatt tacagtcttg gagtaaaacc gaacctagtg 5040
cgctaattt ggcttttggt gtttggaatt atttgggttt attgggctcg gtttctgaac 5100
gagtttgatt tttggtttct tgattcaatt ttttggtttt ggggttgaac ccatggattt 5160
tcgattttggt ttcggctttg ataatatttt tgtgcaatcg ttcaaaatat ccgagttaga 5220
ttgggtttaa atgttatcaa aaccgaaacc gagggtagaa ccccaaaact gaacccaatc 5280
gaaaatccat aggttgaacc ccagaaccga acccaataaa ctctaaaaac caaaagccaa 5340
aattaaccga taaaaacttt aaaatacatg tttgttaaat ctagtaaggt gttttgaca 5400
ctttatgtaa attatagaaa aaaatggatt aactgtttgc ttattaagat aaaaacgacg 5460
taaaaataga attggattag aaatgaacca tttttttaca tcgtttactt tatttactag 5520
gttataaccc gtgtattaca cggggttgacg ataaaaaatt gtataaaaaa acaacatata 5580
atggtaagtt tgtaatcgta catgggttgc ttcaatttta atttaaaaat tgtaattcca 5640
aatgaaatat atgtaggatg atataacata cttgtaaatg taaatgagag tttgttggca 5700
tttcatacat ttagcccatc aaatcaaacg caaaaaatct tttttaatcct ataatacatg 5760
tggcacaaat atacgattag catttcgctg agagagaggc tttaagtgag gatgtgaaaa 5820
agaaggaaca tagcaacttg gaatttaaag atcaaaaaac cttgaaaggc ttttggaatg 5880
taaaaatata gaaatgaata aatgtggctt cttgtatgta tcaagagtag gacctgtatt 5940
agaaacataa aaaatttgtg tctaataaaa atcaacaaaa acagaacgta aacgaaagaa 6000
gttattggta aaaaaagatt tcaaaaatag tttttttttg aaccggttca aaaatagtta 6060
ttttacttat ttatccattt aatccaaact tttttttgtc aaatatctca tggaattagt 6120
tggctgcgtc actcttgtca ctgggcgtta taactttgc cttgtggttt gcaacaccac 6180
cttaaataac atagacaaat aacattaaat atcatgataa tacataataa ctcacaaaag 6240
atgcattcta tagaacggta taattgatta gaacaaaata atctaaatag tttatgagga 6300
ttaccttgat aattcccttg gagtgaatac tatccacgat gtcatcttcc aaaggtattc 6360
aatggctttt attagaaccc aatttcagaa ttacattgat gccacagtta cattcactaa 6420
atatcttcct cttaggcttt tagtttgact atatttttaac catttttcaca tcacacttta 6480
accacccccct ttggttatta atgtcaaaag gaacaaaact cacaaatcaa atgcgtggtc 6540
tttatactat tggtacaatg tttataaatt tcttaaaaat gagcacaatt tcaaaaaact 6600
taaacaaatg tcaatggtca ccatgtggta ttaatattat aaagttctaa aaataccatt 6660
ccaccccaac atggtactaa ccagttagaa aatcaagaaa cagaaacata ctctttaatc 6720
taaaacaata taatatagggg atgtgttatg agtttagttt catctaacca tgaattcata 6780
taggattgta cgtttctcct cgaaattgca aagaattttg ttcgactaag caatctacat 6840
attaatggat ttgtatggtt tctcggtttg taggtaagtt aagagctacc aggaaagaga 6900
aaatttgcac cataggtact aaacacattc tacaatggtg gcttaacgt gagagagaat 6960
agagaggtcg aaacatattt ccgttaaata agcaaacata agtttctatt tgggatcaat 7020
aagtttcttc ctatagtggt aaatggatct gtacttgtta agtcttaaa catatttgtt 7080
gtcactgttc acttcctatt ttgcagtgct cttctattac ttacattctt cttatgcat 7140
tcttttaata aggaaaaata accacttatt ctagtattct attgttttgt tagagtcaat 7200
atcagataag aaccttaaaaa ggtgggacaa attgataact taatcaatat atcaactgt 7260
catatgtctc aagtctcaac ccaaattgat atgtttaaga aaaattcaga aaagatatgt 7320
ccatgggaca tgtgcatgta tatgtataag tgtacattcc taaaaaaagt aggctatat 7380
gacatgagca tgtatgtgct tattgttata aagattacaa attttcttaa aaatgaacac 7440
aatttcaaaa tacctatacc aaagcccatg atcaacatg catctgatat taatattata 7500
aagctctaaa caaatctacc ccgacatcaa gtggtactta caagttggaa aatcaagata 7560
caaaaacata gcttttaatc taagtaaaaa cacaataata tagggatatg acctatatgc 7620
atgtttaaaa tcttaagtct gtaaagattg ataggattgg aaaactcttc tattcaacac 7680
aagaaaagaa ttacagtagg aggagggact ctcacactca actactacaa aaaaaccaac 7740
cctcacttac taacactctc acactagtg                                   7769

SEQ ID NO: 6          moltype = AA  length = 227
FEATURE               Location/Qualifiers
source                1..227
                      mol_type = protein
                      organism = Taraxacum officinale
```

```
SEQUENCE: 6
MSTVKSKLST PPTDHFSGNH QLLLITATAK TYIYNFHHNS VPYSHFNPKK ATQTYTAMAD    60
NGNTGRQKDD DGGHDGGRPN PTTPPSPSRT PRRPRRTTSP PKHSPGASSS TMPAPPTPPA   120
PTGITGASSS SVGTNIISFT PPKTKRTKSV ICPICKKDMC HEKALCGHIR WHTQEERLAA   180
SIAIARALSS NVVVSGNGDE DEGPSKKYKL PDLNKSPPPE EEDEDAA                 227

SEQ ID NO: 7          moltype = DNA   length = 14519
FEATURE               Location/Qualifiers
source                1..14519
                      mol_type = unassigned DNA
                      organism = Taraxacum officinale
SEQUENCE: 7
ctgacttggc caacattttt tgttcttccg atcccttcgt aacaatcagt ttaagcacaa    60
ttgaattata tggagataaa taggtgaaat ttggaagacg aggatgggag agtgcgaaga   120
gccaaagaag agaaatgtgg gatagcggcc ggccggttgt taatagaagt gcttagatct   180
tggagacctt ctaatgctta tggaggaacc agatgcttca atttgtaaat ctgcgctgcc   240
cacgtagaat attgaaaaag aaaatcaaat cgatcaataa tgcgaccata tactttagga   300
tttcccactt gtataattct cttattcatt ttcaaatctt tatctaaatt aaggatatcg   360
gcaaaaatat aatcctaatt gttttttcaaa atgataagga ttataaggta acttaattct   420
tgttttattc atatttaatt attattgttt tttatcaatg ttttaaaacc cgggttttga   480
gtcaacccgg tcttgtgaaa aatcccgggt cagccggtca gctgatctac cggttcaata   540
tatttaaata aaatataaat tttcatatag aatttgagtt ttaggctaag aaaatcgggt   600
tttgggctaa ggaaaatcgg gtttaagttt tgggctaatg gattttcggg tcaataacgt   660
tttttttccgt ttttttagatc ggttcgaccg cgttttgtgt gaaacccggc cgggttgatc   720
cgagtcaata attggcaaca acccggtata tgttgacccg ctcttgtccc cgggtcccgg   780
ttcaaccggt tggatcggcc gggttgaccc tggttttaaa acactgtttt ttatacaata   840
tatttgtttt tgttttttagt tttgttttttg ttttttgattt tgtagatata tttttaattt   900
tattttttatt ttgtataaat atagtcatta caaccgatta tttgtaagtt gagtcggtca   960
aaacgaactt tctgataatt cttatacatt tttcggcgaa acatgaatat tttgatcaac  1020
caatatgctt ttttctaggt tttttaaata aaccgcacgt tcaattgcat attcgcaaac  1080
aatagaactc gaaaacccta atcgagcttg ttttatagaa atctgggttg agtgcataca  1140
taataattaa taactgtgaa aaagtttgtt ttaacatgct aaacctatcg atagtcggtt  1200
ataataatta tatgtaaaca aaatcagaaa caataatgat atatgtcacc caaaaaaata  1260
gttactaaat atatacaaaa tcaaaaacaa cagtaattct ttttacaaaa aaaagagaac  1320
aatagtgact aactttagaa agaaaaaaaa agaactaaat tactcttata aatcattatc  1380
ttttatataa attggtaaat tggtcatgta atctagaatg tgaattgcgg aatgctttag  1440
tcacattttg aacaaactgg taattattaa tttcgataaa agttcttcaa gaatagtttg  1500
gtcacattttt ggacgacaat ggtgtgtttt ccatagtaag caatacgtaa tgagttcgct  1560
taataggaaa atagtctaa agcttaatga aatcatatgt ataagtaaca tatattttc  1620
acacgttaca ttgtttgtaa cgtcctcaat ttttttaata tatataacta ggtacactct  1680
aaggtcgtgc taagcacgac ccacgaatgg taatttaggt aatttttcat ccttgactaa  1740
aatacattat gctaataaca aagaattaag aatacaatgc tataatgcat aagtaaataa  1800
aagtacatga tatttctcac atttagtctt tatacataga aaacttaccac tggccatttg  1860
caaaaaaaca ttaaatctcc ctaaaaagta gagtttacaa aatgaaagct tgtttttata  1920
gcaaacaata atcaatatgt gaagctatag tatagtaacc tactcatttc aacttttagg  1980
cagtgcagta attacttact catgttaatg gtgaaatgca ttaagataaa cttcattcaa  2040
cggattaaat ctggtttcat tataaatgta ctcttagtta ctcctccatg taactgcatt  2100
tagcgaacaa caaagctctc aataaataat atgaaacaca tgctaattta taaatgacat  2160
catgggtata tgatgctgtaa catcctaaac ttttaaaata aataataaat catatttggg  2220
atttaaagta atattttaag ataattgata aataagagaa tgaaatacaa agaggcattt  2280
tatttttagc cttttgattta taaaaaagaa aaaaccttga aattggatgt attttgaaat  2340
gggtaagtat tttaaaagat gtgtaagtta agggggataa atggaaatta aggagataag  2400
catttgacca aagtcaaaat agaaggaaca ataagtcggt cgattgtttt cctgtgtgca  2460
tcttcggacg acagagagac agaaaagaac gagcgagaga cagagaggaa tcgagacaga  2520
gagattatcg agagagagac agcgaagtcg ggagagggag accgagaacg accgagacag  2580
gaggaaaacc gagagacaag gggaggacga ggcagcagca gcctaggctg ctgcgttttt  2640
ggcgacagaa aaccaccgcc agcggcggtg tggtgagcg acggtggtgg tggagccgag  2700
aagggggttgt ggtggtgtta gaagtgatgg ttcatctcaa tttcttgata atttgccctt  2760
ttggaacaat aaaattgaagg taactttcaa agctttagat gattatctct tgaaagtaga  2820
aagcaagggt aatttagtct tcaattatgt tatggagaag ggtaataaca cccaaatgct  2880
aacaaaatca tatagattaa tgtgatttga agttatatag ttcatgaatg tgaaggttga  2940
ctttctgcaa tggtcaaaca tggacatgga catgattata gcatattagc aatgtaatag  3000
gaatggaatc accaattcca ttgttgaaaa tagaaaattt gatgtgtgca gaattttgta  3060
aaattttccca aaacaccaac tttaaggctg cataagtcat gcatgaagaa tgcaatcgaa  3120
tccattcttt cgcctaacat caagtccttg aacatagat tacacaggaa aaagaaacag  3180
ccaaatccga gttcgtatga ggattgtatg actgttcaac gtttgtcaaa agttgctgtc  3240
atgctgtcaa accagaattt ttctaagtct gggaaatatg cagaaaatgg gtttgaccag  3300
ttttttggagc ttcataactt gatttataca atccaaatc agttgattct tgacctaaa  3360
ctgtagagaa agatgaggag aaggcatagg aaaaagaatc aacacatttg gatatcgtat  3420
acaacctgtg caaagggttg aagtaggctc aaaaccccatt tttgacataa ttgtcaatta  3480
tatgaattgt gggtaacttt tgccgtaatg aaatgttttg acatataagt gtttatattg  3540
acttataaac atgttaagac tataaacttg ataaagtaac atgtcaaaac ccgaaaatgc  3600
ctatttaggc aaagtatgat gcttaattga gaaatcggtc aaatagcata aaactaaaa  3660
tgttctaaaa tggtccaaga agacttttata cataacttac acatcattag cacatgatgt  3720
gtagtacatg tgaggtttga acactttttat acttggaaaa ttgtcaagta gtcaaaaatg  3780
ggacaaaagg gtaaaattgt ccaaaatgag tatatggcta attaaagcaa gttgagctac  3840
tgaaatgaac ttagataagt attataagga ctataaaagt ataatacttg ttaactatg  3900
agttttgaag gtaatgtcaa tttaaagtaa gttaaccaaa agaaagtaag ttgctaattt  3960
tgggatatat gacccaaatg agttatgcat tggttttag gttgtgtaat acctataatg  4020
```

-continued

```
agatatgaat tgattatgag acatgtattg atgataatac aaatgatgta atgaaatagg   4080
ttcgttgcct atcgtggagc aaggagcatg cggattagtg tagctagtct tacctagcta   4140
ctaaggtgag tacgtgtgga ttgttttccc attttcgggt acatggaaaa ataatatttt   4200
tataatgaag tgcctaatgt tttgaaagaa agaatgaatg aaaatacttg atgctttga    4260
aagaatgttt taaaagaaag taatgttttg aaagaaaaag gtttgatgct ttacgtttga   4320
aaatgaatat gtcttgatat taatgaatgg aatgggtaaa gcatgaatga tataatatgt   4380
aataataaga tgctaaggat ggttatgttt atgatgttca cgtgaatata agaatgttgc   4440
tcgatctaag atgtcccggg tagggattca gaggagccta tcggggtggt acctcccctt   4500
cgcgagatag gttacctaat gtaaatgatg tcaatgtaat ctgatttgtt cttttttgcat  4560
tggtacagac ttggggtata tcagacccaa gtataatatg atatggccat atgataagat   4620
gattaaaaga gtatgtgaaa tgttaaaggt tatgtaaaat gttatatgaa attattcaaa   4680
gagatcttta tggttattat gtctatgaaa aggaagcata taatgttata gatattttat   4740
gtctaaaccc acgtagctca ccagactagt tgtctgacgt atttattttt atgccatgta   4800
tttcaggtta tacacgagga tagactgatg atcgatagaa gctagatgtt acgacggata   4860
gacggagtgg agctttcaag ttctattgta atgatcttac cgtaaattct tatttgcttt   4920
gctatggttg ctgtttgata tataattggt aacacccgag aattgtttta tatatattca   4980
aaaagttttt atttgggacg gttttttgtaa acatgaccaa gtgtcatgaa atattttaa   5040
aaccatagcg tttttaaaac gataaaatga ggggtgttac agatgcgata atatatctta   5100
ggattatgtc aaatatttat gccaattata catgagagag caagtttata agagttttag   5160
ttattctatc attggatcaa tatagatacg tattaatagt agacagagat gcatgaatat   5220
tatagcagag aacttttttgc aaaacctaac ctcactgcat gttgcattca tcaacccac    5280
ttgtagttgt aacaccatga atatgccaat taagaaatat catgaggtat attgtactgg   5340
aaatgacaaa agtactaat ttacaataga acgcagtcaa acttggttat tttgtaaatt    5400
ttaagaagca atttacaaaa aataaaacat aataaagaaa aacataacag taaatcacag   5460
acattgctca tggaagagtg actgatcaaa ctgaccgttt attttcttgt ttcttgtaca   5520
actaccaaac gttcctgtat aaccaccaaa tagtcccaga ctttagaaaa tagaacagaa   5580
aaccacagat atacatacat acagccatac attataattt ttaattgaaa aaaatgcata   5640
gaaaccagt ctcaaataaa gaaccaaata aagaagatac aaatgaaacc tggttatcga    5700
ataaaagagt tagagataat gatttcagca tttgcactca tgtaaacgat atgccattgg   5760
gatccgttgg aaagggtatc gtgaagtgat taaggaagac cggggtgtta gggtttttttt  5820
tgcagtttat tgaacaggtt gatcaaattt tgcgccggta gggttaattc cttttcgaac   5880
gggtttctat ctgggtcttt catcaaaatc actcatgttt gtgtctctaa cctttagttg   5940
cagatggata tcagatcaac ggtttcaggc taaatggggg aacaaataac aagaagaaag   6000
cggtgacatc tgtgttcgta ttcgtatggt ggaaggggaa gagtggcgta tgaattggtc   6060
aatgtaaaac atctggaaac aacttctccc aacatgtaaa aggatccgga aaatatggaa   6120
atgacgatta gagatttcgt tcggatattg gaatatggt cgcgtctgat tgccctacgg    6180
tgcccaccgt ttgggtttct tgatttgtcg tttagataga tgtcggaggt ctaaattcac   6240
aatcctgttc ttccgcggta attgaaattg ggtaaggcta attgtttaga tcaaatggca   6300
gaggacgatg tgaagttgcg ttgccctata attggctctc gtgaaattga attgcaaatt   6360
tcacaacgat gttagcaaca ataatcgtcg ctctcgcatc ccataccgtc gcaacgtatg   6420
atggtgatcg agattgagag atttagggct agatgtggcg ttggcggaca taggttgtgg   6480
ttgacggaat gaggagaaga cgtgagcgtc gattgaggta gcaacaggcg gagggttaac   6540
ggtgtcatca tggtgaaagg tcgcgcgtcg ttttatggtc gatagatcat ggacgttgtg   6600
agtgaatgcc ggcgcaaaca cggtggagga aagtctatgc tttagttgac ggggcggttt   6660
tctctcggag acgaaagag gacgtcgaaa gaaaggccgg ttggagaaaa tatattaaac    6720
gcgccgacac acgctatcag agaagaccgg ttttcttata taatatgac taggtacgtg    6780
caagggtcgt gctaagcacg acccatggag gcttcttgag aaaattgtaa acacatatca   6840
gataatagcg acgaacttta ctgttattga tatataaagt gattaagcat ggttggccct   6900
aagttaaaac tcaaactact gtaagtatgt aatggtaata atttatcctt ttcagctatc   6960
gatcttagat tgctctgtag tgttgtgtct tagtgctttt cacggttctt ttatatgcat   7020
atagtcacat aaaatcagac acacacatag aataacccac agacaatcac ataaaaatca   7080
gtctgatgag gtattaattt aagcaataag gattgatatt caagcaatta gaggagaata   7140
atatattaat ttcacgtact cctattgtag ttattgtgac aaaacccaac tgtttaattg   7200
tgccattgca aaaagtccac ctgtttaatt tctttatcaa catgtcgttg catccttta    7260
catgcaaata tttcagaaca tcttcctata atgaccctg agatgaactt tttagaaata    7320
ttgttgctgg ttacattatc agaaaaaaca gagcttatga aaaaagacca aacatagtaa   7380
ctcgtacttc atgtctggta gttctttga atatttccgt cttttgttcg aaacaatttg    7440
gttgaactgt agtagatctt tcaaactgta tacaacttca caatatgttt tgtaagttca   7500
ttacttctag atcctttcaa aagaagaggt caaactcaaa atttgcataa accagattta   7560
ttgaaggcta attagattag tgttgtaggg cttttttggat ataaataaaa atgaaacata  7620
ggtgctgcaa caggtgcgaa agaatttggt tggacagtag taggtctttc aaactgtata   7680
caactttaca atatgttttg taagttcatt atttctagat cctttcaaaa aaaggaggt   7740
caaactaaaa aaatttctaa accagattta ttgaaggctg attagattaa cattgcaggg   7800
cttttgggga ataaatataa atgaaagata ggtccaacag aaacgaagga ggtgtgaatt   7860
atgcaacaaa tggaaacaca caattatcgt agtacacatg taattaacag ggatcaattt   7920
ccatttattg ttccatcaat tgccaaattt aaaagataac aaatgcatcc ttttgaatg    7980
gaaaagtatg atacataaaa ccagagagag gtatacattt agtccagaaa cggtggaaat   8040
tactttacct agagttgcgt gaatcaaatg gaaaatcaga ggaagagacc ctaaatcagg   8100
atccatcttc tattccctat agaatcaaat ggaaatttct tacttccgac cttttttcatt  8160
tccacaagtt tgtaatcgat aagatcataa aagaaaccg atttacatta gcaaatcttt    8220
aaggcacttg tttgtagttc tcaagtatgc gttacgtatg aaattctaga cagaaaaggg   8280
acgacaggga aaataatggt ggaataaata aacaatcaag aatcaaaaga taataatcct   8340
taaaactaac aaaaattcta tcaataagcc ctacaaatga gaaatatgac ggtggagact   8400
cacctgattg cagtggcgga agctcttggg ggcatggca gccatgggcc cctgttttt    8460
tggaaaattt tcaaaaaaaa aaaattata tatattat cattgaataa gtctagactc     8520
aggaaactat gaaagattag aaatagatca agttatctaa atcaaatctc gaaaatatg    8580
gaaggaatca aaacacaata tttatctcat tgtgaaatca aaacccat aaaaaacaca    8640
aatctaacct acaatttaaa tcaaaacac cataaaaatc aacctaccgt cggattcagc    8700
cgtcgtcgtc ttcttcaccg gaccaccatc caccgccatt gcttcaatcg tgcttttctcg 8760
```

```
tcaatagctt agtggcttgt tcagcttttct tgctctacca atgattttta tacactttcc   8820
agcaccaccg atttgttgaa cggtaatatt atgctccttt atattttga aatctttgaa    8880
agttcatctg gttttctgtc tctgtaaact gtaaagaaac ttttatgttt tgttaagaaa   8940
atagagagat agagaagaaa gagtattgac gtgcttttcc catatgtctc gaatgccaca   9000
ttaggaaaag acaaaaagaa aacaattagt acattacgtc agtgtgatag tactgtatga   9060
ctattagtat gatttacagc tttaataggg attcatagaa aagaacaaaa taaactactt   9120
ataaattaaa aatcgagctt tattttttaat tagtttaaat aaatatttag ctataacata  9180
atatattata tgttttgtat ttataatcaa atataattat ttgtattaca gattagtttg   9240
tataatcaaa tataatgatt catgtttcga aaagattgtt taaatatttt tatatgccat   9300
gtttttttaac tgaattatat tttttgtat gattttcttt acaatttagt ttttctttac   9360
aatttagttt tggccccccct tgttttttg tttgtgttcc gccctgcct gattgatgcg    9420
agaaaggaa agccgccgac atttgtgctt cttcccgcgt taagaaaaat cgcagatgac    9480
attacgattc ttttttctaca gaggaatagg ggggttgcga ctttgcgtga tttgttgtta  9540
atgagtgatg cgtcgtccgt tttgatcggt agcccgtgga gactgattta tttgacagat   9600
agatgtcgtt ctcgttgatg atgcaggtgt aattggcggc gttggtgaag cgaagatggc   9660
atagggaatg gctttgcaga ggagaaaagg agtttcacaa atgtgatta ttgaatcgtc    9720
gtttcagagt cgcgatggtt agtaatcgat ggatttgggt ttgcacctgt tcaagggtg    9780
gtgacgtgtc ttactgtaag aaagagtcgc gatggttagt aatcgacgat gggatttggg   9840
ttgcaacatc gttgacggaa acgacgcggc gatggagaga ggcggtagag ggaatgaaac   9900
gggagattta ccttcaaccg caaacatgtc ttcgttcctc gaaaatcata tgcgcccttt   9960
atgaaaattc cttcacgcgc cgtacacgcg ctcagaaaaa acatagggtt ttcttatata  10020
ataatgacta ggaacgttta tgcgccgtga taatcacggc ccatgagtgg tacaaatgtt  10080
gtaaaactta gaaaatggga aagttgaatg tacaatgtta tgatttattt tattcttcat  10140
agcacaatc ttttgcttta gtgaaagcag ttaaaaagtg gatgtgtcgt tagcaactat   10200
aaactttaa caaatatta catacagaac atagaaataa gataaacact aaaaaatac    10260
aaaatagccg tgttcaacac ggcccacaga atgcaatttg gatattttca aggaggtgta  10320
aaaaatattg ctattatggg agctaattct aggtatattt tgttactcac atgacatgaa  10380
tattgagtaa ttttgtaaaa ttggtaattt agcttagatt ttcccacaaa gatgagtgtt  10440
aaactatca aggaggatat atggtacttc ctcaacaaag atgattttga aatatctata  10500
ttttaaatgt aagaactact atcacatgag acaaatattg atatttactgg ttaggattac 10560
aacattgata tgtaaaatat tttggtaatg taaattttct aaaaaagctt ggaagtagaa 10620
tgcaacaaca atatatgcta gtattacatg ttgggtgatt ttatgaatgt acttacgtgt   10680
tgatccttat ttaccgtact tgaataattt tatctgatca atgctttacc tatatggcta   10740
tatctagcaa tgtgcattat tcacaaatta tggagtgtaa attcatatag acgtatatga  10800
cagtggatga aaggaaaac aagtaatttg attgaatcac tgagaaaaaa gcaaaagata   10860
catgcatata aaatgttaca tcaaaataca gaagataaat gaaagaaaga taataatgtg   10920
gagcattcaa aataagtaag aatgtaagtc cttgatagct cgaaattctt ttaagtcttc   10980
cgtgatagcc taatgtttat aatagaagag acattcaaaa tgaataagaa ttatatcacc   11040
taacagtatt taatcctact ctacttggcc attgagcata ttgctattgt taaaaattat   11100
gtccaaatcg catttaactg ttagatgcaa ttctcattgc cgattacact tatatgtatg   11160
tagtaaatta taattaactc tttgtcctgg tcatttgatg tgtcatggat gtttgtaagg   11220
tacaaataat agattacaat aacttaaata taaaattgag ttaatattcc agaattcaca   11280
aaatgtgtaa taacacttat ttataatttc cacgtaatta atgattaact acttagaatc   11340
ctacaagttt ttgtttatca cctttctcat gatcgtataa atgcaacaac ccttaatgca   11400
tttatagttg ttggtctgcc acgaacacct ttttctgttg attatttgtc attattatgt   11460
taaaaaatgt ttgaaaaatg ttaaatggga ttttgttatg gcaaagagat gaacttctcc   11520
aatattgtag ttgcataaat attgccagtt ccatcataca gaataatacc tcttatattg   11580
ggcaatagaa ttatagaaac aataagggtt aaccgactta catgtattga tctctgattc   11640
ttctttacac actggacaaa ttagtctatc atgtcttgca caaccctgtt aaagaaaaca   11700
gtgaaaattg accacgaagg tgtatcctct agtaccaaca ttacatctat catttaaaa   11760
gggaaatgta tacttatcat atatatctaa tggacgttgc ctttcctcca attgtcactc  11820
ttacatctaa tggaaattat gatcacaatt tacttttaac agcatagata cattcatttg   11880
ttggtaagac acttttggcg gattcattgt attaatcttt catgtaaaaa ttctcattca   11940
agatattagg ttttttgttag aaccccttgtt atttgaacat gcaacctgaa ttctgattgt  12000
tcccaacacc aacattaata ataacctcttc cactagacca tcattccaac ttcaggccct  12060
tgtgttcatt attataagca ctattcggtt tagttctttt atgagtccta tatttacatc   12120
cttaaccatt ttaacaagtc catcatattg ggaattttaa tataaatacc caatgttatt  12180
cattttttgtc gcttcagtag atattgacca tactaaagat gagtatttaa tactcataca  12240
acatgaaaga aaaaaatgaa aaactaacag tcacttatgt agcccccaatc tccatacaaa  12300
tagcgcttta agaataaacc aatttcaggt gaaattgtag aaaggacata atctctgtaca  12360
tgaaaaaaca ttaacagtta cacataaatt atttgcacag agataaaaag cacaatatgt   12420
gatgagaaga tttaaaagta ggaaagtgaa caaaaataac catcaaaatc caatgttagt   12480
aataaagaaa atgtacgagc gattcataac attcatccaa aacccatatg cgatgttgaa   12540
tgcatatctg gataaaagaa tttaataaac aataagcgtc tgtaaatca ataaacaaaa   12600
tcaataaaaa tagacctaaa aatgcaaccg acttattgtt tctatacacc aataaatgat   12660
tttcacgaat tttatccaaa gaaagataaa aagtcataaaa attgaacggg cttaccgatt  12720
tgaatcgtgg tctgtatctg ccacgcagat cagataacaa tcataatcta catcaaagat   12780
ttcagaaaaa ttgaaacttt ccgccattac taatttgata tgaatttctc agagcctaaa   12840
acaaacctaa attactaaaa atcaaacaca ggtttttgac gtttaccttg atttgtgaaa   12900
ataggcattt gggtttttc gtaggatttt ctatgaaaga agccatcaag tttatgacat   12960
tgtaaattaa agcaaagtat gaatatatga aggataggaa aagagatcgg attgtgatga   13020
tccgagagaa aaatacaca aaccagagag aagcgatgtt gtgattgtgg tgtattaatc   13080
tgtttttaaa cctctaacca cttcttgtaa gtccgtaatc gacgtaaatg cgcttgaata   13140
tcctttt cacgccagtg tcgaggatta atgccgtcaa ggtggttggg gaggtattta   13200
taggaagaaa tgcggtggag gtgaatggag gcgtcgatca acccaagag gaaacgttt   13260
gtcgaaatag atgcgttggt cattcgccat aagtttgtga acggtgagt gtatcctgg    13320
cgtcgtttga agtttgtga acggtggcg atgctccgtt aaaggaccgg caacggatcg   13380
agcgatatgt aaatggagg gcagaaatat tgcatacgcg ccggacacgc gcttatgaa    13440
gtgatagtat ggaagtgata ggattttctt atataaataat gatataactt aattttaaat  13500
```

-continued

```
aacatcgtac tatacgtttc aaaataaatt agagttttaa taaaattacg gaatgattaa   13560
accaattaca aacaaatata agtgtcggtc atataaaatt tgtaacaacg aaaacatttc   13620
aaaaaatctg aatgcggaaa tccataacat gagaatacga ttcgtttgca gtcacgccgg   13680
tttcttcacc ttctgagggt cctgaaaaag gttaataaac aatgggtaag ctaaagttta   13740
gtgatcatac acattacttg tctattatat gagttagata cattcacata tcacatacat   13800
acaagcatac acatattaca aaaaatcctc acacatattg ttggtaccaa ctactatttta  13860
gtggaccagg ttattcttgg gggtcaattg tggttaacca taaatgtttg gagtttaggt   13920
tccccttggg ggccgaccat aaacacccat atcatatctc tgtctaggtt ctcttttgggg  13980
actgactata gacaactttg ctcagattct ccttggagga taaccatcct cgacgagatt   14040
aacaacggac caccactgtt ttcagcttgt aacctgcaac atcaatagtt gcgatcttcg   14100
gcgacaatga tgaaccaaca tcaacacaac agtagtgccg gtatgttagt cgttggataa   14160
tagaggcatc atctgaccct tttagcggtg acttttgttg cctatgaagg tcttatcagt   14220
tatatatcga ttaggcttgg ttctaggtta taagaaaaaa tgattctcta tccggtatga   14280
catagagaca aaccggtcta cttttataag aaaatcatat ttgaacaat gtcgtgttaa    14340
taattaatat gtgtatgttt aaatttagaa tatcctgaac ttatatttag ttcgcaaccc   14400
tatgtaagat cgaactaatt ttaaaccgta accagacgtg catgtttgat cagtaataaa   14460
aaggctatca tcgtcgaaaa tattaaaaca aaatataata tcttatttgg cgccatttc    14519

SEQ ID NO: 8           moltype = DNA    length = 684
FEATURE                Location/Qualifiers
source                 1..684
                       mol_type = unassigned DNA
                       organism = Taraxacum officinale
SEQUENCE: 8
atgtcaacgg ttaaaagcaa gttatcaacg cctccaaccg atcatttctc cggtaaccac   60
caactgctac taataaccgc caccgcaaaa acctatatat acaacttcca tcacaattct   120
gtcccctact cccatttcaa tccaaaaaag gctacacaga catatacagc gatggcagat   180
aatggcaaca ccgccgtcaa aaaggatgac gacggtggcc atgatggggg acgcccaaat   240
ccgaccaccc caccctcccc ttcccgcacc ccgcgaagac ccaggcggac cacatcgccg   300
cctaaacatt ctccggggc gtcttcaagc accatgccac cgccgcctac tcccctgcg    360
ccgacgggaa tcaccggtgc gtctagttct tctgtgggta ctaatataat ttcatttact   420
ccacccaaaa ccaaaagaac gaagtcggtg atttgtccga tctgtaagaa agatatgtgc   480
catgagaagg cgctgtgtgg ccacatccgg tggcatactc aggaagaaag attggcggcc   540
agcattgcta tagcaagagc gctatcttct aacgttgttg tttctggcaa tggcgatgaa   600
gatgaaggtc catctaaaaa gtataaactc ccggacctga caagtcacc accgccggag    660
gaggggacg aggacgctgc ctga                                           684

SEQ ID NO: 9           moltype = DNA    length = 4521
FEATURE                Location/Qualifiers
source                 1..4521
                       mol_type = unassigned DNA
                       organism = Taraxacum officinale
SEQUENCE: 9
ttttcttgcg ggagaggcat gtatgtgtgg cctttttgca ataatactat gcatgggaga   60
tgcataaagt ttatctttat tttgttttag tttaataatg tgtggcaaac tttatatcat   120
ttatgatttc ggccatgtac tgctacatcg ttctaggatg gttattccct agaatttgct   180
tttatatatt tttttcttc gttaattctt ctcttccttt aacgttattt catgtgaatt    240
tgcgatatca tgatattgca ggaacgtaac ttagaactca acgataaaaa gtgtgttgag   300
atcgtggaag ttgatcgttt atcttgaatt cacaagataa gcaacatgag atagaataat   360
taattactgc ggagatttct ttttagattc atcttattcg ttgtaaattg caatgcaaat   420
ttttaagtag aataacgaaa gcgtgttgtt atttacggtt aaatgcaaaa aatcattaac   480
atatctccat aattgatttg tttagtatgc attctcatgt gttctattgc aaaattctat   540
tttgaaattc aattaaagca atgcattta gatataaagc aattccatca cttaattata    600
ttgggtagat ttttaccaaa tcactgtcct aaaagaaaaa taaaaaatga agttcaatg    660
ccatagtgat cccgtcaatt atgtgatcaa ttttaccag agcaaaaccc caaaagttaa    720
agagtataat tgcagaacga caacaatctg aggatgatac taactccggt ataaaccgaa   780
tgcttttgtg gggatttcac taatcaacta tttggctctc atcacaaggc cgtgttaatg   840
gattactatt agttataagg ccatcccaag ttgtttggct atattattac ctttttaaaa   900
ccaaaatgta taaactgtaa aattacactt ttggttcttg tattttctaa tttttagaat   960
tatgtatttg gttcttgtag ttttttatt tgtatgaatc atattagttt tggtccacga    1020
taacttttat tttctataat tacactttg gtcattgtag ttttaattg caagaaaaaa    1080
ataatctatc tttttagtcc atatatatag tttgcaatat tctatatttt aggttcaggt   1140
tatatatctt ttacaaaaat actacttatg atttttaat gaatatatca tatttcgtaa    1200
attacataaa cattttatat aattttattt agtcagaact ataggattcg catgataact   1260
ttgctgaact taattgggct tcattttaa caaaggataa tgcatcatgc atgacataaa    1320
aatttgtaat gttctaatg tgcatgcact acaagaacct gacccttcat atacattaat    1380
gaatgattct cttttcttat tatatcttag caaacggttt ggataagagt ctgaacaata   1440
ttaagaattg cactagctag ctagtccatg cagcaagcaa attaattaga ggacttttta   1500
agaggcttga tcacttcatt tatatctaa tggcactgtg gatatatgat tggattgtgt    1560
gtatgtatgg aatttaatat tactaaaaaa tattaatgac aaacaataac acactaattt   1620
ataacttaca aaagcgtgtg tcattaaaga aaatgtcatg tttcttaaaa tatggagaat   1680
ttactactta cataattatg tgtcataaat ttatgtcatc ttgtgtgata tttatgactt   1740
acaaaaatgt atgttatgtt tatcgtcata aaatctgtaa aaaaaaatag aaacatggag   1800
gatcttttca aggtgtagaa acttgacagc ataacgggt ttattacctt catcaaaact    1860
tatcttactt caatctcttg gagatgcagg ttgatttta tgctaaatga acttttcaaa    1920
tgtataaata tatatctttt gacgatttg acattgatgg agatgaagat acaccagtga    1980
attcaccttt caatgatcat actgacatac caagtactct tatccctct ccacctccac    2040
agaacgaacc tcaatttcaa aaacgtaact gccgctgttc taaaaacaga aaattttcaa   2100
aaacgtaact atcatttaaa tatttaatca ttttttcaatt ggattcatgc tgtaatagaa   2160
```

```
gttactggac tttaaacttc ttgtagctga tgagattcat gaacaacagt ccaaggagat    2220
tttccaaatc aacaagtttc tgatgagaac aaggtaaaaa aaataagttt ttcatttaaa    2280
catatgattt tggttttcaa aagataatta attataggaa ctcttctgaa aagtcccaaa    2340
gtttaccgt aaaattgatt ttggtttttt tttaaattga ataaaaaagt ccataaaatt     2400
ggataaatta ttcgatttag cccaatttac ctagtatatc tggtaaaaat tggttaaatc    2460
gaataaattta ggcagtttgt tgggcttttt tgcgcaaaaa cattattttg ggacttaatc   2520
gttaattttc cccaagtttc agtttattta cagtattgga ataaaaccga acctagtgcg    2580
ctaattttgt cttttggtgt ttagaattat ttgggtttat tggtctcggt ttctaaacga    2640
gttcggtttt tggtttcttg attcgatttt tggcttttgg gttcaaccca tggattttcg    2700
atttggtttt ggttttgata atattttttg tgcaatcgtt caaaaaatcc gagttagatt    2760
gggtttaaat gttatcaaaa ccaaaaccga tggtagaacc ccaaaactga acccaatcga    2820
aaatccatgg gttgaacctc aaaaacgaac ccaataaatt ctaaaaacca aaatccaaaa    2880
ttagcggata aaaattttaa aatacatatc tactggtaag gtgttttga caatttatgt     2940
aaattataga aaaaaatgta ttaagtgttt gctatttaag ataaaaatgg cgttaaaaat    3000
agaattggtt agaaatgaac catttttta tattttttac ttcatttatt aagtaaatag     3060
tagaggtgaa ttagagatga tctaagatat tttttttctt tcaaaagag cttcgaaaac     3120
acttttccga cagaaacaag acacaaacct ttttactcgt agaccgacga ttttttaaa     3180
gatcaaagac ctaagaagat ttgtctccca tcttcttaaa acatatgtga gatagacact    3240
tctagcctct tctatgctaa aaaaagagc tcgcctttag tttggttaat ttgagacaat     3300
ggtctccaca aaaacatagg tagttaggta ctcacgcgcc aagttactaa tctcaaatca    3360
aacataactg tatgatcgtc aacacatttt acaagttaac aaaagagcat tgctttagac    3420
ttaaaaattg cttttgagaaa aaacaaacac ctaagaattt ctaaaagcga tgatttcaac   3480
tctctttaaa atgtatatat atgttacatt ttggtctttta aacttttcaa gaaagtacaa   3540
ttcaactcct attttcaaaa tgttcttaca tgagcgatat gatttaccg tttaaaatgt     3600
aaaccatgat aactatttct aaattccaat tttttgtttcg ttgatcaatc tcattatcat   3660
tcaatgcata caaaacacaa tacaatctgt tttgtcatct tcttcaaggc cgaaagacaa    3720
ctaaacatat gaagactgaa gaggacaatc tagcaaactc aaacttcact ataaatttgc    3780
aattgctatt ggtagccatg aagtaacatt tttgaggagg ttaacaaaat tttaacagta    3840
aattcaataa tccatcacca cgatatgtaa tcatctacac aaacacagat gatgatagtc    3900
atatatgttc gtaatcacac aagcaagaaa tcgcaatgta ctttcacccg tcttctctga    3960
cttgaacacg ggaattggtt gtctaagaag tagattgttt cccacggatt taccaagtac    4020
atttaaatcc ttcacccttt gtatctctct tcctgttttt tgttttgcaa tcaacaaaaa    4080
aaaaagtaaa aatcccatct taaattcacg caaaaaaaca cattgaatca accatcacta    4140
tagtagtttc aagaaaaatc tgcacttcca taatttcttt ctattacacc attatactag    4200
gaaaacttca tagcaatatt atctaaatac aaagcaattt ttactagtaa tattcgtaga    4260
tttgtcaata tatagtgtcc taataaagaa aaaataacgg aactataatg ctctaatagg    4320
tagatttttt ttagtataat gtcctaataa gagaaaaaac aaatgtacaa ttatgtaata    4380
ataagaaaag aaagtaatat gcttaataga caaaataatgt aaaccatgtt gctatttctt   4440
gcatctagtc cttatttgaa taatatgtag catattaact acttatgaat tttatatata    4500
aatgataaaa aattccgtga g                                              4521
SEQ ID NO: 10          moltype = DNA   length = 19724
FEATURE                Location/Qualifiers
source                 1..19724
                       mol_type = unassigned DNA
                       organism = Taraxacum officinale
SEQUENCE: 10
ctgacttggc caacattttt tgttcttccg atcccttcgt aacaatcagt ttaagcacaa     60
ttgaattata tggagataaa taggtgaaat ttggaagacg aggatgggag agtgcgaaga   120
gccaaagaag agaaatgtgg gatagcggcc ggccggttgt taatagaagt gcttagatct   180
tggagaccttt ctaatgctta tggaggaacc agatgcttca atttgtaaat ctgcgctgaa  240
cacgtagaat attgaaaaag aaaatcaaat cgatcaataa tgcgaccata actttaggga   300
tttcccactt gtataattct cttattcatt ttcaaatctt tatctaaatt aaggatatcg   360
gcaaaaatat aatcctaatt gttttttcaaa atgataagga ttataaggta acttaattca  420
tgtttttattc ctatatttaatt attattgttt tttatcaata ttttaaaacc cgggtttga   480
gtcaacccgg tcttgtgaaa atcccgggt cagccggtca gctgatctac cggttcaata    540
tatttaaata aaatataaat tttcatatag aatttgagtt ttaggctaag aaaatcgggt    600
tttgggctaa ggaaaatcgg gtttaagttt tgggctaatg gattttcggg tcaataacgg    660
tttttttccgt tttttagatc ggtgtcgaccg cgttttgtgt gaaacccggc cgggttgatc  720
cgagtcaata attggcaaca accccggtata tgttgacccg ctcttgtccc cgggtcccgg   780
ttcaaccggt tggatcggcc gggttgaccc tggtttaaa acactgtttt ttatacaata    840
tatttgtttt tgttttagt tttgtttttg ttttgattt tgtagatata ttttaatttt     900
tatttttatt ttgtataaat atagtcatta caaccgatta tttgtaagtt gagtcggtca    960
aaacgaactt tctgataatt cttatacatt tttcggcgaa acatgaatat tttgatcaac   1020
caatatgctt ttttctaggt ttttttaaata aaccgcacgt tcaattgcat attcgcaaac  1080
aatagaactc gaaacccta atcgagcttg ttttatagaa atcgggttg agtgcataca    1140
taataattaa taactgtgaa aaagtttgtt ttaacatgct aaacctatcg atagtcggtt   1200
ataataatta tatgtaaaca aaatcagaaa caatatgt atatgtcacc caaaaaaata    1260
gttactaaat atatacaaaa tcaaaaacaa cagtaatttc ttttacaaaa aaaagagaac   1320
aatagtgact aactttagaa agaaaaaaaa agaactaaat tactcttata aatcattatc   1380
ttttatataa attggtaaat tggtcatgta atctagaatg tgaattgcgg aatgcttag    1440
tcacattttt aacaaactgg taattattaa tttcgataaa agttcttcaa gaatagtttg   1500
gtcacattttt ggacgacaat ggtgtgtttt ccatagtaag caatacgtaa tgagttcgct  1560
taataggaaa atagatctaa agcttaatga aatcatatgt aaagtaaca tatatttttc   1620
acacgttaca ttgtttgtaa cgtcctcaat ttttttaata tatataacta ggtacactct   1680
aaggtcgtgc taagcacgac ccacgaatgg taatttaggt aatttttcat ccttgactaa   1740
aatacattat gctaataaca aagaattaag aatacaatgc taatgcat aagtaaataa    1800
aagtacatga tatttctcac atttagtctt tatacataga aaacttacac tggccatttg   1860
caaaaaaaca ttaaatctcc ctaaaaagta gagtttacaa aatgaaagct tgtttttata   1920
```

```
gcaaacaata atcaatatgt gaagctatag tatagtaacc tactcatttc aacttttagg    1980
cagtgcagta attacttact catgttaatg gtgaaatgca ttaagataaa cttcattcaa    2040
cggattaaat ctgggttcat tataaatgta ctcttagtta ctcctccatg taactgcatt    2100
tagcgaacaa caaaagctct aataaataat atgaaacaca tgctaattta taaatgacat    2160
catgggtata gatgctgtaa catcctaaac ttttaaaata aataataaat catatttggg    2220
atttaaagta atattttaag ataattgata aataagagaa tgaaatacaa agaggcattt    2280
tatttttagc ctttgattta taaaaaagaa aaaaccttga aattggatgt attttgaaat    2340
gggtaagtat tttaaaagat gtgtaagtta aggggggataa atggaaatta aggagataag    2400
catttgacca aagtcaaaat agaaggaaca ataagtcggt cgattgtttt cctgtgtgca    2460
tcttcggacg acagagagac agaaaagaac gagcgagaga cagagaggaa tcgagacaga    2520
gagattatcg agagagagac agcgaagtcg ggagagggag accgagaacg accgagacag    2580
gaggaaaacc gagagacaag gggaggacga ggcagcagca gcctaggctg ctgcgttttt    2640
ggcgacagaa aaccaccgcc agcggcggtg gtggtgagcg acggtggtgg tggagccgag    2700
aagggggttgt ggtggtgtta gaagtgatgg ttcatctcaa tttcttgata atttgccctt    2760
ttggaacaat aaaattgaagg taactttcaa agctttagat gattatctct tgaaagtaga    2820
aagcaagggt aatttagtct tcaattatgt tatggagaag ggtaataaca cccaaatgct    2880
aacaaaatca tatagattaa tgtgatttga agttatatag ttcatgaatg tgaaggttga    2940
ctttctgcaa tggtcaaaca tggacatgga catgattata gcatattagc aatgtaatag    3000
gaatggaatc accaattcca ttgttgaaaa tagaaaattt gatgtgtgca gaatttttgta   3060
aaatttccca aaacaccaac tttaaggctg cataagtcat gcatgaagaa tgcaaatcag    3120
tccattcttt cgcctaacat caagtccttg caacatagat tacacaggaa aaagaaacag    3180
ccaaatccga gttcgtatga ggattgtatg actgttcaaa cgtttgtcaaa agttgctgtc    3240
atgctgtcaa accagaattt ttctaagtct gggaaatatg cagaaaatgg gtttgaccag    3300
tttttggagc ttcataactt gatttataca tatccaaatc agttgattct tgagcctaaa    3360
ctgtagagaa agatgaggag aaggcatagg aaaaagaatc aacacatttg gatatcgtat    3420
acaacctgtg caaagggttg aagtaggctc aaaacccatt tttgacataa ttgtcaatta    3480
tatgaattgt gggtaacttt tgccgtaatg aaatgttttg acatataagt gtttatattg    3540
acttataaac atgttaagac tataaacttg ataaagtaac atgtcaaaac ccgaaaatgc    3600
ctatttaggc aaagtatgat gcttaattga gaatcggtc aaatagcata aaaactaaaa     3660
gtgttctaaa tggtccaaga agactttata cataacttac acatcattag cacatgatgt    3720
gtagtacatg tgaggtttga acactttttat acttggaaaa ttgtcaagta gtcaaaaatg    3780
ggacaaaagg gtaaaattgt ccaaaatgag tatatggcta attaaagcaa gttgagctac    3840
tgaaatgaac ttagataagt attataagga ctataaaagt ataatacttg gttaactatg    3900
agttttgaag gtaatgtcaa tttaaagtaa gttaaccaaa agaaagtaag ttgctaattt    3960
tgggatatat gacccaaatg agttatgcat tggttttttag gttgtgtaat acctataatg    4020
agatatgaat tgattatgag acatgtattg atgataatac aaatgatgta atgaaatagg    4080
ttcgttgcct atcgtggagc aaggagcatg cggattagtg tagctagtct tacctagcta    4140
ctaaggtgag tacgtgtgga ttgttttccc attttcgggt acatggaaaa ataatatttt    4200
tataatgaag tgcctaatgt tttgaaagaa agaatgaaat aaaatacttg atgcttttga    4260
aagaatgttt taaagaaaag taatgttttg aaagaaaaag gtttgatgct ttacgtttga    4320
aaaatgaatat gtcttgatat taatgaatgg aatgggtaaa gcatgaatga tataaatatgt   4380
aataataaga tgctaaggat ggttatgttt atgatgttca cgtgaatata agaatgttgc    4440
tcgatctaag atgtcccggg tagggattca gaggagccta tcgggtggt acctcccctt     4500
cgcgagatag gttacctaat gtaaatgatg tcaatgtaat ctgattgtt cttttttgcat    4560
tggtacagac ttggggtata tcagacccaa gtataaatatg atatgccat atgataagat    4620
gattaaaaga gtatgtgaaa tgttaaaggt tatgtaaaat gttatgaa attattcaaa      4680
gagatcttta tggttattat gtctatgaaa aggaagcata taatgttata gatatttat    4740
gtctaaaccc acgtagctca ccagactagt tgtctgacgt atttattttt atgccatgta    4800
tttcaggtta tacacgagga tagactgatg atcgatagaa gctagatgtt acgacggata    4860
gacggagtgg agctttcaag ttctattgta atgatcttac cgtaaattct tatttgcttt    4920
gctatggttg ctgtttgata tataattggt aacacccgga aattgtttta tatatattca   4980
aaaagttttt attggggacg gtttttgtaa acatgaccaa gtgtcatgaa atattttaa    5040
aaccatagcg ttttaaaac gataaaatga ggggtgttac agatgcgata atatatctta    5100
ggattatgtc aaatattat gccaattata catgagagag caagttttata agagtttag    5160
ttattctatc attggatcaa tatagatacg tattaatagt agacagagat gcatgaatat   5220
tatagcagag aacttttttgc aaaacctaac ctcactgcat gttgcattca tcaaccccac  5280
ttgtagttgt aacaccatga atatgccaat taagaaatat catgaggtat attgtactgg   5340
aaaatgacaaa aagtactaat ttacaataga acgcagtcaa acttggttat tttgtaaatt   5400
ttaagaagca atttacaaaa aataaaacat aataaagaaa aacataacag taaatcacag    5460
acattgctca tggaagagtg actgatcaaa ctgaccgttt attttcttgt ttcttgtaca    5520
actaccaaac gttcctgtat aaccaccaaa tagtcccaga ctttagaaaa tagaacagaa    5580
aaccacagat atacatacat acagccatac attataattt ttaattgaaa aaaatgcata    5640
gaaaaccagt ctcaaataaa gaaccaaata aagaagataa aaatgaaacc tggttatcga    5700
ataaaagagt tagagataat gatttcagca tttgcactca tgtaaacgat atgccattgg    5760
gatccgttgg aaagggtatc gtgaagtgat taaggagaag cggggtgtta gggttttttt    5820
tgcagtttat tgaacaggtt gatcaaattt tgcgccggta gggttaattc cttttcgaac    5880
gggtttctat ctgggtcttt catcaaaatc actcatgttt gtgtctctaa cctttagttg    5940
cagatggata tcagatcaac ggtttcaggc taaatggggg aacaaataac aagaagaaag    6000
cggtgacatc tgtgttcgta ttcgtatggt ggaaggggaa gagtggcgta tgaattggtc    6060
aatgtaaaac atctgaaaac aacttctccc aacatgtaaa aggatccgga aaatatgaaa    6120
atgacgatta gagatttcgt tcggatattg ggaatatggt cgcgtctgat tgccctacgg    6180
tgcccaccgt ttgggtttct tgatttgtcg tttagataga tgtcggaggt ctaaattcac    6240
aatcctgttc ttccgcggta attgaaattg ggtaaggcta attgtttaga tcaaatggca    6300
gaggacgatg tgaagttgcg ttgccctata ctcttctcgatc ccataccgtc gcaacgtatg   6360
tcacaacgat gttagcaaca ataatcgtcg ctctcgcatc ccataccgtc gcaacgtatg    6420
atggtgatcg agattgagag attaggggct agatgtggcg ttggcggaca taggttgtgg    6480
ttgacggaat gaggagaaga cgtgagcgtc gattgaggta gcaacaggcg gagggttaac    6540
ggtgtcatca tggtgaaagg tcgcgcgtcg ttttatggtc gatagatcat ggacgttgtg    6600
agtgaatgcc ggcgcaaaca cggtggagga aagtctatgc tttagttgac ggggcggttt    6660
```

```
tctctcggag acggaaagag gacgtcgaaa gaaaggccgg ttggagaaaa tatattaaac   6720
gcgccgacac acgctatcag agaagaccgg ttttcttata taataatgac taggtacgtg   6780
caagggtcgt gctaagcacg acccatggag gcttcttgag aaaattgtaa acacatatca   6840
gataatagcg acgaacttta ctgttattga tatataaagt gattaagcat ggttggccct   6900
aagttaaaac tcaaactact gtaagtatgt aatggtaata atttatcctt ttcagctatc   6960
gatcttagat tgctctgtag tgttgtgtct tagtgctttt cacggttctt ttatatgcat   7020
atagtcacat aaaatcagac acacacatag aataacccac agacaatcac ataaaaatca   7080
gtctgatgag gtattaattt aagcaataag gattgatatt caagcaatta gaggagaata   7140
atatattaat ttcacgtact cctattgtag ttattgtgac aaaacccaac tgtttaattg   7200
tgccattgca aaaagtccac ctgtttaatt tctttatcaa catgtcgttg catccttta   7260
catgcaaata tttcagaaca tcttcctata atgaccttg agatgaactt tttagaaata   7320
ttgttgctgg ttacattatc agaaaaaaca gagcttatga aaaagacca aacatagtaa   7380
ctcgtacttc atgtctggta gttctttga atatttccgt cttttgttcg aaacaatttg   7440
gttgaactgt agtagatctt tcaaactgta tacaacttca caatatgttt tgtaagttca   7500
ttacttctag atcctttcaa aagaagaggt caaactcaaa atttgcataa accagattta   7560
ttgaaggcta attagattag tgttgtaggg cttttggat ataaataaaa atgaaacata   7620
ggtgctgcaa caggtgcgaa agaatttggt tggacagtag taggtctttc aaactgtata   7680
caactttaca atatgttttg taagttcatt atttctagat cctttcaaaa aaaaggaggt   7740
caaactaaaa aaatttctaa accagattta ttgaaggctg attagattaa cattgcaggg   7800
cttttgggga ataaatataa atgaaagata ggtccaacag aaacgaagga ggtgtgaatt   7860
atgcaacaaa tggaaacaca caattatcgt agtacacatg taattaacag ggatcaattt   7920
ccatttattg ttccatcaat tgccaaattt aaaagataac aagtcatcc tttttgaatg   7980
gaaaagtatg atacataaaa ccagagagag gtatacattt agtccagaaa cggtggaaat   8040
tactttacct agagttgcgt gaatcaaatg gaaaatcaga ggaagagacc ctaaatcgca   8100
atccatcttc tattccctat agaatcaaat ggaaatttct tacttccgac cttttcatt   8160
tccacaagtt tgtaatcgat aagatcataa aagaaaccac attacatta gcaaatcttt   8220
aaggcacttg tttgtagttc tcaagtatgc gttacgtatg aaattctaga cagaaaaggg   8280
acgacaggga aaataatggt ggaataaata aacaatcaag aatcaaaaga taataatcct   8340
taaaactaac aaaaattcta tcaataagcc ctacaaatga gaaatatgac ggtggagact   8400
cacctgattg cagtggcgga agctcttggg ggctttggta ggccatgcc ccctgtttt   8460
tggaaaattt tcaaaaaaaa aaaaattata tatattatat cattgaataa gtctagactc   8520
aggaaactat gaaagattag aaatagatca agttatctaa atcaaatctc gaaaaatatg   8580
gaaggaatca aaacacaata tttatctcat tgtgaaatca aaaccctat aaaaaacaca   8640
aatctaacct acaatttaaa tcaaaaacac cataaaaatc aacctaccgt cggattcagc   8700
cgtcgtcgtc ttcttcaccg gaccaccatc caccgccatt gcttcaatcg tgctttctcg   8760
tcaatagctt agtggcttgt tcagctttct tgctctacca atgattttta tacactttcc   8820
agcaccaccg atttgttgaa cggtaatatt atgctccttt atatttttga aatctttgaa   8880
agttcatctg gtttctgtc tctgtaaact gtaaagaaac ttttatgttt tgttaagaaa   8940
atagagagat agagaagaaa gagtattgac gtgcttttcc catatgtctc gaatgccaca   9000
ttaggaaaag acaaaagaa aacaattagt acattacgct agtgtgatag tactgtatga   9060
ctattagtat gatttacagc tttaataggg attcatagaa aagaacaaaa taaactactt   9120
ataaattaaa aatcgagctt tatttttaat tagttaaat aaatatttag ctataacata   9180
atattata tgttttgtat ttaatcaa atataattat ttgtattaca gattagtttg   9240
tataatcaaa tataatgatt catgtttcga aaagattgtt taaatatttt tatatgccat   9300
gtttttaac tgaattatat ttttttgtat gattttcttt acaatttagt ttttctttac   9360
aatttagttt tggcccccct tgtttttttg tttgtgttcc gccctgcct gattgatgcg   9420
agaaaaggaa agccgccgac atttgtgctt cttcccggct taagaaaaat cgcagatgac   9480
attacgattc ttttttctaca gaggaatagg ggggttgcga ctttgcgtga tttgttgtta   9540
atgagtgatg cgtcgtccgt tttgatcggt agcccgtgga gactgattta tttgacagat   9600
agatgtcgtt ctcgttgatg atgcaggtgt aattggcggc gttggtgaag cgaagatggc   9660
atagggaatg gcttttgcaga ggagaaaagg agtttcacaa atatgaatta ttgaatcgtc   9720
gtttcagagt cgcgatggtt agtaatcgat ggatttgggt ttgcacctgt tcaagggtg   9780
gtgacgtgtc ttactgtaag aaagagtcgc gatggttagt aatcgacgat ggatttgggt   9840
ttgcaacatc gttgacggaa acgacgcggc gatggagaga ggcggtagag ggaatgaaac   9900
gggagattta ccttcaaccg caaacatgtc ttcgttcctc gaaaatcata tcgcccttt   9960
atgaaaattc cttcacgcgc cgtacacgcg ctcagaaaaa acatagggtt ttcttatata  10020
ataatgacta ggaacgtta tgcgccgtga taatcacggc ccatgagtgg tacaaatgtt  10080
gtaaaactta gaaatgggga aagttgaatg tacaatgtta tgatttattt tattcttcat  10140
agcacaatac ttttgcttta gtgaaagcag ttaaaagtg gatgtgtcgt tagcaactat  10200
aaacttttaa caaaatatta catcacagaac ataagaaact aaaaaaatac  10260
aaaatagccg tgttcaacac ggcccacaga atgcaatttg gatatttcta aggaggtgta  10320
aaaaatattg ctattatggg agctaattct aggtatattt tgttactcac atgacatgaa  10380
tattgagtaa ttttgtaaaa ttggtaattt agcttagatt ttccacaaa gatgagtgtt  10440
aaaactatca aggaggatat atggtacttc ctcaacaaga atgattttga aatatctata  10500
ttttaaatgt aagaactact atcacatgag acaaatattg atattactgg ttaggattac  10560
aacattgata tgtaaaatat tttggtaatg taaatttcct aaaaaagctt ggaagtagaa  10620
tgcaacaaca atatatgcta gtattacatg ttgggtgatt ttatgaatgt acttacgtgt  10680
tgatccttat ttaccgtact tgaataattt tatctgatca atgctttacc tatatggcta  10740
tatctagcaa tgtgcattat tcacaaatta tggagtgtaa attcatatag acgtatatga  10800
cagtggatga aaaggaaaac aagtaatttg attgaatcac tgagaaaaaa gcaaaagata  10860
catgcatata aaatgttaca tcaaaataca gaagataaat gaaagaaaga taataatgtg  10920
gagcattcaa aataagtaag aatgtaagtc cttgatagct cgaaattctt ttaagtcttc  10980
cgtgatagcc taatgtttat aatagaagag acattcaaaa tgaataagaa ttatatcacc  11040
taacagtatt taatcctact ctacttggcc attgacgta ttgctattgt taaaaattat  11100
gtccaaatcg catttaactg ttagatgcaa ttctcattgc cgattacact tatatgtatg  11160
tagtaaatta taattaactc tttgtcctgg tcatttgatg tgtcatggat gtttgtaagg  11220
tacaaataat agattacaat aacttaaata taaaattgag ttaatattcc agaattcaca  11280
aaatgtgtaa taacacttat ttataatttc cacgtaatta atgattaact acttagaatc  11340
ctacaagttt tgtttatca ccttttcatat gatcgtataa atgcaacaac ccttaatgca  11400
```

-continued

```
tttatagttg ttggtctgcc acgaacacct ttttctgttg attatttgtc attattatgt 11460
taaaaaatgt ttgaaaaatg ttaaatggga ttttgttatg gcaaagagat gaacttctcc 11520
aatattgtag ttgcataaat attgccagtt ccatcataca gaataatacc tcttatattg 11580
ggcaatagaa ttatagaaac aataagggtt aaccgactta catgtattga tctctgattc 11640
ttcttacac actggacaaa ttagtctatc atgtcttgca caaccctgtt aaagaaaaca 11700
gtgaaaattg accacgaagg tgtatcctct agtaccaaca ttacatctat catttttaaa 11760
gggaaatgta tacttatcat atatatctaa tggacgttgc ctttcctcca attgtcactc 11820
ttacatctaa tggaaattat gatcacaatt tacttttaac agcatagata cattcatttg 11880
ttggtaagac acttttggcg gattcattgt attaatcttt catgtaaaaa ttctcattca 11940
agatattagg tttttgttag aaccttttgt atttgaacat gcaacctgaa ttctgattgt 12000
tcccaacacc aacattaata ataccctcttc cactagacca tcattccacc ttcaggccct 12060
tgtgttcatt attataagca ctattcggtt tagttctttt atgagtccta tatttacatc 12120
cttaaccatt ttaacaagtc catcatattg ggaattttaa tataaatacc caatgttatt 12180
cattttgtc gcttcagtag atattgacca tactaaagat gagtatttaa tactcataca 12240
acatgaaaga aaaaaatgaa aaactaacag tcacttatgt agccccaatc tccatacaaa 12300
tagcgcttta agaataaacc aatttcaggt gaaattgtag aaaggacata aatctgtaca 12360
tgaaaaaaca ttaacagtta cacataaatt atttgcacag agataaaaag cacaatatgt 12420
gatgaagaaga tttaaaagta ggaaagtgaa caaaaataac catcaaaatc caatgttagt 12480
aataaagaaa atgtacgagc gattcataac attcatccaa aacccatatg cgatgttgaa 12540
tgcatatctg gataaaagaa tttaataaac aataagcgcc tgtaaaatca ataaacaaaa 12600
tcaataaaaa tagacctaaa aatgcaaccg acttattgtt tctatacacc aataaatgat 12660
tttcacgaat tttatccaaa gaaagataaa aagtcataaa attgaacggc cttaccgatt 12720
tgaatcgtgg tctgtatctg ccacgcagat cagataacaa tcataatcta catcaaagat 12780
ttcagaaaaa tatgaaactt ccgccattac taatttgata tgaatttctc agagcctaaa 12840
acaaacctaa attactaaaa atcaaacaca ggttttgac gtttaccttg atttgtgaaa 12900
ataggcattt gggtttttc gtaggatttt ctatgaagga agccatcaag tttatgacat 12960
tgtaaattaa agcaaagtat gaatatatga aggataggaa aagagatcgg attgtgatga 13020
tccggagaga aaaatacaca aaccagagag aagcgatgtt gtgattgtgg tgtattaatc 13080
tgttttaaaa cctctaacca cttcttgtaa gtccgtaatc agacgaaatg cgcttgaata 13140
ataagtcttt cacgccagtg tcgaggatta atgccgtcaa gggtggtggg gaggtattta 13200
taggaagaaa tgcggtggag gtgaatggag gcgtcgatca aacccaagag gaaacggttt 13260
gtcgaaatag atgcgttggt cattcgccat aagtttgtga aacggtgagt gtatccttgg 13320
cgtcgtttga aagtttgtga aacggtggcg atgctccgtt aaaggaccgg caacggatcg 13380
agcgatatgt aaatgggagg gcagaaatat tgcatacgcg ccggacacgc gcttatggca 13440
gtgatagtat ggaagtgata ggatttctt atataataat gatataactt aattttaaat 13500
aacatcgtac tatacgtttc aaaataaatt agagttttaa taaaattacg gaatgattaa 13560
accaattaca aacaaatata agtgtcggtg atataaaatt tgtaacaacg aaaacatttc 13620
aaaaaatctg aatgcggaaa tccataacat gagaatacga ttcgtttgca gtcacgccgg 13680
tttcttcacc ttctgagggt cctgaaaaag gttaataaac aatgggtaag ctaaagttta 13740
gtgatcatac acattacttg tctattatat gagttagata cattcacata tcacatacat 13800
acaagcatac acatattaca aaaaatcctc acacatattg ttggtaccaa ctactattta 13860
gtggaccagg ttattcttgg gggtcaattg tggttaacca taaatgtttg gagtttaggt 13920
tccccttggg ggccgaccat aaacacccat atcatatctc tgtctaggtt ctcttttgggg 13980
actgactata gacaactttg ctcagattct ccttggagga taaccatcct cgacgagatt 14040
aacaacggac caccactgtt ttcagcttgt aacctgcaac atcaatagtt gcgatcttcg 14100
gcgacaatga tgaaccaaca tcaacacaac agtagtgccg gtatgttagt cgttggataa 14160
tagaggcatc atctgaccct tttagcggtg acttttgttg cctatgaagg tcttatcagt 14220
tatatatcga ttaggcttgg ttctaggtta taagaaaaaa tgattctcta tccggtatga 14280
catagagaca aaccggtcta cttttataag aaaatcatat ttgaaacaat gtcgtgttaa 14340
taattaatat gtgtatgttt aaatttagaa tatcctgaac ttatatttag ttcgcaaccc 14400
tatgtaagat cgaactaatt ttaaaccgta accagacgtg catgtttgat cagtaataaa 14460
aaggctatca tcgtcgaaaa tattaaaaca aaatataata tcttatttgg cgccatttca 14520
tgtcaacggt taaaagcaag ttatcaacgc ctccaaccga tcatttctcc ggtaaccacc 14580
aactgctact aataaccgcc accgcaaaaa cctatatata caacttccat cacaattctg 14640
tccccctactc ccatttcaat ccaaaaaaagg ctacacagac atatacacg atggcagata 14700
atggcaacac cggccgtcaa aaggatgacg acggtggcca tgatggggga cgcccaaatc 14760
cgaccaccccc accctcccct tcccgcaccc cgcgaagacc caggcggacc acatcgccgc 14820
ctaaacattc tccgggggcg tcttcaagca ccatgccagc gccgcctact cccccctgcgc 14880
cgacgggaat caccggtgcg tctagttctt ctgtgggtac taatataatt tcatttactc 14940
cacccaaaac caaaagaacg aagtcggtga tttgtccgat ctgtaagaaa gatatgtgcc 15000
atgagaaggc gctgtgtggc cacatccggt ggcatactca ggaagaaaga ttggcggcca 15060
gcattgctat agcaagagcg ctatcttcta acgttgttgt ttctggcaat ggcgatgaag 15120
atgaaggtcc atctaaaaag tataaactcc cggacctgaa caagtcacca ccgccggagg 15180
aggaggacga ggacgctgcc tgattttctt gcgggagagg catgtatgtg tggcctttt 15240
gcaataatac tatgcatggg agatgcataa agtttatctt tattttgttt tagtttaata 15300
atgtgtggca aactttatat catttatgat ttcggccatg tactgctaca tcgttctagg 15360
atggttattc cctagaattt gcttttatat atttttttc ttcgttaatt cttctcttcc 15420
tttaacgtta tttcatgtga atttgcgata tcatgcatt gcaggaacgt aacttagaac 15480
tcaacgataa aaagtgtgtt gagatcgtgg aagttgatcg tttatcttga attcacaaga 15540
taagcaacat gagatagaat aattaattac tgcggagatt tcttttttaga ttcatcttat 15600
tcgttgtaaa ttgcaatgca aatttttaag tagaataacg aaagcgtgtt gttatttacg 15660
gttaaatgca aaaaatcatt aacatatctc cataattgat ttgtttagta tgcattctca 15720
tgtgttctat tgcaaaattc tattttgaaa ttcaattaaa gcaatgcatt ttagatataa 15780
agcaattcca tcacttaatt atattgggta gatttttacc aaatcactgt cctaaaagaa 15840
aaataaaaaa tgaaagttca atgccatagt gatcccgtca attatgtgat caatttttac 15900
cagagcaaaa ccccaaaagt taaagagtat aattgcagaa cgacaacaat ctgaggatga 15960
tactaactcc ggtataaacc gaatgctttt gtggggattt cactaatcaa ctatttggct 16020
ctcatcacaa ggccgtgtta atggattact attagttata aggccatccc aagttgtttg 16080
gctatattat tacctttaa aaaccaaaat gtgtaaactg taaaattaca cttttggttc 16140
```

```
ttgtattttc taattttag aattatgtat ttggttcttg tagtttttt atttgtatga    16200
atcatattag ttttggtcca cgataacttt tattttctat aattcacttt ttggtcattg    16260
tagttttaat ttgcaagaaa aaaataatct atcttttag tccatatata tagttttgcaa    16320
tattctatat tttaggttca ggttatatat cttttacaaa aatactactt atgattttt     16380
aatgaatata tcatatttcg taaattacat aaacattta taattta tttagtcaga        16440
actataggat tcgcatgata actttgctga acttaattgg gcttcattt taacaaagga    16500
taatgcatca tgcatgacat aaaaatttgt aatgtttcta atgtgcatgc actacaagaa    16560
cctgacccctt catatacatt aatgaatgat tctcttttct tattatatct tagcaaacgg   16620
tttggataag agtctgaaca atattaagaa ttgcactagc tagctagtcc atgcagcaag    16680
caaattaatt agaggacttt ttaagaggct tgatcacttc attgtatatc taatggcact    16740
gtggatatat gattggattg tgtgtatgta tggaatttaa tattactaaa aaatattaat    16800
gacaaacaat aacacactaa tttataactt acaaaagcgt gtgtcattaa agaaaatgtc    16860
atgttttctta aaatatggag aatttactac ttacataatt atgtgtcata aatttatgtc   16920
atcttgtgtg atatttatga cttacaaaaa tgtatgttat gtttatcgtc ataaaatctg    16980
taaaaaaaaa tagaaacatg gaggatactt tcaaggtgta gaaacttgac agcataaacg    17040
ggtttattac cttcatcaaa acttatctta cttcaatctc ttggagatgc aggttgattt    17100
taatgctaaa tgaacttttc aaatgtataa atatatatct tttgacggat ttgacattga    17160
tggagatgaa gatacaccag tgaattcacc tttcaatgat catactgaca taccaagtac    17220
tcttatcccc tctccaccte cacagaacga acctcaattt caaaaacgta actgccgctg    17280
ttctaaaaac agaaaatttt caaaaacgta actatcattt aaatatttaa tcatttttca    17340
attggattca tgctgtaata gaagttactg gactttaaac ttcttgtagc tgatgagatt    17400
catgaacgaa agtccaagga gattttccaa atcaacaagt ttctgatgag aacaaggtaa    17460
aaaaaataag ttttttcattt aaacatatga ttttggtttt caaaagataa ttaattatag   17520
gaactcttct gaaaagtccc aaagtttacc cgtaaaattg attttggttt tttttttaaat   17580
tgaataaaaa agtccataaa attggataaa ttattcgatt tagcccaatt tacctagtat    17640
atctggtaaa aattggttaa atcgaataat ttaggcagt tgttgggctt ttttgcgaaa    17700
aaacattatt ttgggactta atcgttaatt ttccccaagt ttcagtttat ttacagtatt   17760
ggaataaaac cgaacctagt gcgctaattt tgtctttgg tgtttagaat tattgggtt    17820
tattggtctc ggtttctaaa cgagtcggt ttttggttc ttgattcgat ttttggcttt    17880
tgggttcaac ccatgagttt tcgattggt tttggttttg ataatatttt ttgtgcaatc    17940
gttcaaaaaa tccgagttag attgggttta aatgttatca aaaccaaaac cgatggtaga    18000
accccaaaac tgaacccaat cgaaaatcca tgggttgaac ctcaaaaacg aacccaataa    18060
attctaaaaa ccaaaatcca aaattagcgg ataaaaattt taaatacat atctactggt    18120
aaggtgtttt tgacaattta tgtaaattat agaaaaaaat gtattaagtg tttgctattt    18180
aagataaaaa tggcgttaaa aatagaattg gttagaaatg aaccatttt ttatatttt     18240
tacttcattt attaagtaaa tagtagaggt gaattagaga tgatctaaga tatttttt    18300
ctttcaaaaa gagcttcgaa aacacttttc cgacagaaac aagacacaaa ccttttact     18360
cgtagaccga cgatttttt aaagatcaaa gacctcaaga gatttgtctc ccatcttctt    18420
aaaacatatg tgagatagac acttctagcc tcttctatgc taaaaaaaag agctcgcctt    18480
tagtttggtt aatttgagac aatggtctcc acaaaaacat aggtagttag gtactcacgc    18540
gccaagttac taatctcaaa tcaaacataa ctgtatgatc gtcaacacat tttacaagtt    18600
aacaaaagag cattgcttta gacttaaaaa ttgctttgag aaaaaacaaa cacctaagaa    18660
tttctaaaag cgatgattc aactctcttt aaaatgtata tatatgttac attttggtct    18720
ttaaactttt caagaaagta caattcaact cctatttttca aaatgttctt acatgagcga    18780
tatgattta ccgttaaaa tgtaaaccat gataactatt tctaaattcc aatttttgtt     18840
tcgttgatca atctcattat cattcaatgc atacaaaaca caatacaatc tgttttgtca    18900
tcttcttcaa ggccgaaaga caactaaaca tatgaagact gaagaggaca atctagcaaa    18960
ctcaaacttc actataaatt tgcaattgct attggtagcc atgaagtaac atttttgagg    19020
aggttaacaa aattttaaca gtaaattcaa taatccatca ccacgatatg taatcatcta    19080
cacaaacaca gatgatgata gtcatatatg ttcgtaatca cacaagcaag aaatcgcaat    19140
gtactttaca ccgtcttctc tgacttgaac acgggaattg gttgtctaag aagtagattg    19200
tttcccacgg atttaccaag tacatttaaa tccttcaccc tttgtatctc tcttcctgtt    19260
ttttgttttg caatcaacaa aaaaaaagt aaaaatccca tcttaaattc acgcaaaaaa     19320
acacattgaa tcaaccatca ctatagtagt ttcaagaaaa atctgcactt ccataatttc    19380
tttctattac accattatac taggaaaact tcatagcaat attatctaaa tacaaagcaa    19440
tttttactag taatattcgt agatttgtca atatatagtg tcctaataaa gaaaaaataa    19500
cggaactata atgctctaat aggtagattt ttttagtat aatgtcctaa taagagaaaa    19560
aacaaatgta caattatgta ataataagaa agaaagtaa tatgcttaat agacaaataa    19620
atgaaaccat gttgctattt cttgcatcta gtccttattt gaataatatg tagcatatta    19680
actacttatg aatttatat ataaatgata aaaaattccg tgag                     19724
```

SEQ ID NO: 11          moltype = AA   length = 227
FEATURE                Location/Qualifiers
source                 1..227
                       mol_type = protein
                       organism = Taraxacum officinale
SEQUENCE: 11
MSTVKSKLST PPTDHFSGNH QLLLITATAK TYIYNFHHNS VPYSHFNPKK ATQTYTAMAD    60
NGNTGRQKDD DGGHDGGRPN PTTPPSPSRT PRRPRRTTSP PKHSPGASSS TMPAPPTPPA   120
PTGITGASSS SLGTNIISFT PPKTKRTKSV ICPICKKDMC HEKALCGHIR WHTQEERLAA   180
SIAIARALSS NVVVSGNGDE DEGPSKKYKL PDLNKSPPPE EEDEDAA                 227

SEQ ID NO: 12          moltype = DNA   length = 3217
FEATURE                Location/Qualifiers
source                 1..3217
                       mol_type = unassigned DNA
                       organism = Taraxacum officinale
SEQUENCE: 12
gttgaaagga aggatcggca gagaacaaga ttgagagagt tttatcgaag agaagagatg    60

```
gttgtgttga ttgacggcag agttcagcaa tggcagatat gcgtgtttaa agcgcagttt    120
gtggacagtt tgtccaaagg ccttcaagtg ggagattgtt gagatgaaga ccctttttgac   180
caagtactta aatgtgattg gttgcatggg aaagagcttt acacttcatt ggttgaaaat    240
gaagcatgtt atttaatagt acgtctccac ttgttcttta tgaaggatga agacagccac    300
caagtcttta tgaatgtttc aaggagaaga caatgattag atgctgcctg ctcccttact    360
tcttcactat aaataggtgc ttaaggcacc tctcttctta caccaaacaa cacacaagtc    420
acagattaca aagattgaga gagttttcat ttttctctca gagtttgttt tgtcaaaagt    480
tttgtgtgca gattaattag ttgagagaca ctcctaatta atataaccac ttacacttgt    540
cattgattag cattctagtg tcagagagtt ctgagtgatt gtaacctttg tgtgatttat    600
atataaatct ctctcttgtt cgccagtgga cgtagctgat tatcctgatc agtgaaccac    660
ttaaaatatc gtgttgatat tatttatctg cagattattt taccagatag ttttattccg    720
caccgcaaag cataccgtcc attatttgtc agacgtacct actctcagct catcccagca    780
ggagttagac ctgcaggcag ccagccgtat tcacaacag tgaattatgc aacaaatgga     840
aacacacaat tatcgtagta cacatgtaat taacagggat cattttccat ttattgttcc    900
atcaattgcc aaatttaaaa gataacaaat gcatccttt tgaatggaaa agtatgatac     960
ataaaaccag agagaggtat acatttagtc cagaaacggt ggaaattact ttacctagag    1020
ttgcgtgaat caaatggaaa atcagaggaa gagaccctaa atcgcaatcc atcttctatt   1080
ccctatagaa tcaaatggaa atttcttact tccgaccttt ttcatttcca caagtttgta   1140
atcgataaga tcataaaaga aaaccgattt acattagcaa atctttaagg cagtttgtag   1200
ttctcaagta tgcgttacgt atgaaattct agacagaaaa gggacgacag ggaaaataat   1260
ggtgaataa ataacaatc aagaatcaaa agataataat ccttaaaact aacaaaaatt      1320
ctatcaataa gccctacaaa tgagaaatat gacggtgagt actcacctga ttgatgcgaa   1380
aaaaggaaag ccgccgacat ttgtgcttcc tcccgcgtta agaaaatcg cagatgacat     1440
tacgattctt tttctacaga ggaatagggg ggttgcgact ttgcgtgatt tgttgttaat   1500
gagtgatgcg tcgtccgttt tgatcggtag cccatggaga ctgatttatt tgacagatag   1560
atgtcgttct cgttgatgat gcaggtgtaa ttggcggcat tgtgaagcg aagatggcat    1620
agggaatgga tttgcagagg agaaaggag tttcacaat atggattatt gaattgtcgt     1680
ttcagagtcg cgatggttag taatcgatgg atttgggttt gcacctgttc aagggtggt    1740
gacgtgtctt actgtaagaa agagtcgcga tggttagtaa tcgacgatgg atttgggttt   1800
gcaacatcgt tgacggaaac gacgcggcga tggagagagg ggtagaggg aatgaaacgg    1860
gagatttacc ttcaaccgca aacatgtctt cgttcctcga aaatcatatg cgcccttat    1920
gaaaattcct tcacgcgccg tacacgcgct cagaaaaagc ataggttttt cttatataat   1980
aatgatataa cttaattta aataacatcg tactatacgt ttcaaaataa attagagttt    2040
taataaaatt acgaatgat taaacctatt acaaacaaat aaagtgtcg gtaatataaa      2100
atttgtaaca acgaaaacat ttcaaaaaat ctgaatgcgg aaatccataa catgagaata   2160
cgattcgttt gcagtcacgc cggtttcttc accttctgag ggtcctgaaa aaggttaata   2220
aacaatgggt aagctaaagt ttagggatca tacacattac ttgtctatta tatgagttag   2280
atacattcac atatcacata catacaagca tacacatatt acaaaaaatc ctaacacata   2340
tggttggtac caactactat ttagtggacc aggttattct tggggggtcaa ttgtgggtaa   2400
ccataaaatgt ttggagttta ggttctcttt gggggccgac cataaacacc catatcatat   2460
ctctgtctag gttctcttg gggactgact atagacaact ttgctcagat tctccttgga    2520
ggataaccat ccctcgacgag attaacacg gaccaccact gttttcagct tgtaacctgc   2580
aacatcaata gttgcgatct tcggcgacaa tgatgaacca acatcaacac aacagtagtg   2640
ccggtatgtt agtcgttgga taatagaggc atcatctgac cctttagcg gtgacttttg    2700
ttgcctatga aggtcttatc agttatatat cgattaggct tggttctagg ttataagaaa    2760
aaatgattct ctatccggta tgacatagag acaaaccggt ctactttat aagaaaatca     2820
tactcgtatt tgaaacgaaa atcatatttg aaacaatgct acattcatta ttaatatgtg   2880
tatgtttaaa tttagaatat cctgaactta tatttagttc gcaacccctat gtaagatcga  2940
actaatttta aaccgtaacc agacatgcat gtttgatcag taataaaaag gctatcatcg   3000
tcgaaaatat taaaacaaaa tataatttct tatttggcgc catttcatgt caacggttaa   3060
aagcaagtta tcaacgcctc caaccgatca ttttctccgt aaccaccaac tgctactaat   3120
aaccgccacc gcaaaaacct atatatacaa cttccatcac aattctgtcc cctactccca   3180
tttcaatcca aaaaaggcta cacagacata tacagcg                            3217

SEQ ID NO: 13           moltype = DNA   length = 684
FEATURE                 Location/Qualifiers
source                  1..684
                        mol_type = unassigned DNA
                        organism = Taraxacum officinale
SEQUENCE: 13
atgtcaacgg ttaaaagcaa gttatcaacg cctccaaccg atcatttctc cggtaaccac      60
caactgctac taataaccgc caccgcaaaa acctatatat acaacttcca tcacaattct     120
gtcccctact cccatttcaa tccaaaaaag gctacacaga catatacagc gatggcagat     180
aatggcaaca ccggccgtca aaaggatgac gacggtggcc atgatggggg acgcccaaat     240
ccgaccaccc caccctcccc ttcccgcacc ccgcgaagcc ccaggcggac cacatcgccc     300
cctaaacatt ctccggggc gtcttcaagc accatgccag cgccgcctac tcccctgcg      360
ccgacggaa tcaccggtgc gtctagttct tctctgggta ctaatataat ttcatttact     420
ccacccaaaa ccaaaagaac gaagtcggtg atttgtccga tctgtaagaa agatatgtgc    480
catgagaagg cgctgctgtgg ccacatccgg tggcatactc aggaagaaag attggcggcc    540
agcattgcta tagcaagagc gctatcttct aacgttgttg tttctggcaa tggcgatgaa     600
gatgaaggtc catctaaaaa gtataaactc ccggacctga acaagtcacc accgccggag     660
gaggaggacg aggacgctgc ctga                                            684

SEQ ID NO: 14           moltype = DNA   length = 3925
FEATURE                 Location/Qualifiers
source                  1..3925
                        mol_type = unassigned DNA
                        organism = Taraxacum officinale
SEQUENCE: 14
```

```
tttcttgcg ggagaggcat gtatgtgtgg cctttttgca ataatactat gcatgggaga     60
tgcataaagt ttatctttat tttgttttag tttaataatg tgtggcaaac tttatatcat    120
ttatgatttc ggccatgtac tgctacatcg ttctaggatg gttattccct agaatttgct    180
tttatatatt ttttttcttc gttaattctt ctcttccttt aacgttattt catgtgaatt    240
tgcgatatca tgatattgca ggaacgtaac ttagaactca acgataaaaa gtgtgttgga    300
atcgtggaag ttgatcgttt atcttgaatt cacaagataa gcaacatgag atagaataat    360
taattactgc ggagatttct ttttagattc atcttattcg ttgtaaattg caatgcaaat    420
ttttaagtag aataacgaaa gcgtgttgtt atttacggtt aaatgcaaaa aatcaataac    480
atatctccat aattgatttg tttagtatgc atttctcatg gttctattgc aaaattctat    540
tttgaaattc aattaaagca atgcatttta gatataaagc aattccatca cttaattata    600
ttgggtagat ttttaccaaa tcactgtcct aaaagaaaaa taaaaatga  aagttcaatg    660
ccatagtgat cccgtcaatt atgtgatcaa ttttaccag  agcaaaaccc caaaagttaa    720
agagtataat tgcagaacga caacaatctg aggatgatac taactccggt ataaaccgaa    780
tgcttttgtg gggatttcac taatcaacta tttggctctc atcacaaggc cgtgttaatg    840
gattactatt agtataagg  ccatcccaag ttgtttggct atattattac ctttttaaaaa    900
ccaaaatgtg taaactgtaa aattacactt ttggttcttg tattttctaa ttttttagaat    960
tatgtatttg gttcttgtag tttttttatt tgtatgaatc atattagttt tggtccacga   1020
taacttttat tttctataat tacacttttg gtcattgtag ttttaattg  caagaaaaaa   1080
ataatctatc ttttagtcc  atatatatag tttgcaatat tctatatttt aggttcaggt   1140
tatatatctt ttacaaaaat actacttatg attttttaat gaatatatca tatttcgtaa   1200
attacataaa cattttatat aatttatttt agtcagaact ataggattcg catgataact   1260
ttgctgaact taattgggct tcattttaa  caaaggataa tgcatcatgc atgacataaa   1320
aatttgtaat gttctaatg  tgcatgcact acaagaacct gacccttcat atacattaat   1380
gaatgattct ctttcttat  tatatcttag caaacgtttt ggataagagt ctgaacaata   1440
ttaagaattg cactagctag ctaggggagt ccatgcagca agcaaattaa ttagaggact   1500
ttttaagagg cttgatcact tcattgtata tctaatggca ctgtggatat atgattggat   1560
tgtgtgtatg tatggaattt aatattacta aaaaatatac atttaatgac aaacaataac   1620
acactaattt ataacttaca aaagcgtgta tcattaaaga aaatttcatg tttcttaaaa   1680
tatggagaat ttactactta cataattatg tgtcataaat ttatgtcatc ttgtgtgata   1740
tttatgactt acaaaaatgt atgtgatatt tatgacttac aaaaatgtat gttatgttta   1800
tcgtcataaa atctgtaaaa aaaaatagaa acatggagga tactttcaat gtgtagaaac   1860
ttgacagcat aaacaggttt attaccttca tcaaaactta tcttacttca atctcttgga   1920
gatgcaggtt gatttaatg  ctaaatgaac ttttcaaatg tataaatata tatctttga    1980
cggatttgac attgatggag gtgaagatac accagtgaat tcaccttttca atgatcatac   2040
tgacatacca agtactctta tccccctctcc acctccacag aacgaacctc aatttcaaaa   2100
acgtaactgc cgctgttcta aaaacagaaa attttcaaaa acgtaactat catttaaata   2160
tttaatcatt tttcaattgg attcatgctg taatagaagt tactggactt taaacttctt   2220
gtagctgatg agattcatga acaacagtcc aaggagattt tccaaatcaa caagtttctg   2280
atgagaacaa ggtaaaaaaa ataagttttt catttaaaca tatgattttg gtttttcaaaa   2340
gataattaat tataggaact cttctgaaaa gtcccaaagt ttacccgtaa aattgatttt   2400
ggttttttt  ttttaaattg aataaaaaag tccataaaat tggataaatt attcgattta   2460
gcccaattta cctagtatat ctggtaaaaa tgggttaaat cgaataattt aggcagtttg   2520
ttgggctttt ttgcgcaaaa acattatttt gggacttaat cgttaatttt ccccaagttt   2580
cagtttattt acagtattgg aataaaaccg aacctagtgc gctaattttg tcttttggtg   2640
tttagaatta tttgggttta ttggtctcgg tttctaaacg agttcggttt ttggtttctt   2700
gattcgattt ttggcttttg ggttcaaccc atggattttc gatttggttt tggttttgat   2760
aatatttttt gtgcaatcgt tcaaaaaatc cgagttagat tgggtttaaa tgttatcaaa   2820
accaaaaccg atggtagaac cccaaaactg aacccaatcg aaaatccatg ggttgaacct   2880
caaaaacgaa cccaataaat tctaaaaacc aaaatccaaa attagcggat aaaaatttta   2940
aaatacatat ctactggtaa ggtgtttttg acaatttatg taaattatag aaaaaaatgt   3000
attaagtgtt tgctatttaa gataaaaatg gcgttaaaaa tacaattggt tagaaagtaa   3060
ccatttttttt gttgtaaatg agtggtgcat caacgatggt ggatgccatc ttttccttcc   3120
accatataca tctttgtcaa acaccataca cacaaattct catatgtcaa agatattaat   3180
tatcatgtcc actgagtttg taatataaat agatgatcaa ttacaacgag aaatatacac   3240
tgaattctca ttctcaaatt gaagaatctc tctctctctc tctcatctct cagttttcaa   3300
agttttataa gttactagtt tatagtgttt ctaattactt catatttata acacgttatc   3360
agcacgagag ctctaagcaa gatatgcaat tacttaataa agtttataaa aataaacaaa   3420
tcataataaa caacatagat ataaaattaa ttattaccat ggacatgatg gactactaac   3480
atttatttc  ttatactaac atttattat  gttaactaac atttatttat gtttctaaca   3540
tttatttatg catactaaca tttatttatg ttaactaaca tttatttatg tttctaacat   3600
ttatttatgc atactaacat ttattttgt  tactaacttt tatttatgta tactaatgtt   3660
tatttatcaa atttatttaa catttactat ttttgatta  tatttttaa  ttagccgata   3720
gaatttattt atttaattat tctatttatt aaacttattt ttataaatat atatatatat   3780
ataaccgtta tatatataac ggctatatat ataacgtcta tatatata  acggctatat   3840
ttttacacta taaataaaca catcattctc cattttata  ccacaacaaa taatttctct   3900
catcttccaa atcatcaaga gaaaa                                          3925

SEQ ID NO: 15        moltype = DNA  length = 7826
FEATURE              Location/Qualifiers
source               1..7826
                     mol_type = unassigned DNA
                     organism = Taraxacum officinale
SEQUENCE: 15
gttgaaagga aggatcggca gagaacaaga ttgagagagt tttatcgaag agaagagatg     60
gttgtgttga ttgacggcag agttcagcaa tggcagatat gcgtgtttaa agcgcagttt    120
gtggacagtt tgtccaaagg ccttcaagtg ggagattgtt gagatgaaga ccctttttgac   180
caagtactta aatgtgattg gttgcatggg aaagagcttt acacttcatt ggttgaaaat    240
gaagcatgtt atttaatagt acgtctccac ttgttctttta tgaaggatga agacagccac   300
caagtctttta tgaatgtttc aaggagaaga caatgattag atgctgcctg ctcccttact   360
```

```
tcttcactat aaataggtgc ttaaggcacc tctcttctta caccaaacaa cacacaagtc    420
acagattaca aagattgaga gagttttcat tttctctcta gagtttgttt tgtcaaaagt    480
tttgtgtgca gattaattag ttgagagaca ctcctaatta atataaccac ttacacttgt    540
cattgattag cattctagtg tcagagagtt ctgagtgatt gtaacctttg tgtgatttat    600
atataaatct ctctcttgtt cgccagtgga cgtagctgat tatcctgatc agtgaaccac    660
ttaaaatatc gtgttgatat tatttatctg cagattattt taccagatag ttttattccg    720
caccgcaaag cataccgtcc attatttgtc agacgtacct actctcagct catcccagca    780
ggagttagac ctgcaggcag ccagccgtat ttcacaacag tgaattatgc aacaaatgga    840
aacacacaat tatcgtagta cacatgtaat taacagggat caatttccat ttattgttcc    900
atcaattgcc aaatttaaaa gataacaaat gcatccttttt tgaatggaaa agtatgatac    960
ataaaaccag agagaggtat acatttagtc cagaacggt ggaaattact ttacctagag     1020
ttgcgtgaat caaatggaaa atcagaggaa gagaccctaa atcgcaatcc atcttctatt    1080
ccctatagaa tcaaatggaa atttcttact tccgaccttt tcatttcca caagtttgta    1140
atcgataaga tcataaaaga aaaccgattt acattagcaa atcttttaagg cagtttgtag   1200
ttctcaagta tgcgttacgt atgaaattct agacagaaaa gggacgacag ggaaaataat    1260
ggtgaataa ataaacaatc aagaatcaaa agataataat ccttaaaact aacaaaaatt     1320
ctatcaataa gccctacaaa tgagaaatat gacggtggag actcacctga ttgatgcgag    1380
aaaaggaaag ccgccgacat ttgtgcttct tcccgcgtta agaaaaatcg cagatgacat    1440
tacgattctt tttctacaga ggaataggg ggttgcgact ttgcgtgatt tgttgttaat     1500
gagtgatgcg tcgtccgttt tgatcggtag cccatggaga ctgatttatt tgacagatag    1560
atgtcgttct cgttgatgat gcaggtgtaa ttggcggcgt tggtgaagcg aagatggcat    1620
agggaatgga tttgcagagg agaaaaggag tttcacaaat atggattatt gaattgtcgt    1680
ttcagagtcg cgatggttag taatcgatgg atttgggttt gcacctgttc aagggggtggt   1740
gacgtgtctt actgtaagaa agagtcgcga tggttagtaa tcgacgatgg atttgggttt    1800
gcaacatcgt tgacgaaaac gacgcggcga tggagagagg cggtagaggg aatgaaacgg    1860
gagatttacc ttcaaccgca aacatgtctt cgttcctcga aaatcatatg cgccctttat    1920
gaaaattcct tcacgcgccc tacacgcgct cagaaaaagc atagggtttt cttatataat    1980
aatgatataa cttaattttta aataacatcg tactatacgt ttcaaaataa attagagttt    2040
taataaaatt acgaatgat taaacctatt acaaacaaat ataagtgtcg gtaatataaa     2100
atttgtaaca acgaaaacat ttcaaaaaat ctgaatgcgg aaatccataa catgagaata    2160
cgattcgttt gcagtcacgc cggtttcttc accttctgag ggtcctgaaa aaggttaata    2220
aacaatgggt aagctaaagt ttagggatca tacacattac ttgtctatta tatgagttag    2280
atacattcac atatcacata catacaagca tacacatatt acaaaaaatc ctaacacata    2340
tggttggtac caactactat ttagtggacc aggttattct tgggggtcaa ttgtggttaa    2400
ccataaatgt ttggagttta ggttctcttt gggggccgac cataaacacc catatcatat    2460
ctctgtctag gttctctttg gggactgact atagacaact ttgctcagat tctccttgga    2520
ggataaccat cctcgacgag attaacaacg gaccaccact gttttcagct tgtaacctgc    2580
aacatcaata gttgcgatct tcggcgacaa tgatgaacca acatcaacac aacagtagtg    2640
ccggtatgtt agtcgttgga taatagaggc atcatctgac ccttttagcg gtgacttttg    2700
ttgcctatga aggtcttatc agttatatat cgattaggct tggttctagg ttataagaaa    2760
aaatgattct ctatccggta tgacatagag acaaaccggt ctactttat aagaaaatca     2820
tactcgtatt tgaaacgaaa atcatatttg aaacaatgtc gtgttaataa ttaatatgtg    2880
tatgtttaaa tttagaatat cctgaactta tatttagttc gcaaccctat gtaagatcga    2940
actaatttta aaccgtaacc agacatgcat gtttgatcag taataaaag gctatcatcg      3000
tcgaaaatat taaaacaaaa tataattttct tatttggcgc catttcatgt caacggttaa   3060
aagcaagtta tcaacgcctc caaccgatca tttctccggt aaccaccaac tgctactaat    3120
aaccgccacc gcaaaaaacct atatatacaa cttccatcac aattctgtcc cctactccca   3180
tttcaatcca aaaaaggcta cacagacata tacagcgatg tcaacggtta aaagcaagtt    3240
atcaacgcct ccaaccgatc atttctccgg taaccaccaa ctgctactaa taaccgccac    3300
cgcaaaaacc tatatataca acttccatca caattctgtc cctactccc attttcaatcc    3360
aaaaaaggct acacagacat atacagcgat ggcagataat ggcaacaccg gccgtcaaaa    3420
ggatgacgac ggtggccatg atgggggacg cccaaatccg accacccac cctccccttc    3480
ccgcaccccg cgaagaccca ggcggaccac atcgccgcct aaacattctc cggggggcgtc   3540
ttcaagcacc atgccagcgc cgcctactcc ccctgcgccg acgggaatca ccggtgcgtc    3600
tagttcttct ctgggtacta atataatttc atttactcca cccaaaacca aaagaacgaa    3660
gtcggtgatt tgtccgatct gtaagaaaga tatgtgccat gagaaggcgc tgtgtggcca    3720
catccggtgg catactcagg aagaaagatt ggcggccagc attgctatag caagagcgct    3780
atcttctaac gttgttgttt ctggcaatgg cgatgaagat gaaggtccat ctaaaaagta    3840
taaactcccg gacctgaaca gtcaaccacc gccggaggag gaggacgagg acgctgcctg    3900
attttcttgc gggagaggca tgtatgtgtg gcctttttgc aataactact a tgcatgggag   3960
atgcataaag tttatcttta ttttgtttta gttaataat gtgtggcaaa ctttatatca     4020
tttatgattt cggccatgta ctgctacatc gttctaggat ggttattccc tagaatttgc    4080
ttttatatat ttttttctt cgttaattct tctcttcctt taacgttatt tcatgtgaat     4140
ttgcgatatc atgatattgc aggaacgtaa cttagaactc aacgataaaa agtgtgttga    4200
gatcgtggaa gttgatcgtt tatcttgaat tcacaagata agcaacatga gatagaataa    4260
ttaattactg cggagatttc ttttttagatt catcttattc gttgtaaatt gcaatgcaaa    4320
tttttaagta gaataacgaa agcgtgttgt tatttacggt taaatgcaaa aaatcaataa    4380
catatctcca taattgtttt gtttagtatg cattctcatg tgttctattg caaaattcta    4440
ttttgaaatt caattaaagc aatgcatttt agatataagt caattccatc acttaattat    4500
attgggtaga ttttttaccaa atcactgtcc taaaagaaaa ataaaaaatg aaagttcaat    4560
gccatagtga tcccgtcaat tatgtgatca attttttacca gagcaaaacc ccaaaagtta    4620
aagagtataa ttgcagaacg acaacaatct gaggatgata ctaactccgg tataaaccga    4680
atgcttttgt ggggatttca ctaatcaact attttggctct catcacaagg ccgtgttaat    4740
ggattactaa tagttataag gccatcccaa gttgtttggc tatattatta ccttttaaaa    4800
accaaaatgt gtaaactgta aaattacact tttggttctt gtattttcta attttttagaa   4860
ttatgtatt ggttctgta gttttttat ttgtatgaat catattagtt ttggtccacg         4920
ataacttta ttttctataa ttcactttt ggtcattgta gttttaattt gcaagaaaaa        4980
aataatctat cttttttagtc catatatata gtttgcaata ttctatattt taggttcagg    5040
ttatatatct tttacaaaaa tactacttat gatttttaa tgaatatatc atatttcgta      5100
```

```
aattacataa acattttata taattttatt tagtcagaac tataggattc gcatgataac   5160
tttgctgaac ttaattgggc ttcattttta acaaaggata atgcatcatg catgacataa   5220
aaatttgtaa tgtttctaat gtgcatgcac tacaagaacc tgacccttca tatacattaa   5280
tgaatgattc tcttttctta ttatatctta gcaaacggtt tggataagag tctgaacaat   5340
attaagaatt gcactagcta gctagggag tccatgcagc aagcaaatta attagaggac    5400
ttttttaagag gcttgatcac ttcattgtat atctaatggc actgtggata tatgattgga   5460
ttgtgtgtat gtatggaatt taatattact aaaaaatata catttaatga caaacaataa   5520
cacactaatt tataacttac aaaagcgtgt atcattaaag aaaatttcat gtttcttaaa   5580
atatggagaa tttactactt acataattat gtgtcataaa tttatgtcat cttgtgtgat   5640
atttatgact tacaaaaatg tatgtgatat ttatgactta caaaaatgta tgttatgttt   5700
atcgtcataa aatctgtaaa aaaaaataga aacatggagg atactttcaa tgtgtagaaa   5760
cttgacagca taaacaggtt tattaccttc atcaaaactt atcttacttc aatctcttgg   5820
agatgcaggt tgattttaat gctaaatgaa cttttcaaat gtataaatat atatcttttg   5880
acggatttga cattgatgga gatgaagata caccagtgaa ttcaccttc aatgatcata    5940
ctgacatacc aagtactctt atcccctctc cacctccaca gaacgaacct caatttcaaa   6000
aacgtaactg ccgctgttct aaaaacagaa aattttcaaa aacgtaacta tcatttaaat   6060
atttaatcat ttttcaattg gattcatgct gtaatagaaa ttactggact ttaaacttct   6120
tgtagctgat gagattcatg aacaacagtc caaggagatt ttccaaatca acaagtttct   6180
gatgagaaca aggtaaaaaa aataagtttt tcatttaaac atatgatttt ggttttcaaa   6240
agataattaa ttataggaac tcttctgaaa agtcccaaag tttacccgta aaattgattt   6300
tggtttttt tttttaaatt gaataaaaaa gtccataaaa ttggataaat tattcgatt    6360
agcccaattt acctagtata tctggtaaaa atgggtaaaa tcgaataatt taggcagttt   6420
gttgggcttt tttgcgcaaa acattattt tgggacttaa tcgttaattt tccccaagtt    6480
tcagtttatt tacagtattg gaataaaacc gaacctagtg cgctaattt gtcttttggt    6540
gtttagaatt atttgggttt attggtctcg gtttctaaac gagttcggtt tttggttttct   6600
tgattcgatt tttggcttt gggttcaacc catggatttt cgatttgtt ttggttttga    6660
taatattttt tgtgcaatcg ttcaaaaaat ccgagttaga ttgggtttaa atgttatcaa   6720
aaccaaaacc gatggtagaa ccccaaaact gaacccaatc gaaaatccat gggttgaacc   6780
tcaaaaacga acccaataaa ttctaaaaac caaaatccaa aattagcgga taaaaatttt   6840
aaaatacata tctactggta aggtgttttt gacaattat gtaaattata gaaaaaaatg    6900
tattaagtgt ttgctatta agataaaaat ggcgttaaaa atacaattgg ttagaaatga   6960
accattttt tgttgtaaat gagtggtgca tcaacgatgg tggatgccat ctttccttc    7020
caccatatac atctttgtca aacaccatac acacaaattc tcatatgtca aagatattaa   7080
ttatcatgtc cactgagttt gtaatataaa tagatgatca attacaacga gaaatataca   7140
ctgaattctc atttctaaat tgaagaatct ctctctctct ctctcatctc tcagttttca   7200
aagttttata agttactagt ttatagtgtt tctaattact tcatatttat aacacgttat   7260
cagcacgaga gctctaagca agatatgcaa ttacttaata aagtttataa aaataaacaa   7320
atcataataa acaacataga tataaaatta attattacca tggacatgat ggactactaa   7380
cattttattt cttatactaa catttattta tgttaactaa catttattta tgtttctaac   7440
atttatttat gcatactaac atttatttat gttaactaac atttatttat gtttctaaca   7500
tttatttatg catactaaca tttatttatg ttactaactt ttatttatgt atactaatgt   7560
ttatttcatca aatttatta acatttacta tttttgatt atatttttta attagccgat    7620
agaatttatt tatttaatta ttctatttat taaacttatt tttataaata tatatata     7680
tataaccgtt atatatataa cggctatata taaacgtctt atatatatat aacggctata   7740
tttttacact ataaataaac acatcattct ccatttttat accacaacaa ataatttctc   7800
tcatcttcca aatcatcaag agaaaa                                        7826

SEQ ID NO: 16            moltype = DNA   length = 1547
FEATURE                  Location/Qualifiers
source                   1..1547
                         mol_type = unassigned DNA
                         organism = Lactuca sativa
SEQUENCE: 16
tcaatttcga tcttgactac catgaatgtc atatttatat gacatactta taagaaatta     60
taatacaaat ttgattttaa aataaaataa aaactttttt cataacggat attttgtttc    120
gtataaaaag aataccgtaa gattaaatta aaataaacaa tccgttaaac tgacataata    180
taatattgga aaataaaaaa atatatatgt tttcataaaa aaaaaaactt caagtttgga    240
tcagatttag gaaaagtaaa acctatatt tagttgatga ccgttttacc ataaacaatt     300
atcagtttgt gctgggttaa ttgttaataa aaataatatt aaaattaat tgaatataac     360
atgaatatat aatttttttt tggaaaaact tcttttaaaa tgttacataa attacgatta    420
aatatttta ataccaaatt atatagtatc tggattaaag aggtcaaaaa gtaaacttta     480
aaaaataaaa aaaataaata atagattaat ataagttaga ggacttcaat tattttcat    540
gtggacccctt ctaaaagaac ctattttac aaatagattt aaaaccaatc tattttggga   600
aatggctctcc taaatcaatc aaattttata aaaaaactcc aaccactata aatatataac   660
aattttattc gatcggttaa atagttagaa ttataacaaa ataaaaaca agataatttc     720
ttcaaaataa tttgaaataa aaaataaggt gtcaaaaatg aacttttatg taaacttaac    780
atcatttgtc atttttgtta caaaacatga ttaatattat tactttgtaa gtgtccactt    840
ttcttcaaac tccttgctta gttaaaaaaa tctataatat atgaaattaa tttttagttt   900
cttaaactac atatataatt attttttatc aaacttgaat taaaagccta tgacaatac    960
caaaatgaaa tagtatgact tatacatttg ccgttgacta ataaaccaaa aaatcgaatt   1020
gacatcagac caaaaccagc tctgtatata ttggttatgt tatgggttat atagagttgt   1080
ttaaaaggca gttatcgatt acgttctcag ttctagagtt ttcacaaaaa tcaattctcc   1140
tgtatcacat cgaaagcaaa ccggtctatt tataaaagag atacatattt gaacaacat    1200
aatatttaat tatatttatg tgttgtttat aaatctagaa acccgtaaat ttatatttag   1260
ttcagtatcc aatataggat ctgaaactac tttataaccg ttaccagaca aataccggtc   1320
aagtttatat tggtgtagtt ttcgattcct tgatttat atcttttgg cgccatttca      1380
cgtcaacggt ttaaaacaa gttatcgttt ctccggtaca gttaaccacc aaccgccaca   1440
aataaccgtc accggaatac ctataaatac aacttccatt tcaatcgtct ctctctgcac   1500
tcccattctt tgaatccaaa aaaggctaca cacacacaca gacaaca                 1547
```

| SEQ ID NO: 17 | moltype = DNA length = 1532 |
| --- | --- |
| FEATURE | Location/Qualifiers |
| misc_feature | 1..1532 |
| | note = Lactuca sativa LSAT_8X112340 promoter without 2 MYB binding sites |
| source | 1..1532 |
| | mol_type = other DNA |
| | organism = synthetic construct |

SEQUENCE: 17

```
tcaatttcga tcttgactac catgaatgtc atatttatat gacatactta taagaaatta   60
taatacaaat ttgattttaa aataaaataa aaactatttt cataacggat attttgtttc  120
gtataaaaag aataccgtaa gattaaatta aaataaacaa tccgttaaac tgacataata  180
taatattgga aaataaaaaa atatatatgt tttcataaaa aaaaaaactt caagtttgga  240
tcagatttag gaaaagtaaa accttatatt tagttgatga ccgttttacc ataaacaatt  300
atcagtttgt gctgggttaa ttgttaataa aaataatatt aaaatttaat tgaatataac  360
atgaatatat aattttttt  tggaaaaact tcttttaaaa tgttacataa attacgatta  420
aatatttta  ataccaaatt atatagtatc tggattaaag aggtcaaaaa gtaaacttta  480
aaaaataaaa aaaataaata atagattaat ataagttaga ggacttcaat tatttttcat  540
gtggacccctt ctaaaagaac ctattttttac aaatagattt aaaaccaatc tatttttgga  600
aatggtctcc taaatcaatc aaattttata aaaaaactcc aacactatca aatatataac  660
aattttattc gatcggttaa atagttagaa ttataacaaa ataaaaaaca agataatttt  720
ttcaaaataa tttgaaataa aaaataaggt gtcaaaaatg aacttttatg taaacttaac  780
atcatttgtc attttgtta  caaaacatga ttaatattat tactttgtaa gtgtccactt  840
ttcttcaaac tccttgctta gttaaaaaaa tctataatat atgaaattaa ttttagtttt  900
cttaaactac atatataatt attttttatc aaacttgaat taaaagccta tgacaataac  960
caaaatgaaa tagtatgact tatacatttg ccgttgacta ataaaccaaa aaatcgaatt 1020
gacatcagac caaaaccagc tctgtatata ttggttatgt tatgggttat atagagttgt 1080
ttaaaaggca gttatcgatt acgttctcag ttctagagtt ttcacaaaaa tcaattctcc 1140
tgtatcacat cgaaagcaaa ccggtctatt tataaaagag atacatattt gaaacaacat 1200
attttttaat tatatttatg tgttgttat  aaatctagaa acccgtaaat ttatatttag 1260
ttcagtatcc aatataggat ctgaaactac tttataaccg ttaccagaca aataccggtc 1320
aagtttatat tggtgtagtt ttcgattcct ttgattttat atcttttttgg cgccatttca 1380
cgtcaacggt ttaaaaacaa gttatcgttt ctccggtaca gttaaccacc caaataccgg 1440
aatacctata aataacaactt ccatttcaat cgtctctctc tgcactccca ttctttgaat 1500
ccaaaaaagg ctacacacac acacagacaa ca                               1532
```

| SEQ ID NO: 18 | moltype = DNA length = 2882 |
| --- | --- |
| FEATURE | Location/Qualifiers |
| misc_feature | 1..2882 |
| | note = Lactuca sativa LSAT_8X112340 promoter with Taraxacum officinale Par allele MITE insertion |
| source | 1..2882 |
| | mol_type = other DNA |
| | organism = synthetic construct |

SEQUENCE: 18

```
tcaatttcga tcttgactac catgaatgtc atatttatat gacatactta taagaaatta   60
taatacaaat ttgattttaa aataaaataa aaactatttt cataacggat attttgtttc  120
gtataaaaag aataccgtaa gattaaatta aaataaacaa tccgttaaac tgacataata  180
taatattgga aaataaaaaa atatatatgt tttcataaaa aaaaaaactt caagtttgga  240
tcagatttag gaaaagtaaa accttatatt tagttgatga ccgttttacc ataaacaatt  300
atcagtttgt gctgggttaa ttgttaataa aaataatatt aaaatttaat tgaatataac  360
atgaatatat aattttttt  tggaaaaact tcttttaaaa tgttacataa attacgatta  420
aatatttta  ataccaaatt atatagtatc tggattaaag aggtcaaaaa gtaaacttta  480
aaaaataaaa aaaataaata atagattaat ataagttaga ggacttcaat tatttttcat  540
gtggacccctt ctaaaagaac ctattttttac aaatagattt aaaaccaatc tatttttgga  600
aatggtctcc taaatcaatc aaattttata aaaaaactcc aacactatca aatatataac  660
aattttattc gatcggttaa atagttagaa ttataacaaa ataaaaaaca agataatttt  720
ttcaaaataa tttgaaataa aaaataaggt gtcaaaaatg aacttttatg taaacttaac  780
atcatttgtc attttgtta  caaaacatga ttaatattat tactttgtaa gtgtccactt  840
ttcttcaaac tccttgctta gttaaaaaaa tctataatat atgaaattaa ttttagtttt  900
cttaaactac atatataatt attttttatc aaacttgaat taaaagccta tgacaataac  960
caaaatgaaa tagtatgact tatacatttg ccgttgacta ataaaccaaa aaatcgaatt 1020
gacatcagac caaaaccagc tctgtatata ttggttatgt tatgggttat atagagttgt 1080
ttaaaaggca gttatcgatt acgttctcag ttctagagtt ttcacaaaaa tcaattctcc 1140
tgtatcacat cgaaagcaaa ccggtctatt tataaaagag atacatattt gaaacaacat 1200
attttttaat tatatttatg tgttgttat  aaatctagaa acccgtaaat ttatatttag 1260
ttcagtatcc aatataggat ctgaaactac tttataaccg ttaccagaca aataccggtc 1320
aagtttatat tggtgtagtt ttcgattcct ttgattttat atcttttttgg cgccatttca 1380
cgtcaacggt ttaaaaacaa gttatcgttt ctccggtaca gttaaccacc actgctacca 1440
gggccggcca aaggctgtg  cggcttgggc tgtggcacag gggcagcaga tttagtccat 1500
ttattatggt ctgctattta tttgggtcca ataagatcag ggcactaaaa ctcaaataca 1560
tcaattcaag tcggcggcaa aagaataaaa agcgccaatt tttagaagac aaggagacag 1620
cacaataatc gctctttcc  aatggccaat taatttagc  cttttgtgagg tataaatatg 1680
aatcactttt tctccaaata tcattattgt aaactagtaa agagcgtaaa ttgttttatc 1740
gctaatcttc ttcttttttca aatataattg tttgattctt tgtagtaggt acgttaagtt 1800
ttatatcatt cgtcctggaa accttttctt atgccccttc aatttatgaa tttgtgtttt 1860
gtattgtctt gctattaatc caatgcaaac taattctgcc gcatcgatct cacagagttg 1920
gagcagctta aaaggagttt tggggcaact taaaatgagg gtagcttttt tgttgttgtt 1980
```

```
ggtctactat ttactttggt cctatcgtt ttagttttgt gttcattgag gatttgaatg    2040
actttgaaca caagtttata aaactaagtt tttgtgattc taaattttg atgtgtgcaa    2100
ccgactaaat gaatataaaa ttctgatttg tgtatttctg atttctgatt taccggttat   2160
tcattatgtt tttctggatc tcatatgaat ttagtatata aaaatctcag gttcttctta   2220
ctcagtctag tatattttgg cattggggat caggggttaaa atcatcattt ttctaagcac  2280
taacaagctt taaaaccatc aattaaaagt tagttctcca tacctggaat tgtttattgc   2340
tttagtattc atttcatagt gtcaatacct tacaactgtt tattgttttc aaatgtttac   2400
tgttttgcac tttagttgtt tttagcatgt ttcaactttc aaagttaatt gacgatagtg   2460
tcatatacga aatatcatca ctcatacaaa attaaactgg atagaatttt ttccgatgaa   2520
atctattttt aaatagttac gaatataata ggagacttaa tatgtttgtt tcaaaattac   2580
acaaaaacac catggaaatg ggcattagtt tgtataagca tccttttaaa tataaagctt   2640
tgttacattg atgccttcta aatatataat attgtaatga tttgtagtaa acaccatgga   2700
aatgggcatt attaagatgt ttcgcccagg gcatgaaaaa ctatcggacc ggccctgact   2760
gctacaaccg ccacaaataa ccgtcaccgg aatacctata aatacaactt ccatttcaat   2820
cgtctctctc tgcactccca ttctttgaat ccaaaaaagg ctacacacac acagacaa    2880
ca                                                                  2882

SEQ ID NO: 19            moltype = DNA   length = 20
FEATURE                  Location/Qualifiers
misc_feature             1..20
                         note = target specific sequence of RNA-1
source                   1..20
                         mol_type = other DNA
                         organism = synthetic construct
SEQUENCE: 19
catccggtgg catacacagg                                               20

SEQ ID NO: 20            moltype = DNA   length = 1148
FEATURE                  Location/Qualifiers
misc_feature             1..1148
                         note = Lactuca sativa LSAT_8X112340 promoter with deletion
source                   1..1148
                         mol_type = other DNA
                         organism = synthetic construct
SEQUENCE: 20
tcaatttcga tcttgactac catgaatgtc atatttatat gacatactta taagaaatta    60
taatacaaat ttgattttaa aataaaataa aaactatttt cataacggat attttgtttc   120
gtataaaaag aataccgtaa gattaaatta aaataaacaa tccgttaaac tgacataata   180
taatattgga aaataaaaaa atatatatgt tttcataaaa aaaaaactt caagtttgga   240
tcagatttag gaaagtaaa accttatatt tagttgatga ccgttttacc ataaacaatt   300
atcagtttgt gctgggttaa ttgttaataa aaataatatt aaaatttaat tgaatataac   360
atgaatatat aattttttt tggaaaaact tctttaaaa tgttacataa attacgatta   420
aatattttta ataccaaatt atatagtatc tggattaaaa aggtcaaaaa gtaaacttta   480
aaaaataaaa aaaatataaata atagattaat ataagttaga ggacttcaat tattttcat   540
gtggacccct ctaaaagaac ctattttac aaatagattt aaaaccatc tattttgga   600
aatggtctcc taaatcaatc aaattttata aaaaaactcc aacactatca aatatataac   660
aattttattc gatcggttaa atagttagaa ttataacaaa ataaaaaaca agataatttt   720
ttcaaaataa tttgaaataa aaaataaggt gtcaaaaatg aacttttatg taaacttaac   780
atcatttgtc atttttgtta caaaacatga ttaatattat tactttgtaa gtgtccactt   840
ttcttcaaac tccttgctta gttaaaaaaa tctataatat atgaaattaa ttttagttt   900
cttaaactac atatataatt attttttatc aaacttgaat taaaagccta tgacaataaa   960
caaaatgaaa tagtatgact tatacatttg ccgttgacta ataaaccaaa aaatcgaatt  1020
gacatcagac caaccgccac aaataaccgt caccggaata cctataaata caacttccat  1080
ttcaatcgtc tctctctgca ctcccattct ttgaatccaa aaaggctac acacacacac  1140
agacaaca                                                          1148

SEQ ID NO: 21            moltype = AA   length = 89
FEATURE                  Location/Qualifiers
source                   1..89
                         mol_type = protein
                         organism = Helianthus annuus
SEQUENCE: 21
MSSPSKNKSK SSICPVCKRD LCHEKALNGH IRWHTQQERE AAGIGNAKAV ASASVVIRDA    60
NVRRPETSKP VKLPDLNKSP PREEDKDAA                                      89

SEQ ID NO: 22            moltype = AA   length = 157
FEATURE                  Location/Qualifiers
source                   1..157
                         mol_type = protein
                         organism = Lactuca sativa
SEQUENCE: 22
MADDGNTARQ QADAGGHGNA RPNSSTPPSS PSQPPRRPRR AGATTPSKLS QAASSSTNLP    60
PPPTPTPTPP TPSADGILLG TARRPVICPI CKKDMYHEKA LCGHIRWHTQ EERLAASRDI   120
ARALSANVVS GQRGDGEQGP SKRFKLPDLN EPPPSED                            157

SEQ ID NO: 23            moltype = DNA   length = 36
FEATURE                  Location/Qualifiers
source                   1..36
                         mol_type = unassigned DNA
```

```
                            organism = Taraxacum officinale
SEQUENCE: 23
tgtggccaca tccggtggca tacacaggag gaaaga                                      36

SEQ ID NO: 24           moltype = DNA   length = 37
FEATURE                 Location/Qualifiers
misc_feature            1..37
                        note = pKG10821-1
source                  1..37
                        mol_type = other DNA
                        organism = synthetic construct
SEQUENCE: 24
tgtggccaca tccggtggca tacaccagga ggaaaga                                     37

SEQ ID NO: 25           moltype = DNA   length = 37
FEATURE                 Location/Qualifiers
misc_feature            1..37
                        note = pKG10821-4
source                  1..37
                        mol_type = other DNA
                        organism = synthetic construct
SEQUENCE: 25
tgtggccaca tccggtggca tacacaagga ggaaaga                                     37

SEQ ID NO: 26           moltype = DNA   length = 35
FEATURE                 Location/Qualifiers
misc_feature            1..35
                        note = pKG10821-5
source                  1..35
                        mol_type = other DNA
                        organism = synthetic construct
SEQUENCE: 26
tgtggccaca tccggtggca tacaaggagg aaaga                                       35

SEQ ID NO: 27           moltype = DNA   length = 33
FEATURE                 Location/Qualifiers
misc_feature            1..33
                        note = pKG10821-6
source                  1..33
                        mol_type = other DNA
                        organism = synthetic construct
SEQUENCE: 27
tgtggccaca tccggtggca taaggaggaa aga                                         33

SEQ ID NO: 28           moltype = AA    length = 12
FEATURE                 Location/Qualifiers
REGION                  1..12
                        note = pKG10821-1
source                  1..12
                        mol_type = protein
                        organism = synthetic construct
SEQUENCE: 28
CGHIRWHTPG GK                                                                12

SEQ ID NO: 29           moltype = AA    length = 12
FEATURE                 Location/Qualifiers
REGION                  1..12
                        note = pKG108121-4
source                  1..12
                        mol_type = protein
                        organism = synthetic construct
SEQUENCE: 29
CGHIRWHTQG GK                                                                12

SEQ ID NO: 30           moltype = AA    length = 11
FEATURE                 Location/Qualifiers
REGION                  1..11
                        note = pKG10821-5
source                  1..11
                        mol_type = protein
                        organism = synthetic construct
SEQUENCE: 30
CGHIRWHTRR K                                                                 11

SEQ ID NO: 31           moltype = AA    length = 11
FEATURE                 Location/Qualifiers
REGION                  1..11
                        note = pKG10821-6
source                  1..11
```

```
                        mol_type = protein
                        organism = synthetic construct
SEQUENCE: 31
CGHIRWHKEE R                                                         11

SEQ ID NO: 32           moltype = AA  length = 12
FEATURE                 Location/Qualifiers
source                  1..12
                        mol_type = protein
                        organism = Taraxacum officinale
SEQUENCE: 32
CGHIRWHTQE ER                                                        12

SEQ ID NO: 33           moltype = DNA  length = 474
FEATURE                 Location/Qualifiers
misc_feature            1..474
                        note = Lactuca sativa LSAT_8X112340 coding sequence
source                  1..474
                        mol_type = other DNA
                        organism = synthetic construct
SEQUENCE: 33
atggcagatg atggcaacac cgcccgtcaa caggctgacg ccggtggcca tggaaacgca   60
cgtccaaaact catccacccc cccttcgtca ccctcccaac ctccaagaag accacgccgt  120
gccggagcca ctacaccgtc aaagctttcc caggcggcat cttcgtcaac aaatcttcca  180
ccgccgccaa cgccaacacc aactccgccc accccttctg ccgacgggat attactaggt  240
actgcaagaa ggccggtaat atgcccgatt tgcaaaaagg atatgtatca tgaaaaggcg  300
ctgtgtggcc acatccggtg gcacacgcag gaggagagac tggcggcaag cagggatatt  360
gcccgggcgc tttctgccaa cgttgtttct gggcaaagag gcgatggaga caagggccg  420
tctaaacggt caaactgcc ggatcttaac gagccaccac cgtcggagga ctga         474

SEQ ID NO: 34           moltype = DNA  length = 3021
FEATURE                 Location/Qualifiers
misc_feature            1..3021
                        note = LsPromtoter_LsCoding sequence_To3'UTR
source                  1..3021
                        mol_type = other DNA
                        organism = synthetic construct
SEQUENCE: 34
tcaatttcga tcttgactac catgaatgtc atatttatat gacatactta taagaaatta   60
taatacaaat ttgattttaa aataaaataa aaactatttt cataacggat attttgtttc  120
gtataaaaag aataccgtaa gattaaatta aaatataaca tccgttaaac tgacataata  180
taatattgga aaataaaaaa atatatatgt tttcataaaa aaaaaaactt caagtttgga  240
tcagatttag gaaaagtaaa accttatatt tagttgatga ccgttttacc ataaacaatt  300
atcagtttgt gctgggttaa ttgttaataa aaataatatt aaaatttaat tgaatataac  360
atgaatatat aattttttt tggaaaaact tcttttaaaa tgttacataa attacgatta  420
aatatttta ataccaaatt atatagtatc tggattaaag aggtcaaaaa gtaaacttta  480
aaaaataaaa aaaataaata atagattaat ataagttaga ggacttcaat tattttttcat  540
gtggacccct ctaaaagaac ctattttac aaatagattt aaaaccaatc tattttgga  600
aatggtctcc taaatcaatc aaattttata aaaaaactcc aacactatca aatatataac  660
aatttattc gatcggttaa atagttagaa ttataacaaa ataaaaaca agataatttt  720
ttcaaaataa tttgaaataa aaaataaggt gtcaaaaatg aacttttatg taaacttaac  780
atcatttgtc attttgtta caaaacatga ttaatattat tactttgtaa gtgtccactt  840
ttcttcaaac tccttgctta gttaaaaaaa tctataaat atgaaattaa ttttagtttt  900
cttaaactac atatatataatt attttttttatc aaacttgaat taaaagccta tgacaataac  960
caaaatgaaa tagtatgact tatacatttg ccgttgacta aaaaccaaaa aaatcgaatt  1020
gacatcagac caaaaccagc tctgtatata ttggttatgt tatgggttat atagagttgt  1080
ttaaaaggca gttatcgatt acgttctcag ttctagagtt ttcacaaaaa tcaattctcc  1140
tgtatcacat cgaaagcaaa ccggtctatt tataaaagag atacatattt gaacaacat  1200
atttttaat tatatttatg tgttgtttat aaatctagaa acccgtaaat ttatatttag  1260
ttcagtatcc aatataggat ctgaaaactac tttataaccg ttaccagaca aataccggtc  1320
aagtttatat tggtgtagtt ttcgattcct ttgatttttat atcttttgg cgccatttca  1380
cgtcaacggt taaaaacaa gttatcgttt ctccggtaca gttaaccacc aaccgccaca  1440
aataaccgtc accggaatac ctataaatac aacttccatt tcaatcgtct ctctctgcac  1500
tcccattctt tgaatccaaa aaaggctaca cacacacaca gcaatgcaat gcagatgata  1560
gcaacaccgc ccgtcaacag gctgacgccg gtggccatgg aaacgcacgt ccaaactcat  1620
ccaccccccc ttcgtcaccc tcccaacctc caagaagacc acgccgtgcc ggagccacta  1680
caccgtcaaa gctttcccag gcggcatctt cgtcaacaaa tcttccaccg ccaacgc     1740
caacaccaac tccgcccacc ccttctgccg acgggatatt actaggtact gcaagaaggc  1800
cggtaatatg cccgatttgc aaaaaggata tgtatcatga aaaggcgctg tgtggcca    1860
tccggtggca cacgcaggag gagagactgg cggcaagcag ggatattgcc cgggcgcttt  1920
ctgccaacgt tgtttctggg caaagaggcg atggagaaca agggccgtct aaacggttca  1980
aactgccgga tcttaacgag ccaccaccgt cggaggacta ttttcttgc gggagaggca  2040
tgcatgtatg tgtggccttt tgcaataat actatgcatg gagatgcat aaagtttatc  2100
tttatttttt ttagttttaat aatgtgtggc aaactttatt tcatttatga tttcggccat  2160
gtactgctac atcgttctag gatggttatt ccctagaatt tgcttatgt atttgtttc   2220
tttgttaatt cttctcttcc ttaaacgtta tttcatgtga attgcgatgt catgatattg  2280
caggaatgta acttagaact caacgataaa agtgtgttg agatcgtgga agttgatcat  2340
ttatcttgaa ttcataagat aagcaacatg agataggata ttaattact gtgggatttt  2400
ctttttatat tcatatttat cgttgtaatg caaatttta agtagaataa cgaatgtgtc  2460
```

```
ttattattta cggttaaatg caaaagatca ttaacatatc tccattgatt tgtttactga    2520
tgtattctca tgtgttctgt tgctaaattc tattttgaaa agtatattca attaaagcaa    2580
tgcatttttag atataaagca actccataac ttataattgt gtagattttt accaattcaa   2640
tgtcttaaaa gaaaaataaa aattgaaagt ttaattaatt gccatagtga tcccgttccc    2700
gtcaattatg tgatcaattt ttaccagagc aaaaccccac atttcttgta gtgaacaatc    2760
tgtggatgat aaccgatcga agactttgt ggggatttca ctaaccaact atttggctct     2820
cattaattac tattagttat ataaggccat cccaagtatt ttggcaatat tcaaaacgag    2880
taaactataa aattacactt ttggttcttg tatttctaac ttttagaatt atgtatttgg    2940
ttcttatagt ttttttattg tatgaattac attacttttg gtccacaata tttttttattt   3000
tctataattc cattttttagt c                                             3021

SEQ ID NO: 35           moltype = DNA  length = 3006
FEATURE                 Location/Qualifiers
misc_feature            1..3006
                        note = LsPromoter-without-MYB-sites_LsCoding
                        sequence_To3'UTR
source                  1..3006
                        mol_type = other DNA
                        organism = synthetic construct
SEQUENCE: 35
tcaatttcga tcttgactac catgaatgtc atatttatat gacatactta taagaaatta    60
taatacaaat ttgattttaa aataaaataa aaactggat cataacggat attttgtttc     120
gtataaaaag aataccgtaa gattaaatta aaataaacaa tccgttaaac tgacataata    180
taatattgga aaataaaaaa atatatatgt tttcataaaa aaaaaaactt caagtttgga    240
tcagatttgt gaaaagtaaa accttatatt tagttgatga ccgttttacc ataaacaatt    300
atcagtttgt gctgggttaa ttgttaataa aaataattat aaaattttaat tgaatataac   360
atgaatatat aattttttttt tggaaaaact tcttttaaa tgttacataa attacgatta    420
aatatttttta ataccaaatt atatagtatc tggattaaag aggtcaaaaa gtaaactta    480
aaaaataaaa aaaataaata atagattaat ataagttaga ggacttcaat tatttttcat    540
gtgggacccttt ctaaaagaac ctatttttac aaatagattt aaaaccaatc tattttttga   600
aatggtctcc taaatcaatc aaattttata aaaaaactcc aacactatca aatatataac    660
aatttttattc gatcggttaa atagttagaa ttataacaaa ataaaaaaca agataattt    720
ttcaaaataa tttgaaataa aaaataaggt gtcaaaaatg aacttttatg taaacttaac    780
atcatttgtc attttttgtta caaaacatga ttaatattat tactttgtaa gtgtccactt    840
ttcttcaaac tccttgctta gttaaaaaaa tctataatat atgaaattaa ttttagtttt    900
cttaaactac atatataatt attttttattc aaacttgaat taaaagccta tgacaataac    960
caaaatgaaa tagtatgact tatacatttg ccgttgacta ataaaccaaa aaatcgaatt    1020
gacatcagac caaaaccagc tctgtatata ttggttatgt tatgggttat atagagttgt    1080
ttaaaaggca gttatcgatt acgttctcag ttctagagtt ttcacaaaaa tcaattctcc    1140
tgtatcacat cgaaagcaaa ccggtctatt tataaaagag atacatattt gaaacaacat    1200
atttttttaat tatatttatg tgttgtttat aaatctagaa acccgtaaat ttatatttag    1260
ttcagtatcc aatataggat ctgaaactac tttataaccg ttaccagaca aatacccggtc    1320
aagtttatat tggtgtagtt ttcgattcct ttgattttat atcttttttgg cgccatttca    1380
cgtcaacggt ttaaaaacaa gttatcgttt ctccggtaca gttaaccacc caaatacccgg   1440
aataccctata aatacaactt ccatttcaat cgtctctctc tgcactccca ttcttttgaat   1500
ccaaaaaaagg ctacacacac acacagacaa caatggcaga tgatggcaac accgcccgtc   1560
aacaggctga cgccggtggc catggaaacg cacgtccaaa ctcatccacc ccccttcgt    1620
cacccctccca acctccaaga agaccacgcc gtgccggagc cactacaccg tcaaagcttt    1680
cccaggcggc atcttcgtca acaaatcttc caccgccgcc aacgccaaca ccaactccgc    1740
ccacccctcc tgccgacggg atattactag gtactgcaag aaggccggta atatgcccga    1800
tttgcaaaaa ggatatgtat catgaaaagg cgctgtgtgg ccacatccgg tggcacacga    1860
aggaggagag actggcggca agcagggata ttgcccgggc gcttttctgcc aacgttgttt    1920
ctgggcaaag aggcgatgga gaacaagggc cgtctaaacg gttcaaactg ccggatctta    1980
acgagccacc accgtcggag gactgatttt cttgcgggag aggcatgcat gtatgtgtgg    2040
cctttttgca ataatactat gcatgggaga tgcataaagt ttatctttat tttttttagt    2100
ttaataatgt gtggcaaact ttatatcatt tatgatttcg gccatgtact gctacatcgt    2160
tctaggatgg ttattccccta gaatttgctt tatgtatttg ttttctttgt taattcttct    2220
cttccttaaaa cgttatttca tgtgaattgc gatgtcatga tattgcagga atgtaactta    2280
gaactcaacg ataaaaagtg tgttgagatc gtggaagttg atcatttatc ttgaattcat    2340
aagataagca acatgagata ggataattaa ttactgtggg gatttctttt tatattcata    2400
ttattcgttg taatgcaaat ttttaagtag aataacgaat gtgtcttatt atttacggtt    2460
aaatgcaaaa gatcattaac atatctccat tgatttgttt actgatgtat tctcatgtgt    2520
tctgttgcta aattctattta tgaaagtat attcaattaa agcaatgcat tttagatata    2580
aagcaactcc ataacttata attgtgtaga ttttaccaatt catgtct taaaagaaaa    2640
ataaaaattg aaagtttaat taattgccat agtgatcccg ttcccgtcaa ttatgtgatc    2700
aattttacc agagcaaaac cccacatttc ttgtagtgaa caatctgtgg atgataaccg    2760
atcgaagact tttgtgggga tttcactaac caactatttg gctctcatta attactatta    2820
gttatataag gccatcccaa gtattttggc aatattcaaa acgagtaaac tataaaatta    2880
cactttttggt tcttgtattt ctaacttttta gaattatgta tttggttctt atagtttttt    2940
atttgtatga attacattac ttttggtcca caatattttt tattttctat aattccattt    3000
ttagtc                                                              3006

SEQ ID NO: 36           moltype = DNA  length = 4356
FEATURE                 Location/Qualifiers
misc_feature            1..4356
                        note = LsPromoter-with-MITE-insert_LsCoding sequence_To3'UTR
source                  1..4356
                        mol_type = other DNA
                        organism = synthetic construct
```

```
SEQUENCE: 36
tcaatttcga tcttgactac catgaatgtc atatttatat gacatactta taagaaatta    60
taatacaaat ttgattttaa aataaaataa aaactatttt cataacggat attttgtttc   120
gtataaaaag aataccgtaa gattaaatta aaataaacaa tccgttaaac tgacataata   180
taatattgga aaataaaaaa atatatatgt tttcataaaa aaaaaaactt caagtttgga   240
tcagatttag gaaaagtaaa acctatatt tagttgatga ccgttttacc ataaacaatt   300
atcagtttgt gctggttaa ttgttaataa aaataatatt aaaatttaat tgaatataac   360
atgaatatat aattttttt tggaaaaact tcttttaaaa tgttacataa attacgatta   420
aatattttta ataccaaatt atatagtatc tggattaaag aggtcaaaaa gtaaacttta   480
aaaaataaaa aaaataaata atagattaat ataagttaga ggacttcaat tattttcat   540
gtggaccctt ctaaaagaac ctattttac aaatagattt aaaaccaatc tattttgga   600
aatggtctcc taaatcaatc aaattttata aaaaaactcc aacactatca aatatataac   660
aattttattc gatcggttaa atagttagaa ttataacaaa ataaaaaaca agataatttt   720
ttcaaaataa tttgaaataa aaaataaggt gtcaaaaatg aacttttatg taaacttaac   780
atcatttgtc attttgtta caaaacatga ttaatattat tactttgtaa gtgtccactt   840
ttcttcaaac tccttgctta gttaaaaaaa tctataatat atgaaattaa ttttagtttt   900
cttaaactac atatataatt attttttatc aaacttgaat taaaagccta tgacaataac   960
caaaatgaaa tagtatgact tatacatttg ccgttgacta ataaaccaaa aaatcgaatt  1020
gacatcagac caaaaccagc tctgtatata ttggttatgt tatgggttat atagagttgt  1080
ttaaaaggca gttatcgatt acgttctcag ttctagagtt ttcacaaaaa tcaattctcc  1140
tgtatcacat cgaaagcaaa ccggtctatt tataaaagag atacatattt gaaacaacat  1200
attttttaat tatatttatg tgttgtttat aaatctgaaa acccgtaaat ttatatttag  1260
ttcagtatcc aatataggat ctgaaactac tttataaccg ttaccagaca aataccggtc  1320
aagtttatat tggtgtagtt ttcgattcct ttgatttat atcttttgg cgccatttca  1380
cgtcaacggt ttaaaacaa gttatcgttt ctccggtaca gttaaccacc actgctacca  1440
gggccggcca gaaggctgtg cggcttgggc tgtggcaga gggcagcaga tttagtccat  1500
ttattatggt ctgctattta tttgggtcca ataagatcag ggcactaaaa ctcaaataca  1560
tcaattcaag tcggcggcaa aagaataaaa agcgccaatt tttagaagac aaggagacag  1620
cacaataatc atgcttttcc aatggccaat taattttagc ctttgtgagg tataaatatg  1680
aatcacttttt tctccaaata tcattattgt aaactagtaa agagcgtaaa ttgtttttatc  1740
gctaatcttc ttcttttca aatataattg tttgattctt tgtagtaggt acgttaagtt  1800
ttatatcatt cgtcctggaa accttttctt atgccccttc aatttatgaa tttgtgtttt  1860
gtattgtctt gctattaatc caatgcaaac taattctgcc gcatcgatct cacagagttg  1920
gagcagctta aaaggagttt tggggcaact taaaatgagg gtagcttttt tgttgttgtt  1980
ggtctactat ttactttggt ccttatcgtt ttagtttgt gttcattgag gatttgaatg  2040
actttgaaca caagtttata aaactaagtt tttgtgattc taaatttttg atgtgtgcaa  2100
ccgactaaat gaatataaaa ttctgatttg tgtatttctg atttctgatt taccggttat  2160
tcattatgtt tttctggatc tcatatgaat ttagtatata aaaatctcag gttcttctta  2220
ctcagtctag tatattttgg cattggggat cagggttaaa atcatcattt ttctaagcac  2280
taacaagctt taaaccatc aattaaaagt tagttctcca tacctggaat tgtttattgc  2340
tttagtattc atttcatagt gtcaatacct tacaactgtt tattgttttc aaatgtttac  2400
tgttttgcac tttagttgtt tttagcatgt ttcaactttc aaagttaatt gacgatagtg  2460
tcatatacga aatatcatca ctcatacaaa attaaactgg atagaatttt ttccgatgaa  2520
atctattttt aaatagttac gaatataata ggagacttaa tatgtttgtt tcaaaattac  2580
acaaaaacac catggaaatg ggcattagtt tgtataagca tccttttaaa tataaagctt  2640
tgttacattg atgccttcta aatatataat attgtaatga tttgtagtaa acaccatgga  2700
aatgggcatt attaagatgt ttcgcccagg gcatgaaaca ctatcggacc ggccctgact  2760
gctacaaccg ccacaaataa ccgtcaccgg aatacctata aatacaactt ccatttcaat  2820
cgtctctctc tgcactccca ttctttgaat ccaaaaaagg ctacacacac acacagacaa  2880
caatggcaga tgatggcaac accgccgtc aacaggctga cgccggtggc catggaaacg  2940
cacgtccaaa ctcatccacc cccccttcgt caccctccca acctccaaga agaccacgcc  3000
gtgccggagc cactcacccg tcaaagcttt cccaggcggc atcttcgtca acaaatcttc  3060
caccgccgcc aacgccaaca ccaactccgc ccaccccttc tgccgacggg atattactag  3120
gtactgcaag aaggccggta atatgcccga tttgcaaaaa ggatatgtat catgaaaagg  3180
cgctgtgtgg ccacatccgg tggcacacgc aggaggagga actggcggca agcagggata  3240
ttgcccgggc gctttctgcc aacgttgttt ctgggcaaag aggcgatgga gaacaaggc  3300
cgtctaaacg gttcaaactg ccggatctta acgagccacc accgtcggag gactgatttt  3360
cttgcgggag aggcatgcat gtatgtgtgg ccttttgca ataatactat gcatgggaga  3420
tgcataaagt ttatctttat ttttttagt ttaataatgt gtggcaaact ttatatcatt  3480
tatgatttcg gccatgtact gctacatcgt tctaggatgg ttattcccta gaatttgctt  3540
tatgtatttg ttttctttgt taattcttct cttccttaaa cgttattca tgtgaattgc  3600
gatgtcatga tattgcagga atgtaactta gaactcaacg ataaaagtg tgttgagatc  3660
gtggaagttg atcatttatc ttgaattcat aagataagca acatgagata ggataattaa  3720
ttactgtggg gatttctttt tatattcata ttattcgttg taatgcaaat ttttaagtag  3780
aataacgaat gtgtcttatt atttacggtt aaatgcaaaa gatcattaac atatctccat  3840
tgatttgttt actgatgtat tctcatgtgt tctgttgcta aattctattt tgaaagtat  3900
attcaattaa agcaatgcat tttagatata aagcaactcc ataacttata attgtgtaga  3960
tttttaccaa ttcaatgtct taaaagaaaa ataaaaattg aaagtttaat taattgccat  4020
agtgatcccg ttcccgtcaa ttatgtgatc aattttacc agagcaaaac cccacatttc  4080
ttgtagtgaa caatctgtgg atgataaccg atcgaagact tttgtgggga tttcactaac  4140
caactatttg gctctcatta attactatta gttatataag gccatcccaa gtattttggc  4200
aatattcaaa acgagtaaac tataaaatta cacttttggt tcttgtattt ctaacttta  4260
gaattatgta tttggttctt atagtttttt atttgtatga attacattac ttttggtcca  4320
caatattttt tattttctat aattccattt ttagtc                            4356

SEQ ID NO: 37          moltype = AA  length = 21
FEATURE                Location/Qualifiers
REGION                 1..21
                       note = K2-2 like zinc finger domain
```

```
VARIANT                 2..3
                        note = misc_feature - Xaa can be any naturally occurring
                           amino acid
VARIANT                 5..11
                        note = misc_feature - Xaa can be any naturally occurring
                           amino acid
VARIANT                 12
                        note = MISC_FEATURE - Xaa can be K or R
VARIANT                 14..15
                        note = misc_feature - Xaa can be any naturally occurring
                           amino acid
VARIANT                 18
                        note = misc_feature - Xaa can be any naturally occurring
                           amino acid
VARIANT                 19
                        note = MISC_FEATURE - Xaa can be R or N
VARIANT                 20
                        note = misc_feature - Xaa can be any naturally occurring
                           amino acid
source                  1..21
                        mol_type = protein
                        organism = synthetic construct
SEQUENCE: 37
CXXCXXXXXX XXAXXGHXXX H                                             21

SEQ ID NO: 38           moltype = AA  length = 21
FEATURE                 Location/Qualifiers
REGION                  1..21
                        note = consensus zinc finger domain
VARIANT                 2..3
                        note = misc_feature - Xaa can be any naturally occurring
                           amino acid
VARIANT                 5..16
                        note = misc_feature - Xaa can be any naturally occurring
                           amino acid
VARIANT                 18..20
                        note = misc_feature - Xaa can be any naturally occurring
                           amino acid
source                  1..21
                        mol_type = protein
                        organism = synthetic construct
SEQUENCE: 38
CXXCXXXXXX XXXXXXHXXX H                                             21

SEQ ID NO: 39           moltype = AA  length = 163
FEATURE                 Location/Qualifiers
source                  1..163
                        mol_type = protein
                        organism = Cichorium endivia
SEQUENCE: 39
MVDDGTTARQ QVDDGGHGNP RPNPTTPPPS PSRTPRRTRR AGATTPSKLS PAVSSTTLPP    60
PPTPPTPPAD RLVTGTSSSL GTQRVRRSKS VICPICKKDM CHEKALCGHI RWHTHEERQA   120
ASSDIARALS SNFSSGHGGE EQGPSKRFKV PDLNKPPPPE EDD                     163

SEQ ID NO: 40           moltype = AA  length = 161
FEATURE                 Location/Qualifiers
source                  1..161
                        mol_type = protein
                        organism = Hieracium aurantiacum
SEQUENCE: 40
MVDDGTAARQ QVDDGGHGER RPTPTTPPPS PSRTPRRSHR PGTTPPSKLS PAASSTALPP    60
PPTPPTPTVV AGSSSSLTTP RIKRSKSVIC PICKKDMCHE KALCGHIRWH TQEERLAASG   120
DIARALSANF VSGGNGDEEQ GSSKRFKVPD LNKPPPPEED D                       161

SEQ ID NO: 41           moltype = AA  length = 166
FEATURE                 Location/Qualifiers
source                  1..166
                        mol_type = protein
                        organism = unidentified
                        note = Senecio cambrensis
SEQUENCE: 41
MVNSGDASRS DDNPNTPNRR AGKAHAAPST SPSSPPPPIG RLSATTPLSG SKRPHSPTKK    60
SNFICPICGK DLYHSKALNG HIRWHSQMER ELKKKALRDI RERDVAVVAA ADAVQVAPVP   120
ATVPVPVPTI VRTRLFHEQP QPQPQEEVPY NYAYLLPDLN ASADEE                  166

SEQ ID NO: 42           moltype = AA  length = 203
FEATURE                 Location/Qualifiers
source                  1..203
                        mol_type = protein
```

```
                               organism = Hevea brasiliensis
SEQUENCE: 42
MVNSSPSSSS SSSSPTPPPE VQVGPGGSSV GGESEEGCSS RKKKAGSNDQ QGDEEGVQKR    60
LKRGEMDSPI SEPVCCICNK KFGSWKGVFG HMRAHPEREW RGAFPPPKEK AGAININHQQ   120
ILQQQLAPTL LSLGREALAR MTNHHGSGAA NAAAPSRRAG DTELNREQQE LAGPSTIIHP   180
SLRGFDLNLP PPPEEANEDD RNN                                          203

SEQ ID NO: 43            moltype = AA  length = 230
FEATURE                  Location/Qualifiers
source                   1..230
                         mol_type = protein
                         organism = Cucurbita moschata
SEQUENCE: 43
MEKNANTNVP SETSSDQRHG GERSPTGPTS PPPTHNRDNN PNPTTEHSSY SDTLRVPPAA    60
ETSRRDALLD VGTSYQNIVG SSEGEPGKKR GRGDGEEEEE QQQPPQQQVK AAKKKGELTE   120
VPKGEPRCAT CNKVFKSWKA LFGHLRSHPE RTYRGALPPP TAAELDIRRC QQQLASTLLT   180
VAQEVAASRR GLDIDLNQPS TADDGDSPEK TGGVGFDLNA DPPPESDDED             230

SEQ ID NO: 44            moltype = AA  length = 242
FEATURE                  Location/Qualifiers
source                   1..242
                         mol_type = protein
                         organism = Eutrema salsugineum
SEQUENCE: 44
MVTEEEINEI SEDSGYLSSG EEGEIRELVC ALPALNVTER LNMEEAGLHN AVVAAEFVMV    60
ASEEAPVSKE NMQTVDAIDD DAKNTALGRR PRIDELDDAA GASGSTAIGS GGEDEPVKKA   120
KKKGSSQLHA PPQGPPQCNI CGRNFTSWKA VFGHLRAHKD RGYQGFLPPP TFNATEEGFS   180
AVVLASDSSR GGVLGFGSSG IDLNLDPMEE EEEAVSGFIP KFDLNRSPPQ EGQEEEEEDK   240
AK                                                                 242

SEQ ID NO: 45            moltype = AA  length = 244
FEATURE                  Location/Qualifiers
source                   1..244
                         mol_type = protein
                         organism = unidentified
                         note = Arachis ipaensis
SEQUENCE: 45
MEKNHSTSAS TTSLPSLSLS TPVTEPPSSP LVDQPNLSGE EEKLNILKTP EKILTDLTTN    60
NDANGGSALP SSPPPSPPQ MMVSGAIATA VGGGAVVLGG NNIIGPIKRR KASEIMDPPS    120
GTPTCPICSK TFSSWKGAFG HMRKHPDRQY RGFFKPPTFA PSSSKAATNA SGNRHEAAGE   180
EGSSAASGEV GEGGASPAVR NLLFDLNHPV EGVKDEEEGK IILGFDLNEP AVEEEEEEKE   240
DKPF                                                               244

SEQ ID NO: 46            moltype = AA  length = 202
FEATURE                  Location/Qualifiers
source                   1..202
                         mol_type = protein
                         organism = Cajanus cajan
SEQUENCE: 46
MQEQNPSENS PSNDDAPNPQ GGEGEIMKTP WQVLEELCGG SSTPVAVAPV SEGVLQPKKR    60
KTSEVRDPPR GKPICPVCNK EFTSWKAAFG HMRAHPNRDY RGFYKPPAFP SSSSSKDQPP   120
PSANNNKGGG AKKTNAASDG TDEVDSGGGK EVTPSPNQLF GFDLNEPVEG LGSSHAVEEG   180
VQEEKDLGFD LNEMPPAEDH EG                                           202

SEQ ID NO: 47            moltype = AA  length = 265
FEATURE                  Location/Qualifiers
source                   1..265
                         mol_type = protein
                         organism = Brassica rapa
SEQUENCE: 47
MTNPEKMKVD GDTEKEKEDS SDEQWSDEES AMREIVLGLP ALSISSATFG VSIAVDEEEE    60
ARLNEQAVVA AELVIAAAEE AVMKEKSDGK KKKVRRQRKT MKLNNDDEAG GSSKGGEAAK   120
KPRKKTSEFT NLPRGPPVCN VCGRAFHSWK AVFGHLRSHK DRSYRGFLPP PRFSAPIRGV   180
MIPGPNSAFV RVVARGGSSG VVVASGGGGG GGASGGEGGR GVGIVMDVDR VEKEKQEVTE   240
SGTAAKFDLN KSPPKDDDEE EDKTK                                        265

SEQ ID NO: 48            moltype = AA  length = 237
FEATURE                  Location/Qualifiers
source                   1..237
                         mol_type = protein
                         organism = Lagenaria siceraria
SEQUENCE: 48
MEKNTNANAN DNTVSETSPD QRHGGERSPM ASSPPPSARN DDVNNPTPNV VIELSSSVVV    60
AAPESTTTGD VRRRQTVDAT LLDVGTSSHD HVGGSSDIEQ GKKRGRGDGG EQQQQVKAAK   120
KKGELTEVPK GEPRCATCNK VFKSWKALFG HLRSHPERTY RGALPPPTAA ELDIRRCQQQ   180
LASTLLTVAQ QVATSRRGLN IDLNQPSAAD DGDSPEKTGS VGFDLNVEPP PESDDEK      237

SEQ ID NO: 49            moltype = AA  length = 243
FEATURE                  Location/Qualifiers
```

```
source                          1..243
                                mol_type = protein
                                organism = unidentified
                                note = Arachis ipaensis
SEQUENCE: 49
MDKNASSSSS SSSSSSSSPS TSTTEQPPPP SPQDVPVEEP PVILKTPEEV LAELTESGES    60
PPPPPPSAAE EGGIGGSAMA IAVGVGGEGV VLGEAGSGGS GAVGASRKRK ASEVKDPPTG   120
TPTCPVCNKT FASWKGAFGH MRKHPDRQYR GFFKPPTFTS SVAAAATSGA TTQGFVEGGS   180
SAASGEGGSV GAAGQVGEGG SFDLNQPVME RGGAGDGDEG RNGDEGKDLG FDLNKPADEE   240
DKA                                                                243

SEQ ID NO: 50                   moltype = AA   length = 271
FEATURE                         Location/Qualifiers
source                          1..271
                                mol_type = protein
                                organism = Prunus persica
SEQUENCE: 50
MANQQNTTTN NTNRLASSAE GQQQPGNDNV NVNVTGVAAT GTPSFPNPPP PSTVQLNVAR    60
GSSVSPPGLN RGPSGRGSSN PRRVSPSGRK SPPGGRGSPS SGRGSSSFAS SPGAGQITQI   120
GGRNFTPLSV EITIGGGSGT AGGSMIPGSS SGSPPRAKRK AEITAPEGVS PVCSVCKRSN   180
FSSWKALFGH MRCHPERQWR GCFPPPGFEE AQRALQQGER LGALRGFDLN EASDPEEENE   240
GGGGGGFDLN MLPPDEDKDG GGSSGGAAKT G                                 271

SEQ ID NO: 51                   moltype = AA   length = 321
FEATURE                         Location/Qualifiers
source                          1..321
                                mol_type = protein
                                organism = Glycine max
SEQUENCE: 51
MQNQNPSEDD STNKAPSDDT PHPTNNDNNN PPGESLIMKT VRQVLEELGG SRDDNDGGVG    60
DGTPVAVALE VGGGGDGSGG DGGGVGGGPP VAMEASDGGD EDNDNEHSDS IGDSVPVAVA   120
VKVGGRGGDN SGGGATVTVS VALSDGDYGG SNGSGGSPVA VAVAVGGGST VMESVVVGTE   180
GVQGRKRKTP LVRDPPTGRP TCPLCQKEFQ TWKGAFGHMR AHPDRDYRGF FKPPVFGSPS   240
STQDQPPSDG KGDDSAKKST GEDNTAEKGS ASLPVRVPMF DLNELIEEDG SSHAAEPAED   300
MSTGEGKGSG FDLNEMPPAE D                                            321

SEQ ID NO: 52                   moltype = AA   length = 355
FEATURE                         Location/Qualifiers
source                          1..355
                                mol_type = protein
                                organism = Glycine max
SEQUENCE: 52
MNHHKYSSHR HNLFNSFLTL AIFIILGFSF SATGMQNQNP SEDDSTNKAP SDDTPHPTNN    60
DNNNPPGESL IMKTVRQVLE ELGGSRDDND GGVGDGTPVA VALEVGGGGD GSGGDGGGVG   120
GGPPVAMEAS DGGDEDNDNE HSDSIGDSVP VAVAVKVGGR GGDNSGGGAT VTVSVALSDG   180
DYGGSNGSGG SPVAVAVAVG GGSTVMESVV VGTEGVQGRK RKTPLVRDPP TGRPTCPLCQ   240
KEFQTWKGAF GHMRAHPDRD YRGFFKPPVF GSPSSTQDQP PSDGKGDDSA KKSTGEDNTA   300
EKGSASLPVR VPMFDLNELI EEDGSSHAAE PAEDMSTGEG KGSGFDLNEM PPAED        355

SEQ ID NO: 53                   moltype = AA   length = 357
FEATURE                         Location/Qualifiers
source                          1..357
                                mol_type = protein
                                organism = Glycine max
SEQUENCE: 53
MNHHKYSSHR HNLFNSFLTL AIFIILGFSF SATGMQNQNP SEDDSTNKAP SDDTPHPTNN    60
DNNNPPGESL IMKTVRQVLE ELGGSRDDND GGVGDGTPVA VALEVGGGGD GSGGDGGGVG   120
GGPPVAMEAS DGGDEDNDNE HSDSIGDSVP VAVAVKVGGR GGDNSGGGAT VTVSVALSDG   180
DYGGSNGSGG SPVAVAVAVG GGSTVMESVV VGTEGVQGRK RKTPLVRDPP TGRPTCPLCQ   240
KEFQTWKGAF GHMRAHPDRD YRGFFKPPVF GSPSSTQDQP PSDGKVAGDD SAKKSTGEDN   300
TAEKGSASLP VRVPMFDLNE LIEEDGSSHA AEPAEDMSTG EGKGSGFDLN EMPPAED      357

SEQ ID NO: 54                   moltype = AA   length = 324
FEATURE                         Location/Qualifiers
source                          1..324
                                mol_type = protein
                                organism = Glycine max
SEQUENCE: 54
MQNQNPSEDD STKKSPSSPS DDTPHPTNNN NNPQGESLVM KTVWQVLEEL GGSGDDSDGD    60
SGFGDGAPVA VAVGGGGDDN GDGDGSVGGG ATVAMEKSDD DSDNNGDNSG SNLAVAVVVG   120
GGDGSGSSGV GATVTVSVAV SGGGGNHGGG SSGGGGGGPV AVSVAVGGGS TVVESVVVST   180
EGVQGRKRKT SIVRDPPTGR PTCPLCQKEF PTWKGAFGHM RAHPDRDYRG FFKPPVFGSP   240
SSTQDQPPRD DKVAGDDSAK KSSGEVNNGE KGSASSHVRV PMFDLNEPIE EGSSHAAEP   300
AEDMSSEEGK GFGFDLNEMP PAED                                         324

SEQ ID NO: 55                   moltype = AA   length = 280
FEATURE                         Location/Qualifiers
source                          1..280
                                mol_type = protein
```

```
                        organism = Cicer arietinum
SEQUENCE: 55
MKRFCHSFHK  TEKHDDYVWP  LLAHEMKKNG  SRIFICDLCD  KSFSSGNALG  GHKASHNRSD   60
LLQPPIKKHK  LTIDSCSLSS  PNDHDDVKHK  HACVLCHKVF  PSNKALYGHM  RSHSQKDSKA  120
IQPPLITTTS  RDSKIQSNNT  DDQPILPAID  LEKYFPPRSH  QTKKRCSKST  IDYELINVAQ  180
ILCDMSRSDP  TKFTTNIDNQ  RNKEHVTIVK  NNNNPKKLVV  TFKIPKDKTF  KIPKDKEEKN  240
KEAEMEKESS  HQLGSRAVAK  DFDLNEIPVD  LDLVADEQAP                          280

SEQ ID NO: 56         moltype = AA  length = 290
FEATURE               Location/Qualifiers
source                1..290
                      mol_type = protein
                      organism = Cicer arietinum
SEQUENCE: 56
MDVDELQAAE  REDRRSIIIM  KRSCQSFDKP  MKNDDFVWPL  LANEMKKNGS  RIFICDLCGK   60
SFSSGNALGG  HKASHNRSNL  LQPPIKKHKL  TIDSCSLSSP  HDHDDVKHKH  ACVLCHKVFP  120
SNKVLYGHMR  SHSQKDSKAI  QPPPITTTSP  DSKKQSNNTH  DQPILPTIDL  EKYFPPRSHQ  180
TKKRRSKSII  DYELINVAQI  LCDMSRSDPK  RLKLSTNIDN  QKNKEHVTIV  KNNNNEKKLV  240
VRFKIPKDKE  VKNNEGETKK  ESSHQLGSRG  VVKDFDLNEI  PVDVADEQAN              290

SEQ ID NO: 57         moltype = AA  length = 246
FEATURE               Location/Qualifiers
source                1..246
                      mol_type = protein
                      organism = Cicer arietinum
SEQUENCE: 57
MKKNGSRIFI  CDLCGKSFSS  GNALGGHKAS  HNRSNLLQPP  IKKHKLTIDS  CSLSSPHDHD   60
DVKHKHACVL  CHKVFPSNKV  LYGHMRSHSQ  KDSKAIQPPP  ITTTSPDSKK  QSNNTDDQPI  120
LPTIDLEKYF  PPRSHQTKKR  RSKSIIDYEL  INVAQILCDM  SRSDPKRLKL  STNIDNQKNK  180
EHVTIVKNNN  NEKKLVVRFK  IPKDKEVKNN  EGETKKESSH  QLGSRGVVKD  FDLNEIPVDV  240
ADEQAN                                                                  246

SEQ ID NO: 58         moltype = AA  length = 6
FEATURE               Location/Qualifiers
REGION                1..6
                      note = EAR motif
VARIANT               4..5
                      note = misc_feature - Xaa can be any naturally occurring
                       amino acid
source                1..6
                      mol_type = protein
                      organism = synthetic construct
SEQUENCE: 58
DLNXXP                                                                    6

SEQ ID NO: 59         moltype = AA  length = 5
FEATURE               Location/Qualifiers
REGION                1..5
                      note = EAR motif
VARIANT               4
                      note = misc_feature - Xaa can be any naturally occurring
                       amino acid
source                1..5
                      mol_type = protein
                      organism = synthetic construct
SEQUENCE: 59
DLNXP                                                                     5

SEQ ID NO: 60         moltype = DNA  length = 1335
FEATURE               Location/Qualifiers
misc_feature          1..1335
                      note = Tar-MITE insert
source                1..1335
                      mol_type = other DNA
                      organism = synthetic construct
SEQUENCE: 60
actgctacca gggccggcca gaaggctgtg cggcttgggc tgtggcacag ggcagcaga    60
tttagtccat ttattatggt ctgctattta tttgggttca ataagatcgg ggcactaaaa  120
ctcaaatca tcaattcaag tcggcggcaa aagaataaaa agcgccaatt tttagaagac  180
aaggagacag cacaataatc atgctttttcc aatggccaat taattttagc ctttgtgagg  240
tataaatatg aatcactttt tctccaaata tcattattgt aaactagtaa agagcgtaaa  300
ttgtttatc gctaatcttc ttcttttca aatataattg tttgattctt tgtagtaggt  360
acgttaagtt ttatatcatt cgtcctggaa acctttctt atgcccttc aatttatgaa  420
tttgtgttt gctattgtctt gctattaatc caatgcaaac taattctgcc gcatcgatct  480
cacagagttg gagcagctta aaaggagttt tggggcaact aaaatgagg gtagcttttt  540
tgttgttgtt ggtctactat ttacttttggt ccttatcgtt ttagttttgt gttcattgag  600
gatttgaatg acttttgaaca caagtttata aaactaagtt tttgtgattc taaatttttg  660
atgtgtgcaa ccgactaaat gaatataaaa ttctgatttg tgtatttctg atttctgatt  720
taccggttat tcattatgtt tttctggatc tcatatgaat ttagtatata aaaatctcag  780
```

```
gttcttctta ctcagtctag tatattttgg cattggggat cagggttaaa atcatcattt  840
ttctaagcac taacaagctt taaaaccatc aattaaaagt tagttctcca tacctggaat  900
tgtttattgc tttagtattc atttcatagt gtcaatacct tacaactgtt tattgttttc  960
aaatgtttac tgttttgcac tttagttgtt tttagcatgt ttcaactttc aaagttaatt 1020
gacgatagtg tcatatacga aatatcatca ctcatacata attaaactgg atagaatttt 1080
ttccgatgaa atctattttt aaatagttac gaatataata ggagacttaa tatgtttgtt 1140
tcaaaattac acaaaaacac catggaaatg ggcattagtt tgtataagca tcctttttaaa 1200
tataaagctt tgttacattg atgccttcta aatatataat attgtaatga tttgtagtaa 1260
acaccatgga aatgggcatt attaagatgt ttcgcccagg gcatgaaaaa ctatcggacc 1320
ggccctgact gctac                                                  1335

SEQ ID NO: 61           moltype = DNA   length = 2622
FEATURE                 Location/Qualifiers
misc_feature            1..2622
                        note = LsPromoter-with-deletion_LsCoding sequence_To3'UTR
source                  1..2622
                        mol_type = other DNA
                        organism = synthetic construct
SEQUENCE: 61
tcaatttcga tcttgactac catgaatgtc atatttatat gacatactta taagaaatta   60
taatacaaat ttgattttaa aataaaataa aaactatttt cataacggat attttgtttc  120
gtataaaaag aataccgtaa gattaaatta aaataaacaa tccgttaaac tgacataata  180
taatattgga aaataaaaaa atatatatgt tttcataaaa aaaaaaactt caagtttgga  240
tcagatttag gaaaagtaaa acctatatt tagttgatga ccgttttacc ataaacaatt   300
atcagtttgt gctgggttaa ttgttaataa aaataatatt aaaatttaat tgaatataac  360
atgaatatat aatttttttt tggaaaaact tcttttaaaa tgttacataa attacgatta  420
aatatttttta ataccaaatt atatagtatc tggattaaag aggtcaaaaa gtaaacttta  480
aaaaataaaa aaaataaata atagattaat ataagttaga ggacttcaat tatttttcat  540
gtggacccctt ctaaaagaac ctatttttac aaatagattt aaaaccaatc tatttttgga  600
aatggtctcc taaatcaatc aaatttttata aaaaaactcc aactactca aatatataac  660
aattttattc gatcggttaa atagttagaa ttataacaaa ataaaaaaca agataatttt  720
ttcaaaataa tttgaaataa aaataaggt gtcaaaaatg aactttatg taaacttaac   780
atcatttgtc attttgtta caaaacatga ttaatattat tactttgtaa gtgtccactt   840
ttcttcaaac tccttgctta gttaaaaaaa tctataaat atgaaattaa ttttagtttt   900
cttaaactac atatataatt atttttatc aaacttgaat taaaagccta tgacaataac   960
caaaatgaaa tagtatgact tatacatttg ccgttgacta ataaaccaaa aaatcgaatt 1020
gacatcagac caaccgccac aaataaccgt caccggaata cctataaata caacttccat 1080
ttcaatcgtc tctctctgca ctcccattct ttgaatccaa aaaaggctac acacacac  1140
agacaacaat ggcagatgat ggcaacaccg cccgtcaaca ggctgacgcc ggtggccatg 1200
gaaacgcacg tccaaactca tccaccccc cttcgtcacc ctcccaacct ccaagaagac 1260
cacgccgtgc cggagccact acaccgtcaa agctttccca ggcggcatct tcgtcaacaa 1320
atcttccacc gccgccaacg ccaacaccaa ctcccgcccac ccttctgcc gacgggtat  1380
tactaggtac tgcaagaagg ccggtaatat gcccgatttg caaaaaggat atgtatcatg 1440
aaaaggcgct gtgtgccac atccggtggc acacgcagga ggagagactg gcggcaagca 1500
gggatattgc ccgggcgctt tctgccaacg ttgtttctgg gcaaagaggc gatggagaac 1560
aagggccgtc taaacggttc aaactgccgg atcttaacga gccaccaccg tcggaggact 1620
gatttcttg cggagaggc atcatgtat gtgtggcatt tttgcaataa tactatgcat 1680
gggagatgca taaagtttat cttatttttt tttagtttaa taatgtgtgg caaactttat 1740
atcatttatg atttcggcca tgtactgcta catcgttcta ggatggttat tccctagaat 1800
ttgctttatg tatttgtttt ctttgttaat tcttctcttc cttaaacgtt atttcatgtg 1860
aattgcgatg tcatgatatt gcaggaatgt aacttagaac tcaacgataa aaagtgtgtt 1920
gagatcgtgg aagttgatca tttatcttga attcataaga taagcaacat gagataggat 1980
aattaattac tgtggggatt tctttttata ttcatattat tcgttgtaat gcaaattttt 2040
aagtagaata acgaatgtgt cttattttt acggttaaat gcaaagatc attaacatat 2100
ctccattgat ttgtttactg atgtattctc atgtgttctg ttgctaaatt ctattttgaa 2160
aagtatattc aattaaagca atgcattta gatataaagc aactccataa cttataattg 2220
tgtagatttt taccaattca atgtcttaaa agaaaaataa aaattgaaag tttaattaat 2280
tgccatagtg atcccgttcc cgtcaattat gtgatcaatt tttaccagag caaaccccca 2340
catttcttgt agtgaacaat ctgtggatga taaccgatcg aagactttg tggggatttc 2400
actaaccaac tatttggctc tcattaatta ctattagtta tataaggcca tcccaagtat 2460
tttggcaata ttcaaaacga gtaaactata aaattacact tttggttctt gtatttctaa 2520
cttttagaat tatgtatttg gttcttatag tttttttattt gtatgaatta cattacttt  2580
ggtccacaat atttttttatt ttctataatt ccattttag tc                     2622

SEQ ID NO: 62           moltype = AA   length = 300
FEATURE                 Location/Qualifiers
source                  1..300
                        mol_type = protein
                        organism = Arabidopsis thaliana
SEQUENCE: 62
MRKMEAKKEE IKKGPWKAEE DEVLINHVKR YGPRDWSSIR SKGLLQRTGK SCRLRWVNKL  60
RPNLKNGCKF SADEERTVIE LQSEFGNKWA RIATYLPGRT DNDVKNFWSS RQKRLARILH 120
NSSDASSSSF NPKSSSSHRL KGKNVKPIRQ SSQGFGLVEE EVTVSSSCSQ MVPYSSDQVG 180
DEVLRLPDLG VKLEHQPFAF GTDLVLAEYS DSQNDANQQA ISPFSPESRE LLARLDDPFY 240
YDILGPADSS EPLFALPQPF FEPSPVPRRC RHVSKDEEAD VFLDDFPADM FDQVDPIPSP 300

SEQ ID NO: 63           moltype = DNA   length = 2338
FEATURE                 Location/Qualifiers
misc_feature            1..2338
```

|  | note = LSpromoter - To coding sequence |
| --- | --- |
| source | 1..2338 |
|  | mol_type = other DNA |
|  | organism = synthetic construct |

SEQUENCE: 63

```
tcaatttcga tcttgactac catgaatgtc atatttatat gacatactta taagaaatta   60
taatacaaat ttgattttaa aataaaataa aaactatttt cataacggat attttgtttc  120
gtataaaaag aataccgtaa gattaaatta aaataaacaa tccgttaaac tgacataata  180
taatattgga aaataaaaaa atatatatgt tttcataaaa aaaaaaactt caagtttgga  240
tcagatttag gaaaagtaaa acctatatt tagttgatga ccgttttacc ataaacaatt   300
atcagtttgt gctgggttaa ttgttaataa aaataatatt aaaatttaat tgaatataac  360
atgaatatat aattttttt tggaaaaact tcttttaaaa tgttacataa attacgatta   420
aatatttta ataccaaatt atatagtatc tggattaaag aggtcaaaaa gtaaacttta   480
aaaaataaaa aaaataaata atagattaat ataagttaga ggacttcaat tattttcat   540
gtggacccct ctaaaagaac ctattttac aaatagattt aaaaccaatc tatttttgga   600
aatggtctcc taaatcaatc aaatttata aaaaaactcc aacactatca aatatataac   660
aattttattc gatcggttaa atagttagaa ttataacaaa ataaaaaaca agataatttt   720
ttcaaaataa tttgaaataa aaaataaggt gtcaaaaatg aacttttatg taaacttaac  780
atcatttgtc atttttgtta caaaacatga ttaatattat tactttgtaa gtgtccactt   840
ttcttcaaac tccttgctta gttaaaaaaa tctataatat atgaaattaa ttttagtttt   900
cttaaactac atatataatt atttttatc aaacttgaat taaaagccta tgacaataac   960
caaaatgaaa tagtatgact tatacatttg ccgttgacta ataaccaaa aaatcgaatt  1020
gacatcagac caaaaccagc tctgtatata ttggttatgt tatgggttat atagagttgt  1080
ttaaaaggca gttatcgatt acgttctcag ttctagagtt ttcacaaaaa tcaattctcc  1140
tgtatcacat cgaaagcaaa ccggtctatt tataaaagag atacatattt gaacaacat   1200
attttttaat tatatttatg tgttgttat aaatctgaaa accgtaaat ttatatttag   1260
ttcagtatcc aatataggat ctgaaactac tttataaccg ttaccagaca aataccggtc  1320
aagtttatat tggtgtagtt ttcgattcct ttgattttat atcttttttgg cgccatttca  1380
cgtcaacggt ttaaaaacaa gttatcgttt ctccggtaca gttaaccacc aaccgccaca  1440
aataaccgtc accggaatac ctataaatac aacttccatt tcaatcgtct ctctctgcac  1500
tcccattctt tgaatccaaa aaaggctaca cacacacaca gacaacacca agtttgtaca  1560
aaaaagcagg ctatggcaga taatggcaac accggccgtc aaaaggatga cgacggtggc  1620
catgatggac cacgccaaaa cccaactact ccaccctccc cttcccgcac ccctcgaaga  1680
ccaaggcgga acacatcacc gcccaaacat tctccggggg cgtcttcaag caccatgcca  1740
gcgccgccta ctcccctgc gccgacggga atcaccggtg cttctagttc ttctgtgggt  1800
actaatataa tttcatttat tccacccaaa accaaaagaa cgaagtcggt gatctgcccg  1860
atctgcaaca aagatatgtg ccatgagaag gcgctgtgtg gccacatccg gtggcataca  1920
caggaggaaa gattggcggc cagcatcgct atagcaagag cgctatcttc taacgttgtt  1980
gtttctggca atggcgatga agatgaaggt ccatctcaaa agtataaact cccggacctg  2040
aacaaatctc caccgccgga ggaggaggac gaggacgctg cctgatttttc ttgcgggaga  2100
ggcatgcatg tatgtgtggc cttttgcaa taatactatg catgggagat gcataaagtt  2160
tatctttatt ttttttagtt taataatgtg tggcaaactt tatatcattt atgatttcgg  2220
ccatgctactg ctacatcgtt ctaggatggt tattccctag aatttgcttt atgtatttgt  2280
tttctttgtt aattcttctc ttccttaaac gttatttcat gtgaattgcg atgtcacc    2338
```

| SEQ ID NO: 64 | moltype = DNA length = 3673 |
| --- | --- |
| FEATURE | Location/Qualifiers |
| misc_feature | 1..3673 |
|  | note = LsPromoter-with-MITE_To Coding sequence |
| source | 1..3673 |
|  | mol_type = other DNA |
|  | organism = synthetic construct |

SEQUENCE: 64

```
tcaatttcga tcttgactac catgaatgtc atatttatat gacatactta taagaaatta   60
taatacaaat ttgattttaa aataaaataa aaactatttt cataacggat attttgtttc  120
gtataaaaag aataccgtaa gattaaatta aaataaacaa tccgttaaac tgacataata  180
taatattgga aaataaaaaa atatatatgt tttcataaaa aaaaaaactt caagtttgga  240
tcagatttag gaaaagtaaa acctatatt tagttgatga ccgttttacc ataaacaatt   300
atcagtttgt gctgggttaa ttgttaataa aaataatatt aaaatttaat tgaatataac  360
atgaatatat aattttttt tggaaaaact tcttttaaaa tgttacataa attacgatta   420
aatatttta ataccaaatt atatagtatc tggattaaag aggtcaaaaa gtaaacttta   480
aaaaataaaa aaaataaata atagattaat ataagttaga ggacttcaat tattttcat   540
gtggacccct ctaaaagaac ctattttac aaatagattt aaaaccaatc tatttttgga   600
aatggtctcc taaatcaatc aaatttata aaaaaactcc aacactatca aatatataac   660
aattttattc gatcggttaa atagttagaa ttataacaaa ataaaaaaca agataatttt   720
ttcaaaataa tttgaaataa aaaataaggt gtcaaaaatg aacttttatg taaacttaac  780
atcatttgtc atttttgtta caaaacatga ttaatattat tactttgtaa gtgtccactt   840
ttcttcaaac tccttgctta gttaaaaaaa tctataatat atgaaattaa ttttagtttt   900
cttaaactac atatataatt atttttatc aaacttgaat taaaagccta tgacaataac   960
caaaatgaaa tagtatgact tatacatttg ccgttgacta ataaccaaa aaatcgaatt  1020
gacatcagac caaaaccagc tctgtatata ttggttatgt tatgggttat atagagttgt  1080
ttaaaaggca gttatcgatt acgttctcag ttctagagtt ttcacaaaaa tcaattctcc  1140
tgtatcacat cgaaagcaaa ccggtctatt tataaaagag atacatattt gaacaacat   1200
attttttaat tatatttatg tgttgttat aaatctagaa accgtaaat ttatatttag   1260
ttcagtatcc aatataggat ctgaaactac tttataaccg ttaccagaca aataccggtc  1320
aagtttatat tggtgtagtt ttcgattcct ttgattttat atcttttttgg cgccatttca  1380
cgtcaacggt ttaaaaacaa gttatcgttt ctccggtaca gttaaccacc actgctacca  1440
gggccggcca gaaggctgtg cggcttggc tgtggcacag ggcagcaga tttagtccat    1500
ttattatggt ctgctattta tttgggtcca ataagatcag ggcactaaaa ctcaaataca  1560
```

-continued

```
tcaattcaag tcggcggcaa agaataaaa agcgccaatt tttagaagac aaggagacag 1620
cacaataatc atgctttttcc aatgccaat taatttagc ctttgtgagg tataaatatg 1680
aatcactttt tctccaaata tcattattgt aaactagtaa agagcgtaaa ttgtttttatc 1740
gctaatcttc ttcttttttca aatataattg tttgattctt tgtagtaggt acgttaagtt 1800
ttatatcatt cgtcctggaa acctttttcct atgccccttc aatttatgaa tttgtgtttt 1860
gtattgtctt gctattaatc caatgcaaac taattctgcc gcatcgatct cacagagttg 1920
gagcagctta aaaggagttt tgggcaact taaaatgagg gtagcttttt tgttgttgtt 1980
ggtctactat ttactttggt ccttatcgtt ttagttttgt gttcattgag gatttgaatg 2040
actttgaaca caagtttata aaactaagtt tttgtgattc taaattttg atgtgtgcaa 2100
ccgactaaat gaatataaaa ttctgatttg tgtatttctg atttctgatt taccggttat 2160
tcattatgtt tttctggatc tcatatgaat ttagtatata aaaatctcag gttcttctta 2220
ctcagtctag tatattttgg cattgggggat cagggttaaa atcatcattt ttctaagcac 2280
taacaagctt taaaaccatc aattaaaagt tagttctcca tacctggaat tgtttattgc 2340
tttagtattc atttcatagt gtcaatacct tacaactgtt tattgttttc aaatgtttac 2400
tgtttttgcac tttagttgtt tttagcatgt ttcaactttc aaagttaatt gacgatagtg 2460
tcatatacga aatatcatca ctcatacaaa attaaactgg atagaattttt ttccgatgaa 2520
atctatttt aaatagttac gaatataata ggagacttaa tatgtttgtt tcaaaattac 2580
acaaaaacac catggaaatg ggcattagtt tgtataagca tccttttaaa tataaagctt 2640
tgttacattg atgccttcta aatatataat attgtaatga tttgtagtaa acaccatgga 2700
aatgggcatt attaagatgt ttcgcccagg gcatgaaaaa ctatcggacc ggccctgact 2760
gctacaaccg ccacaaataa ccgtcaccgg aatacctata aatacaactt ccattttcaat 2820
cgtctctctc tgcactccca ttctttgaat tcaaaaaagg ctacacacac acacagacaa 2880
caccaagttt gtacaaaaaa gcaggctatg gcagataatg caacaccgg ccgtcaaaag 2940
gatgacgacg gtggccatga tggaccacgc caaaacccaa ctactccacc ctcccttcc 3000
cgcacccctc gaagaccaag gcggaacaca tcaccgccca aacattctcc ggggggcgtct 3060
tcaagcacca tgccagcgcc gcctactccc cctgcgcgca cgggaatcac cggtgcttct 3120
agttcttctg tgggtactaa tataatttca tttattccac ccaaaaccaa aagaacgaag 3180
tcggtgatct gcccgatctg caacaaagat atgtgccatg agaaggcgct gtgtggccac 3240
atccggtggc atacacagga ggaaagattg gcggccagca tcgctatagc aagagcgcta 3300
tcttctaacg ttgttgtttc tggcaatggc gatgaagatg aaggtccatc taaaaagtat 3360
aaactcccgg acctgaacaa atctccaccg ccggaggagg aggacgagga cgctgcctga 3420
ttttcttgcg ggagaggcat gcatgtatgt gtggccttttt tgcaataata ctatgcatgg 3480
gagatgcata aagtttatct ttattttttt tagtttaata atgtgtggca aactttatat 3540
catttatgat ttcggccatg tactgctaca tcgttctagg atggttattc cctagaattt 3600
gctttatgta tttgtttttct ttgttaattc ttctcttcct taaacgttat ttcatgtgaa 3660
ttgcgatgtc acc 3673
```

SEQ ID NO: 65    moltype = DNA    length = 3405
FEATURE          Location/Qualifiers
misc_feature     1..3405
                 note = ToPromoter_LsCoding sequence
source           1..3405
                 mol_type = other DNA
                 organism = synthetic construct

SEQUENCE: 65

```
taaggccata acaaggttat ttgaacattc gcctaaaccc taaaccaact atatctattc 60
ggatttgtta cgagttttag agtttctaga aaatcagtta tatatcgatt aggcttggtt 120
ctaggttata agaaaaaatg attctctatc cggtatgaca tagagacaaa ccggtcacct 180
tttataagaa aatcatattt gaaacaatgt ctagttaata attaattaat atgtgcatgt 240
ttaaatttag aatatcctga atttatatt agtgcgcaac cctatgtaag atcgaactaa 300
ttttaaaccg taaccagaca tgcatgtttg atcagtaata aaaaggctat tatcgtcgaa 360
aatattaaaa caaatataa tatcttatt ggcgccatttt catgtcaacg gttgaaagca 420
agttaccaac gcctccaacc gatcatttct ccggtaacaa ccaactgcta ccagggccgg 480
ccagaaggct gtgcggcttg ggctgtggca caggggcagc agattttagtc catttattat 540
ggtctgctat ttatttgggt ccaataagat cagggcacta aactcaaat acatcaattc 600
aagtcggcgg caaagaata aaagcgcca atttttagaa gacaaggaga cagcacaata 660
atcatgcttt tccaatggcc aattaatttt agcctttgtg aggtataaat atgaatcact 720
ttttctccaa atatcattat tgtaaactag taaagagcgt aaattgtttt atcgctaatc 780
ttcttctttt tcaaatataa ttgtttgatt cttgtgta gta ggtacgttaa gttttatatc 840
attcgtcctg gaaaccttttt cttatgcccc ttcaattttat gaatttgtgt tttgtattgt 900
cttgctatta atccaatgca aactaattct gccgcatcga tctcacagag ttggagcagc 960
ttaaaaggag ttttggggca acttaaaatg agggtagctt ttttgttgtt gttggtctac 1020
tatttacttt ggtccttatc gttttagttt tgtgttcatt gaggatttga atgactttga 1080
acacaagttt ataaaactaa gttttttgtga ttctaaattt ttgatgtgtg caaccgacta 1140
aatgaatata aaattctgat tgtgtattt ctgatttctg atttaccggt tattcattat 1200
gttttttctgg atctcatatg aatttagtat ataaaaatct caggttcttc ttactcagtc 1260
tagtatattt tggcattggg gatcaggggt aaaatcatca ttttttctaag cactaacaag 1320
ctttaaaacc atcaattaaa agttagttct ccatacctgg aattgtttat tgctttagta 1380
ttcatttcat agtgtcaata ccttacaact gtttattgtt ttcaaatgtt tactgtttta 1440
cactttagtt gttttttagca tgtttcaact ttcaaagtta attgacgata gtgtcatata 1500
cgaaatatca tcactcatac aaaattaaac tggatagaat tttttccgat gaaatctatt 1560
tttaaatagt tacgaatata ataggagact taatatgttt gtttcaaaat tacacaaaaa 1620
caccatggaa atgggcatta gtttgtataa gcatcctttt aaaatataaag ctttgttaca 1680
ttgatgcctt ctaaatatat aatattgtaa tgatttgtag taaacaccat ggaaatgggc 1740
attattaaga tgtttcgccc agggcatgaa aaactatcgg accggccctg actgctacta 1800
ataaccgcca ccgcaaaaac ctataaatac aacttccatc acaattctgt ccctactcc 1860
catttcaatc caaaaaaagg ctacacagac atatacagcg ccaagtttgt acaaaaaagc 1920
aggcttcatg gcagatgatg gcaacaccgc ccgtcaacag gctgacgccg gtggccatgg 1980
aaacgcacgt ccaaactcat ccaccccccc ttcgtcaccc tcccaacctc caagaagacc 2040
```

```
acgccgtgcc ggagccacta caccgtcaaa gctttcccag gcggcatctt cgtcaacaaa  2100
tcttccaccg ccgccaacgc caacaccaac tccgccacc  ccttctgccg acgggatatt  2160
actaggtact gcaagaaggc cggtaatatg cccgatttgc aaaaaggata tgtatcatga  2220
aaaggcgctg tgtggccata tacgttggca cacgcaagag gagagactgg cggcaagcag  2280
ggatattgcc cgggcgcttt ctgccaacgt tgtttctgag caaagaggcg atggagaaca  2340
agggccgtct aaacggttca aactgccgga tcttaacgag ccaccaccgt cggaggactg  2400
attttcttgc gggagaggca tgcatgtatg tgtggccttt ttgcaataat actatgcatg  2460
ggagatgcat aaagtttatc tttatttttt ttagtttaat aatgtgtggc aaactttata  2520
tcatttatga tttcggccat gtactgctac atcgttctag gatggttatt ccctagaatt  2580
tgctttatgt atttgttttc tttgttaatt cttctcttcc ttaaacgtta tttcatgtga  2640
attgcgatgt catgatattg caggaatgta acttagaact caacgataaa aagtgtgttg  2700
agatcgtgga agttgatcat ttatcttgaa ttcataagat aagcaacatg agataggata  2760
attaattact gtggggatt  cttttatat  tcatattatt cgttgtaatg caaatttta   2820
agtagaataa cgaatgtgtc ttattattta cggttaaatg caaaagatca ttaacatatc  2880
tccattgatt tgtttactga tgtattctca tgtgttctgt tgctaaattc tattttgaaa  2940
agtatattca attaaagcaa tgcatttag  atataaagca actccataac ttataattgt  3000
gtagatttt  accaattcaa tgtcttaaaa gaaaaataaa aattgaaagt ttaattaatt  3060
gccatagtga tcccgttccc gtcaattatg tgatcaattt ttaccagagc aaaacccac   3120
atttcttgta gtgaacaatc tgtggatgat aaccgatcga agactttgt  ggggatttca  3180
ctaaccaact atttggctct cattaattac tattagttat ataaggccat cccaagtatt  3240
ttggcaatat tcaaaacgag taaactaaa  aattcacttt tggttcttg  tatttctaac  3300
ttttagaatt atgtatttgg ttcttatagt tttttatttg tatgaattac attacttttg  3360
gtccacaata tttttttatt tctataattc cattttagt  cgacc                  3405

SEQ ID NO: 66          moltype = DNA  length = 354
FEATURE                Location/Qualifiers
source                 1..354
                       mol_type = unassigned DNA
                       organism = Taraxacum officinale
SEQUENCE: 66
taattaatat gtgcatgttt aaatttagaa tatcctgaat ttatatttag tgcgcaaccc  60
tatgtaagat cgaactaatt ttaaaccgta accagacatg catgtttgat cagtaataaa  120
aaggctatta tcgtcgaaaa tattaaaaca aaatataata tcttatttgg cgccatttca  180
tgtcaacggt tgaaagcaag ttaccaacgc ctccaaccga tcatttctcc ggtaacaacc  240
aactgctact aataaccgcc accgcaaaaa cctataaata caacttccat cacaattctg  300
tcccctactc ccatttcaat ccaaaaaaag gctacacaga catatacagc gatg         354

SEQ ID NO: 67          moltype = DNA  length = 353
FEATURE                Location/Qualifiers
source                 1..353
                       mol_type = unassigned DNA
                       organism = Taraxacum officinale
SEQUENCE: 67
taattaatat gtgtatgttt aaatttagaa tatcctgaac ttatatttag ttcgcaaccc  60
tatgtaagat cgaactaatt ttaaaccgta accagacgtg catgtttgat cagtaataaa  120
aaggctatca tcgtcgaaaa tattaaaaca aaatataata tcttatttgg cgccatttca  180
tgtcaacggt taaaagcaag ttatcaacgc ctccaaccga tcatttctcc ggtaaccacc  240
aactgctact aataaccgcc accgcaaaaa cctatatata caacttccat cacaattctg  300
tcccctactc ccatttcaat ccaaaaaagg ctacacagac atatacagcg atg          353

SEQ ID NO: 68          moltype = DNA  length = 353
FEATURE                Location/Qualifiers
source                 1..353
                       mol_type = unassigned DNA
                       organism = Taraxacum officinale
SEQUENCE: 68
taattaatat gtgtatgttt aaatttagaa tatcctgaac ttatatttag ttcgcaaccc  60
tatgtaagat cgaactaatt ttaaaccgta accagacatg catgtttgat cagtaataaa  120
aaggctatca tcgtcgaaaa tattaaaaca aaatataatt tcttatttgg cgccatttca  180
tgtcaacggt taaaagcaag ttatcaacgc ctccaaccga tcatttctcc ggtaaccacc  240
aactgctact aataaccgcc accgcaaaaa cctatatata caacttccat cacaattctg  300
tcccctactc ccatttcaat ccaaaaaagg ctacacagac atatacagcg atg          353

SEQ ID NO: 69          moltype = DNA  length = 354
FEATURE                Location/Qualifiers
source                 1..354
                       mol_type = unassigned DNA
                       organism = Taraxacum sp.
SEQUENCE: 69
taaataatat gtgtatgttt aaatttagaa tatcctgaat ttatatttag tgcgcaaccc  60
tatgtaagat cgaactaatt ttaaaccgta accagacatg catgtttgat cagtaataaa  120
aaggctatta tcgtcgaaaa tattaaaaca aaatataata tcttattcgg cgccatttca  180
tgtcaacggt taaaagcaag ttaccaacgc ctccaaccga tcatttctcc ggtaaccacc  240
aactgctact aataaccgcc accgcaaaaa cctataaata caacttccat cacaattctg  300
tcccctactc ccatttcaat ccaaaaaaag gctacacaga catatacagc gatg         354
```

…

MODIFIED PROMOTER OF A PARTHENOGENESIS GENE

CROSS-REFERENCE TO RELATED APPLICATIONS

This application is a continuation of International Patent Application No. PCT/EP2021/078281 filed Oct. 13, 2021, which application claims priority to European Patent Application No. 20201578.0 filed Oct. 13, 2020, the contents of which are all incorporated herein by reference in their entireties.

SEQUENCE LISTING

The instant application contains a Sequence Listing which has been submitted electronically in XML format and is hereby incorporated by reference in its entirety. Said XML copy, created on Sep. 4, 2024, is named 085342-4500_SL.xml and is 185,381 bytes in size.

FIELD OF THE INVENTION

The present invention relates to the field of biotechnology and in particular to plant biotechnology including plant breeding. The invention relates in particular to the identification and uses of genes relating to and useful e.g. in apomixis and haploid induction. The invention in particular relates to a mutant promoter of the gene that is associated with parthenogenesis. The invention further relates to methods for inducing parthenogenesis in plants and crops, to the use of the gene and/or the promoter for apomixis in particular in combination with apomeiotic gene(s), or for the production of haploid plants of which the chromosomes can be doubled to produce doubled haploids.

BACKGROUND OF THE INVENTION

Apomixis (also called agamospermy) is asexual plant reproduction through seeds. Apomixis has been reported in some 400 flowering plant species (Bicknell and Koltunow, 2004). Apomixis in flowering plants occurs in two forms:
  (1) gametophytic apomixis, in which the embryo arises from an unreduced, unfertilized egg cell by parthenogenesis;
  (2) sporophytic apomixis in which the embryo arises somatically from a sporophytic cell.

Examples of gametophytic apomicts are dandelions (*Taraxacum* sp.), hawkweeds (*Hieracium* sp.), Kentucky blue grass (*Poa pratensis*) and eastern gamagrass (*Tripsacum dactyloides*). Examples of sporophytic apomixis are citrus (Citrus sp.) and mangosteen (Garcinia mangostana). Gametophytic apomixis involves two developmental processes:
  (1) the avoidance of meiotic recombination and reduction (apomeiosis); and
  (2) development of the egg cell into an embryo, without fertilization (parthenogenesis).

Apomictically produced seeds are genetically identical to the parental plant. It has been recognized since long that apomixis can be extremely useful in plant breeding (Asker, 1979; Hermsen, 1980; Asker and Jerling, 1990; Vielle-Calzada et al., 1995). The most obvious advantage of the introduction of apomixis into crops is the true breeding of heterotic F1 hybrids. In most crops F1 hybrids are the best performing varieties. However, in sexual crops F1 hybrids have to be produced each generation again by crossing of inbred homozygous parents, because self-fertilization of F1 hybrids causes loss of heterosis by recombination in the genomes of the F2 progeny plants. Producing sexual F1 seeds is a recurrent, complicated and costly process. In contrast, apomictic F1 hybrids would breed true eternally. In other words, genetic fixation of F1 hybrids and production of uniform progeny plants through seed becomes possible.

F1 fixation by apomixis is a special case of the general property of apomixis that any genotype, whatever its genetic complexity, would breed true in one step. This implies that apomixis could be used for immediate fixation of polygenic quantitative traits. It should be noted that most yield traits are polygenic. Apomixis could be used for the stacking (or pyramiding) of multiple traits (for example various resistances, several transgenes, or multiple quantitative trait loci). Without apomixis, in order to fix such a suite of traits, each trait locus must be made homozygous individually and later on combined. As the number of loci involved in a trait increases, the making of these trait loci homozygous by crossing becomes time consuming, logistically challenging and thereby costly. Moreover specific epistatic interactions between alleles are lost by homozygosity. With apomixis it becomes possible to fix this type of non-additive genetic variation. Therefore, apomixis, clonal reproduction through seeds, has the potential to cause of paradigm shift in plant breeding, commercial seed production and agriculture (van Dijk et al. 2016).

Besides instantaneously fixing any genotype, whatever its complexity, there are important additional agricultural uses of apomixis. Sexual interspecific hybrids and autopolyploids often suffer from sterility due to meiotic problems. Since apomixis skips meiosis, with apomixis these problems of interspecific hybrids and autopolyploids can be solved. Since apomixis prevents female hybridization, apomixis coupled with male sterility has been proposed for the containment of transgenes, preventing transgene introgression in wild relatives of transgenic crops (Daniell, 2002). In insect pollinated crops (e.g. *Brassica*) apomictic seed set would not be limited by insufficient pollinator services. This is becoming more important in the light of the increasing health problems of pollinating bee populations (*Varroa* mite infections, African killer bees etc.). In tuber propagated crops, like potato, apomixis would maintain the superior genotype clonally, but reduce or even remove the current risk of virus transmission and related cost in clean production, containment and certification. Also the storage costs of apomictic seeds are much less than that of tubers or other vegetatively propagated plant parts. In ornamentals apomixis could replace labour intensive and expensive tissue culture propagation. It is thought that in general apomixis strongly reduces the costs of cultivar development and plant propagation.

Unfortunately apomixis does not occur in any of the major crops. There have been numerous attempts to introduce apomixis in sexual crops. For instance, introgression of apomixis genes, mutation of sexual model species, de novo generation of apomixis by hybridization, and cloning of candidate genes. Introgression of apomixis genes from wild apomicts into crop species through wide crosses have not been successful so far (e.g. apomixis from *Tripsacum dactyloides* into maize—Savidan, Y., 2001; Morgan et al., 1998; WO97/10704). As to mutating sexual model species, WO2007/066214 describes the use of an apomeiosis mutant called Dyad in *Arabidopsis*. However, the Dyad is a recessive mutation with very low penetrance. In a crop species this mutation is of limited use. Generation of apomixis de novo by hybridization between two sexual ecotypes has not resulted in agronomical interesting apomicts (US2004/0168216 A1 and US2005/0155111 A1). Cloning of candidate apomixis genes by transposon tagging in maize has been described in US2004/0148667. Orthologs of the elongate gene have been claimed, which are supposed to induce apomixis. However, according to Barrell and Grossniklaus (2005), the elongate gene skips meiosis II and therefore does not maintain the maternal genotype, which makes it much less useful.

It has been described in US2006/0179498 that so called Reverse Breeding would be an alternative for apomixis. However, this is a technically complicated in vitro laboratory procedure, whereas apomixis is an in vivo procedure that is carried out by the plants themselves. Moreover, with reverse breeding, once the parental lines have been reconstructed (doubled gamete homozygotes) crossing still has to be carried out.

Apomixis in natural apomicts generally has a genetic basis (reviewed by Ozias-Akins and Van Dijk, 2007). Therefore an alternative method could be the isolation of apomixis genes from natural apomictic species. However this is not an easy task, because natural apomicts often have a polyploid genome and positional cloning in polyploids is very difficult. Other complicating factors are suppression of recombination in apomixis specific chromosomal regions, repetitive sequences and segregation distortion in crosses.

As described herein, there is a need for procedures for inducing apomixis in crops, which are devoid of at least some of the limitations of the present state of the art. Particularly, there is a need for methods for producing apomictic plants and apomictic seeds. There is also a need to provide for genes and proteins involved in the developmental processes of apomixis, particularly parthenogenesis, which are suitable for use in introducing apomixis or (doubled) haploids in crops and which can substantially mimic apomictic pathways.

SUMMARY OF THE INVENTION

The inventors have identified and isolated the parthenogenesis locus and gene, the alleles associated with the parthenogenetic phenotype (indicated herein as the parthenogenetic allele or Par allele) and the non-parthenogenetic phenotype (indicated herein as the sexual allele of the parthenogenesis gene or par allele), their genetic sequences, i.e. promoter sequences, 5'UTR, coding sequences, 3'UTR sequences and encoded protein sequences.

The present invention provides for a method for modifying or altering a par allele into a Par allele, by altering the promoter sequence of said par allele. The present invention is in particular useful for modifying an endogenous par allele into a Par allele, preferably by random or targeted mutagenesis, and optionally by transformation. The resulting mutant allele is capable of transformation a plant and/or its offspring into a plant having, or having an increased, capability of developing an egg cell into an embryo without fertilization.

Definitions

As used herein, the term "locus" (plural: loci) means a specific place (or places) or a site on a chromosome where for example a gene or genetic marker is found. For example, the "parthenogenesis locus" refers to the position in the genome where the parthenogenesis gene is located. Two functional variants have been identified for the parthenogenesis gene, i.e. an allele contributing to the parthenogenetic phenotype, indicated herein as the parthenogenetic allele of the parthenogenesis gene or Par allele, and/or its sexual counterpart(s), indicated herein as a sexual allele of the parthenogenesis gene or par allele.

A gene, allele, protein or nucleic acid being "functional in parthenogenesis" is to be understood herein as contributing to the parthenogenetic phenotype and/or increasing or converting the ability to a plant or plant cell to develop an egg cell into an embryo.

A "Parthenogenesis gene" is a gene that is associated with parthenogenesis, wherein "associated with" is to be understood herein as indicative for the parthenogenetic or the non-parthenogenetic (sexual) phenotype. The genetic sequences of the (dominant) allele (the Par allele) conferring parthenogenesis and its two sexual counterparts (the par alleles or sexual alleles of the parthenogenesis gene) have been identified for the first time in the triploid apomict *Taraxacum officinale* isolate A68, as described in PCT/EP2020/064991, which is incorporated herein by reference. Preferably, the Par allele initiates parthenogenesis. The (dominant) allele conferring parthenogenesis has the genetic sequence of SEQ ID NO: 5 and comprises a promoter having the sequence of SEQ ID NO: 2, a coding sequence having the sequence of SEQ ID NO: 3 and a 3'UTR having the sequence of SEQ ID NO: 4. One of the sexual alleles has the genetic sequence of SEQ ID NO: 10 and comprises a promoter having the sequence of SEQ ID NO: 7, a coding sequence having the sequence of SEQ ID NO: 8 and a 3'UTR having the sequence of SEQ ID NO: 9. The other sexual allele has the genetic sequence of SEQ ID NO: 15 and comprises promoter having the sequence of SEQ ID NO: 12, a coding sequence having the sequence of SEQ ID NO: 13 and a 3'UTR having the sequence of SEQ ID NO: 14. Orthologous genes have been identified in other species based on the characteristic features of the proteins (indicated as the PAR proteins) encoded by these parthenogenesis genes. The presence of a PAR protein in an egg cell may lead to the repression of inhibitors of embryogenesis, triggering cell division without fertilization. These PAR proteins are characterized in that they comprise a zinc finger C2H2-type domain (IPR13087), preferably a zinc finger K2-2-like domain having the consensus sequence C.{2}C.{7}[K/R]A.{2}GH.[R/N].H, which can also be annotated as: CXXCXXXXXXX[K/RJAXXGHX[R/N]XH (SEQ ID NO: 37), wherein X may be any naturally occurring amino acid, wherein [K/R] indicates that the amino acid is lysine or arginine, and wherein R/N] indicates that the amino acid is arginine or asparagine (see Englbrecht et al., 2004). In addition to the zinc finger C2H2-type domain, preferably a zinc finger K2-2-like domain as defined herein, the protein comprises an EAR (Ethylene-responsive element binding factor-associated Amphiphilic Repression) motif having the consensus amino acid sequence DLNXXP (SEQ ID NO: 58) or DLNXP (SEQ ID NO: 59), wherein X may by any naturally occurring amino acid (see Kagale et al., 2010; and Yang et al., 2018). Preferably said EAR motif is located C-terminal. Preferably the zinc finger C2H2-type domain is located N-terminal of said EAR motif. Preferably, the PAR protein has a length of at most 400 amino acids, wherein said protein comprises one or two EAR motifs as indicated herein and a zinc finger K2-2-like domain as defined herein. Preferably, the protein has a length of at most 400 amino acids, wherein said protein comprises only one or two EAR motifs as indicated herein and only one zinc finger K2-2-like domain as defined herein, i.e. no further EAR motifs as defined herein and no further zinc finger K2-2-like domains as defined herein. In addition to the features of the maximum size of 400 amino acids, the only one or two EAR motifs as indicated herein and a single zinc finger K2-2-like domain as defined, the PAR protein may comprise only one further zinc finger domain having the zinc finger consensus sequence of C.{2}C.{12}H.{3}H, which can also be annotated as: CXXCXXXXXXXXXXXXHXXXH (SEQ ID NO: 38), but more preferably comprises no further zinc finger domains having the zinc finger consensus sequence of C.{2}C.{12}H.{3}H (SEQ ID NO: 38). Preferably, the PAR protein has a length of at most 500 amino acids. The PAR protein may be between about 50-500, 100-300 or between about 150-200 amino acids. The PAR protein may have a length of about 170 amino acids. Orthologous parthenogenesis genes may be, but are not limited to, genes encoding for any one of the PAR proteins selected from the group consisting of: PAR protein from *Ananas comosus* (e.g. UniProtKB: A0A199URK4), PAR protein from Apostasia shenzhenica (e.g. UniProtKB: A0A210AZW3), PAR protein from *Arabidopsis thaliana* (e.g. UniProtKB: Q8GXP9, A0A178V2S4, O81793, A0A178V1Q3, AOMFC1, O81801), PAR protein from *Arabidopsis lyrata* subsp. *Lyrata* (e.g. UniProtKB: D7MC52 or D7MCE8), PAR protein from *Arachis* ipaensis (e.g. SEQ ID NO: 45 or SEQ ID NO: 49), PAR protein from Brachypodium distachyon (e.g. UniProtKB: 11JOD9), PAR protein from *Brassica oleracea* var. *oleracea* (e.g. UniProtKB: A0A0D3A1Q6 or A0AOD3A1Q3), PAR protein from *Brassica campestris* (e.g. UniProtKB: A0A398AHT1), PAR protein from *Brassica rapa* (e.g. SEQ ID NO: 47), PAR protein from *Brassica rapa* subsp. *Pekinensis* (e.g. UniProtKB: M4D574 or M4D571), PAR protein from *Brassica oleracea* (e.g. UniProtKB: A0A3P6ESB1 or A0A3P6F726), PAR protein from *Brassica campestris* (e.g. UniProtKB: A0A3P5ZMM3 or A0A3P5Z1M1), PAR protein from Cajanus cajan (e.g.SEQ ID NO: 46), PAR protein from *Capsella rubella* (e.g. UniProtKB: ROH2J1 or ROHOC2), PAR protein from Cephalotus follicularis (e.g. UniProtKB: A0A1Q3CSK1), PAR protein from *Cicer arietinum* (e.g. UniProtKB: A0A3Q7YBZ1, A0A1S2YZL9, A0A3Q7YOZ6 or A0A1S2YZM6; or SEQ ID NO: 55, 56 or 57), PAR protein in *Cichorium endivia* (e.g. SEQ ID NO: 39), PAR protein from *Cucumis sativus* (e.g. UniProtKB: A0A0A0KGW4 or A0A0A0LOX7), PAR protein from *Cucumis melo* (e.g. UniProtKB: A0A1S3BLF2 or A0A1S3B298), PAR protein from *Cucumis sativus* (e.g. UniProtKB: A0A0AOKAW8), PAR protein from *Cucurbita moschata* (e.g. SEQ ID NO: 43), PAR protein from Cuscuta *campestris* (e.g. UniProtKB: A0A484MGR1), PAR protein from Dendrobium catenatum (e.g. UniProtKB: A0A210V7N9, A0A2I0X2T2 or A0A210WOQ8), PAR protein from Dorcoceras hygrometricum (e.g. UniProtKB: A0A2Z7D3Y1), PAR protein from Eutrema salsugineum (e.g. UniProtKB: V4LSH0; or SEQ ID NO: 44), PAR protein from *Fagus sylvatica* (e.g. UniProtKB: A0A2N9E5Y5, A0A2N9HAB9, or A0A2N9H993), PAR protein from Genlisea *aurea* (e.g. UniProtKB: S8E1M6), PAR protein from *Glycine max* (e.g. SEQ ID NO: 51, 52, 53 or 54), PAR protein from *Gossypium hirsutum* (e.g. UniProtKB: A0A1U8LDU9), PAR protein from *Helianthus annuus* (e.g. SEQ ID NO: 21), PAR protein from Hevea *brasiliensis* (e.g. SEQ ID NO: 42), PAR protein in *Hieracium aurantiacum* (e.g. SEQ ID NO: 40), PAR protein from *Juglans regia* (e.g. UniProtKB: A0A214E6B1), PAR protein from *Lactuca sativa* (e.g. UniProtKB: A0A2J6KZF7; or SEQ ID NO: 22), PAR protein from Lagenaria siceraria (e.g. SEQ ID NO: 48), PAR protein from *Medicago truncatula* (e.g. UniProtKB: G7K024), PAR protein from *Morus notabilis* (e.g. UniProtKB: W9SMY3 or W9SMQ7), PAR protein from *Mucuna pruriens* (e.g. UniProtKB: A0A371ELJ8), PAR protein from *Nicotiana attenuata* (e.g. UniProtKB: A0A1J6IQI6), PAR protein from *Nicotiana sylvestris* (e.g. UniProtKB: A0A1U7VXJO), PAR protein from *Nicotiana tabacum* (e.g. UniProtKB: A0A1S4A651 or A0A1S3YHQ2), PAR protein from *Oryza sativa* subsp. *Japonica* (e.g. UniProtKB: B9FGH8), PAR protein from *Oryza barthii* (e.g. UniProtKB: A0A0D3FWX3), PAR protein from *Panicum miliaceum* (e.g. UniProtKB: A0A3L6Q010 or A0A3L6T1D6), PAR protein from *Parasponia andersonii* (e.g. UniProtKB: A0A2P5BMI5), PAR protein from *Populus alba* (e.g. UniProtKB: A0A4U5PSY9), PAR protein from *Populus trichocarpa* (e.g. UniProtKB: B9H661), PAR protein from Punica granatum (e.g. UniProtKB: A0A210IBB9, A0A218XB85 or A0A218W102), PAR protein from *Senecio cambrensis* (e.g. SEQ ID NO: 41), PAR protein from *Prunus persica* (e.g. SEQ ID NO: 50), PAR protein from *Trema orientale* (e.g. UniProtKB: A0A2P5EB04), PAR protein from *Trifolium pratense* (e.g. UniProtKB: A0A2K3N851), PAR protein from *Trifolium* subterraneum (e.g. UniProtKB: A0A2Z6MYD3 or A0A2Z6MDR7), PAR protein from *Trifolium pratense* (e.g. UniProtKB: A0A2K3PR44), PAR protein from *Vitis vinifera* (e.g. UniProtKB: A0A438C778, A0A438ESC4 or A0A438DBR4) and PAR protein from *Zea mays* (e.g. UniProtKB: A0A1D6HF46, B6UAC5, A0A3L6F4S1, A0A3L6EMC6, A0A3L6EMC6, K7UHQ6 or A0A1D6KHZ4). Such gene may also encode for a PAR protein selected from the group consisting of: PAR protein from *Actinidia chinensis* (e.g. UniProtKB: A0A2R6S2S9), PAR protein from *Beta vulgaris* (e.g. UniProtKB: XP_010690656.1), PAR protein from *Solanum tuberosum* (e.g. UniProtKB: XP_015159151.1), PAR protein from *Solanum lycopersicum* (e.g. UniProtKB: A0A3Q7GXB3, Solyc05g055500 or Solyc06g060480), PAR protein from *Capsicum baccatum* (e.g. UniProtKB: A0A2G2WJR7), PAR protein from *Solanum melongena* (e.g. UniProtKB: AVC18974.1), PAR protein from *Glycine soja* (e.g. GeneBank accession: XP_028201014.1, XP_006596577.1 or UniprotKB: A0A445M3M6), PAR protein from *Arachis hypogaea* (e.g. UniProtKB: A0A444WUX5), PAR protein from *Phaseolus vulgaris* (e.g. UniProtKB: V7CIF6), PAR protein from *Daucus carota* (e.g. GeneBank accession: XP_017245413.1), PAR protein from *Triticum aestivum* (e.g. UniProtKB: A0A3B6RP64), PAR protein from *Oryza sativa* subsp. indica (e.g. UniProtKB: A2YH63), PAR protein from *Oryza sativa* subsp. *japonica* (e.g. UniProtKB: Q5Z7P5) and PAR protein from *Theobroma cacao* (e.g. UniProtKB: A0A061DL63). Optionally, an orthologous gene is a gene encoding for a PAR protein that comprises or consists of an amino acid sequence that has at least about 50%, 60%, 70%, 80%, 90%, 95%, 98%, 99% or more identity to any one of SEQ ID NO: 1, 6 and 11, respectively, and/or any one of the orthologues provided herein above preferably when aligned pairwise using e.g. the Needleman and Wunsch algorithm (global sequence alignment) with default parameters and as compared over their whole length.

As used herein, the term "allele(s)" means any of one or more alternative forms of a gene at a particular locus. In a diploid and/or polyploid cell of an organism, alleles of a given gene are located at a specific location, or locus on a chromosome, wherein one allele is present on each chromosome of the set of homologous chromosomes. A diploid and/or polyploid organism or plant species may comprise a large number of different alleles at a particular locus.

The term "dominant allele" as used herein refers the relationship between alleles of one gene in which the effect of one allele (i.e. the dominant allele) masks the contribution of a second allele (i.e. the recessive allele) at the same locus. For genes on an autosome (any chromosome other than a sex chromosome), the alleles and their associated traits are autosomal dominant or autosomal recessive. Dominance is a key concept in Mendelian inheritance and classical genetics. Optionally, a dominant allele codes for a functional protein whereas the recessive allele does not. Optionally, a dominant allele and a recessive allele may encode the same, or substantially the same, functional protein, while only the dominant allele, unlike a recessive allele, is capable of expressing a certain amount of said functional protein under a specific circumstance and/or in a particular tissue thereby converting a particular phenotype like parthenogenesis.

The term "female ovary" (plural: "ovaries") as used herein refers to an enclosure in which spores are formed. It can be composed of a single cell or can be multicellular. All plants, fungi, and many other lineages form ovaries at some point in their life cycle. Ovaries can produce spores by mitosis or meiosis. Generally, within each ovary, meiosis of a megaspore mother cell produces four haploid megaspores. In gymnosperms and angiosperms, only one of these four megaspores is functional at maturity, and the other three degenerate. The megaspore that pertains divides mitotically and develops into the female gametophyte (megagametophyte), which eventually produces one egg cell.

The term "female gamete" as used herein refers to a cell that fuses under normal (sexual) circumstances with another ("male") cell during fertilization (conception) in organisms that sexually reproduce. In species that produce two morphologically distinct types of gametes, and in which each individual produces only one type, a female is any individual that produces the larger type of gamete (called an ovule (ovum) or egg cell). In plants, the female ovule is produced by the ovary of the flower. When mature, the haploid ovule produces the female gamete which is then ready for fertilization. The male cell is (mostly haploid) pollen and is produced by the anther.

The term "genetic marker" or "polymorphic marker" refers to a region on the genomic DNA which can be used to "mark" a particular location on the chromosome. If a genetic marker is tightly linked to a gene or is 'on' a gene it "marks" the DNA on which the gene is found and can therefore be used in a (molecular) marker assay to select for or against the presence of the gene, e.g. in marker assisted breeding/selection (MAS) methods. Examples of genetic markers are AFLP (amplified fragment length polymorphism, EP534858), microsatellite, RFLP (restriction fragment length polymorphism), STS (sequence tagged site), SNP (Single Nucleotide Polymorphism), SFP (Single Feature Polymorphism; see Borevitz et al., 2003), SCAR (sequence characterized amplified region), CAPS markers (cleaved amplified polymorphic sequence) and the like. The further away the marker is from the gene, the more likely it is that recombination (crossing over) takes place between the marker and the gene, whereby the linkage (and co-segregation of marker and gene) is lost. The distance between genetic loci is measured in terms of recombination frequencies and is given in cM (centiMorgans; 1 cM is a meiotic recombination frequency between two markers of 1%). As genome sizes vary greatly between species, the actual physical distance represented by 1 cM (i.e. the kilobases, kb, between two markers) also varies greatly between species.

It is understood that, when referring to "linked" markers herein, this also encompasses markers "on" the gene itself.

"MAS" refers to "marker assisted selection", whereby plants are screened for the presence and/or absence of one or more genetic and/or phenotypic markers in order to accelerate the transfer of the DNA region comprising the marker (and optionally lacking flanking regions) into an (elite) breeding line.

A "molecular marker assay" (or test) refers to a (DNA based) assay that indicates (directly or indirectly) the presence or absence of an allele e.g. a Par or par allele in a plant or plant part. Preferably it allows one to determine whether a particular allele is homozygous or heterozygous at the parthenogenesis locus in any individual plant. For example, in one embodiment a nucleic acid linked to the parthenogenesis locus is amplified using PCR primers, the amplification product is digested enzymatically and, based on the electrophoretically resolved patterns of the amplification product, one can determine which allele(s) is/are present in any individual plant and the zygosity of the allele at the parthenogenesis locus (i.e. the genotype at each locus). Examples are SCAR markers (sequence characterized amplified region), CAPS markers (cleaved amplified polymorphic sequence) and similar marker assays.

As used herein, the term "heterozygous" means a genetic condition existing when two different alleles reside at a specific locus, but are positioned individually on corresponding sets of homologous chromosomes in the cell. Conversely, as used herein, the term "homozygous" means a genetic condition existing when two (or more in case of polyploidy) identical alleles reside at a specific locus, but are positioned individually on corresponding sets of homologous chromosomes in the cell.

A "variety" is used herein in conformity with the UPOV convention and refers to a plant grouping within a single botanical taxon of the lowest known rank, which grouping can be defined by the expression of the characteristics and can be distinguished from any other plant grouping by the expression of at least one of the said characteristics and is considered as a unit with regard to its suitability for being propagated unchanged (stable).

The terms "protein" or "polypeptide" are used interchangeably and refer to molecules consisting of a chain of amino acids, without reference to a specific mode of action, size, 3 dimensional structure or origin. A "fragment" or "portion" of a protein may thus still be referred to as a "protein".

The term "gene" means a DNA sequence comprising a region (transcribed region), which is transcribed into an RNA molecule (e.g. an pre-mRNA which is processed to an mRNA) in a cell, operably linked to suitable regulatory regions (e.g. a promoter). A gene may thus comprise several operably linked sequences, such as a promoter, a 5' leader sequence comprising e.g. sequences involved in translation initiation, a (protein) coding region (cDNA or genomic DNA) and a 3' non-translated sequence comprising e.g. transcription termination sites.

A "chimeric gene" (or recombinant gene) refers to any gene, which is not normally found in nature in a species, in particular a gene in which one or more parts of the nucleotide sequence are present that are not associated with each other in nature. For example the promoter is not associated in nature with part or all of the transcribed region or with another regulatory region.

A "native gene" refers to any gene comprising a promoter sequence, a coding sequence, and optionally a 3'-UTR sequence that can also be found in a naturally occurring gene. Optionally, the nucleotide sequence of a native gene is identical to a sequence found in nature. It is understood herein that the native gene can be a transgene, In this embodiment, the native gene is present in a plant species, wherein the plant species does not naturally comprise said native gene.

An "endogenous gene" is understood herein as a native gene in its natural environment, i.e. present in a plant species in which it is naturally comprised.

A "3'UTR" or "3' non-translated sequence" (also often referred to as 3' untranslated region, or 3' end) refers to the nucleotide sequence found downstream of the coding sequence of a gene, which comprises for example a tranxcription termination site and (in most, but not all eukaryotic mRNAs) a polyadenylation signal (such as e.g. AAUAAA or variants thereof). After termination of transcription, the mRNA transcript may be cleaved downstream of the polyadenylation signal and a poly(A) tail may be added, which is involved in the transport of the mRNA to the cytoplasm (where translation takes place).

A "5'UTR" or "leader sequence" or "5' untranslated region" is a region of the mRNA transcript, and the corresponding DNA, between the +1 position where mRNA transcription begins and the translation start codon of the coding region (usually AUG on the mRNA or ATG on the DNA). The 5'UTR usually contains sites important for translation, mRNA stability and/or turnover, and other regulatory elements.

"Expression of a gene" refers to the process wherein a DNA region, which is operably linked to appropriate regulatory regions, particularly a promoter, is transcribed into an RNA, which is biologically active, i.e. which is capable of being translated into a biologically active protein or peptide (or active peptide fragment) or which is active itself (e.g. in posttranscriptional gene silencing or RNAi). An active protein may refer to a protein being capable of fulfilling its function, which may for instance be inhibition of expression of a certain gene by binding to regulatory elements of a 5'UTR of said gene. An active protein in certain embodiments refers to a protein being constitutively active. The coding sequence is preferably in sense-orientation and encodes a desired, biologically active protein or peptide, or an active peptide fragment. In gene silencing approaches, the DNA sequence is preferably present in the form of an antisense DNA or an inverted repeat DNA, comprising a short sequence of the target gene in antisense or in sense and antisense orientation.

A "transcription regulatory sequence" is herein defined as a nucleotide sequence that is capable of regulating the rate of transcription of a (coding) sequence operably linked to the transcription regulatory sequence. A transcription regulatory sequence as herein defined will thus comprise all of the sequence elements necessary for initiation of transcription (promoter elements), for maintaining and for regulating transcription, including e.g. attenuators or enhancers. Although mostly the upstream (5') transcription regulatory sequences of a coding sequence are referred to, regulatory sequences found downstream (3') of a coding sequence are also encompassed by this definition.

As used herein, the term "promoter" refers to a nucleic acid fragment that functions to control the transcription of one or more DNA regions, located upstream with respect to the direction of transcription of the transcription initiation site, and is structurally identified by the presence of a binding site for DNA-dependent RNA polymerase, transcription initiation sites and any other DNA sequences, including, but not limited to transcription factor binding sites, repressor and activator protein binding sites, and any other sequences of nucleotides known to one of skill in the art to act directly or indirectly to regulate the amount of transcription from the promoter. Optionally the term "promoter" includes herein also 5' UTR region (e.g. the promoter may herein include one or more parts upstream (5') of the translation initiation codon of a gene, as this region may have a role in regulating transcription and/or translation.

A "constitutive" promoter is a promoter that is active in most tissues under most physiological and developmental conditions. An "inducible" promoter is a promoter that is physiologically (e.g. by external application of certain compounds) or developmentally regulated. A "tissue specific" promoter is only active in specific types of tissues or cells. A "promoter active in plants or plant cells" refers to the general capability of the promoter to drive transcription within a plant or plant cell. It does not make any implications about the spatiotemporal activity of the promoter.

As used herein, the term "operably linked" refers to a linkage of polynucleotide elements in a functional relationship. A nucleic acid is "operably linked" when it is placed into a functional relationship with another nucleotide sequence. For instance, a promoter, or rather a transcription regulatory sequence, is operably linked to a coding sequence if it affects the transcription of the coding sequence. Operably linked means that the DNA sequences being linked are typically contiguous and, where necessary to join a promoter sequence to a protein coding sequence or a protein coding sequence to a 3'UTR. A "nucleic acid construct" or "vector" is herein understood to mean a man-made nucleic acid molecule resulting from the use of recombinant DNA technology and which is used to deliver exogenous DNA into a host cell. The vector backbone may for example be a binary or superbinary vector (see e.g. U.S. Pat. No. 5,591,616, US2002138879 and WO95/06722), a co-integrate vector or a T-DNA vector, as known in the art and as described elsewhere herein, into which a gene or chimeric gene is integrated or, if a suitable transcription regulatory sequence is already present, only a desired nucleotide sequence (e.g. a coding sequence, an antisense or an inverted repeat sequence) is integrated downstream of the transcription regulatory sequence. Vectors usually comprise further genetic elements to facilitate their use in molecular cloning, such as e.g. selectable markers, multiple cloning sites and the like.

A "recombinant host cell" or "transformed cell" or "transgenic cell" are terms referring to a new individual cell (or organism) arising as a result of at least one nucleic acid molecule, especially comprising a transgene and/or chimeric gene encoding a desired protein or a nucleotide sequence which upon expression yields a specific protein such as the PAR protein as defined herein, having been introduced into said cell. An "isolated nucleic acid" is used to refer to a nucleic acid which is no longer in its natural environment, for example in vitro or in a recombinant bacterial or plant host cell.

A "host cell" is the original cell to be transformed with a transgene to become a recombinant host cell. The host cell is preferably a plant cell or a bacterial cell. The recombinant host cell may contain the nucleic acid construct as an extra-chromosomally (episomal) replicating molecule, or more preferably, comprises the gene or chimeric gene integrated in the nuclear or plastid genome of the host cell.

A "recombinant plant" or "recombinant plant part" or "transgenic plant" is a plant or plant part (seed or fruit or leaves, for example) which comprises a recombinant gene or chimeric gene or transgene, even though the gene may not be expressed, or not be expressed in all cells.

An "elite event" is a recombinant plant which has been selected to comprise the recombinant gene or transgene at a position in the genome which results in good phenotypic and/or agronomic characteristics of the plant. The flanking DNA of the integration site can be sequenced to characterize the integration site and distinguish the event from other transgenic plants comprising the same recombinant gene at other locations in the genome.

The term "selectable marker" is a term familiar to one of ordinary skill in the art and is used herein to describe any genetic entity which, when expressed, can be used to select for a cell or cells containing the selectable marker. Selectable marker gene products confer for example antibiotic resistance, or more preferably, herbicide resistance or another selectable trait such as a phenotypic trait (e.g. a change in pigmentation) or a nutritional requirement. The term "reporter" is mainly used to refer to visible markers, such as green fluorescent protein (GFP), eGFP, luciferase, GUS and the like.

The term "orthologue" of a gene or protein refers herein to the homologous gene or protein found in another species, which has the same function as the gene or protein, but (usually) diverged in sequence from the time point on when the species harboring the genes diverged (i.e. the genes evolved from a common ancestor by speciation). Orthologues of the *Taxaracum* parthenogenesis gene may thus be identified in other plant species based on both sequence comparisons (e.g. based on percentages sequence identity over the entire sequence or over specific domains) and functional analysis.

The terms "homologous" and "heterologous" refer to the relationship between a nucleic acid or amino acid sequence and its host cell or organism, especially in the context of transgenic organisms. A homologous sequence is thus naturally found in the host species (e.g. a lettuce plant transformed with a lettuce gene), while a heterologous sequence is not naturally found in the host cell (e.g. a lettuce plant transformed with a sequence from potato plants). Depending on the context, the term "homologue" or "homologous" may alternatively refer to sequences which are descendent from a common ancestral sequence (e.g. they may be orthologues).

"Stringent hybridization conditions" can be used to identify nucleotide sequences, which are substantially identical to a given nucleotide sequence. Stringent conditions are sequence dependent and will be different in different circumstances. Generally, stringent conditions are selected to be about 5° C. lower than the thermal melting point (Tm) for the specific sequences at a defined ionic strength and pH. The Tm is the temperature (under defined ionic strength and pH) at which 50% of the target sequence hybridizes to a perfectly matched probe. Typically stringent conditions will be chosen in which the salt concentration is about 0.02 molar at pH 7 and the temperature is at least 60° C. Lowering the salt concentration and/or increasing the temperature increases stringency. Stringent conditions for RNA-DNA hybridizations (Northern blots using a probe of e.g. 100 nt) are for example those which include at least one wash in 0.2×SSC at 63° C. for 20 min, or equivalent conditions. Stringent conditions for DNA-DNA hybridization (Southern blots using a probe of e.g. 100 nt) are for example those which include at least one wash (usually 2) in 0.2×SSC at a temperature of at least 50° C., usually about 55° C., for 20 min, or equivalent conditions. See also Sambrook et al. (1989) and Sambrook and Russell (2001).

"High stringency" conditions can be provided, for example, by hybridization at 65° C. in an aqueous solution containing 6×SSC (20×SSC contains 3.0 M NaCl, 0.3 M Na-citrate, pH 7.0), 5×Denhardt's (100×Denhardt's contains 2% Ficoll, 2% Polyvinyl pyrollidone, 2% Bovine Serum Albumin), 0.5% sodium dodecyl sulphate (SDS), and 20 µg/ml denatured carrier DNA (single-stranded fish sperm DNA, with an average length of 120-3000 nucleotides) as non-specific competitor. Following hybridization, high stringency washing may be done in several steps, with a final wash (about 30 min) at the hybridization temperature in 0.2-0.1×SSC, 0.1% SDS.

"Moderate stringency" refers to conditions equivalent to hybridization in the above described solution but at about 60-62° C. In that case the final wash is performed at the hybridization temperature in 1×SSC, 0.1% SDS.

"Low stringency" refers to conditions equivalent to hybridization in the above described solution at about 50-52° C. In that case, the final wash is performed at the hybridization temperature in 2×SSC, 0.1% SDS. See also Sambrook et al. (1989) and Sambrook and Russell (2001).

"Sequence identity" and "sequence similarity" can be determined by alignment of two peptide or two nucleotide sequences using global or local alignment algorithms, depending on the length of the two sequences. Sequences of similar lengths are preferably aligned using a global alignment algorithms (e.g. Needleman Wunsch) which aligns the sequences optimally over the entire length, while sequences of substantially different lengths are preferably aligned using a local alignment algorithm (e.g. Smith Waterman). Sequences may then be referred to as "substantially identical" or "essentially similar" when they (when optimally aligned by for example the programs GAP or BESTFIT using default parameters) share at least a certain minimal percentage of sequence identity (as defined herein). The percent of sequence identity is preferably determined using the "BESTFIT" or "GAP" program of the Sequence Analysis Software Package™ (Version 10; Genetics Computer Group, Inc., Madison, Wis.). GAP uses the Needleman and Wunsch global alignment algorithm (Needleman and Wunsch, Journal of Molecular Biology 48:443-453, 1970) to align two sequences over their entire length (full length), maximizing the number of matches and minimizing the number of gaps. A global alignment is suitably used to determine sequence identity when the two sequences have similar lengths. Generally, the GAP default parameters are used, with a gap creation penalty=50 (nucleotides)/8 (proteins) and gap extension penalty=3 (nucleotides)/2 (proteins). For nucleotides the default scoring matrix used is nwsgapdna and for proteins the default scoring matrix is Blosum62 (Henikoff & Henikoff, 1992, PNAS 89, 915-919). Sequence alignments and scores for percentage sequence identity may be determined using computer programs, such as the GCG Wisconsin Package, Version 10.3, available from Accelrys Inc., 9685 Scranton Road, San Diego, CA 92121-3752 USA, or using open source software, such as the program "needle" (using the global Needleman Wunsch algorithm) or "water" (using the local Smith Waterman algorithm) in EmbossWIN version 2.10.0, using the same parameters as for GAP above, or using the default settings (both for 'needle' and for 'water' and both for protein and for DNA alignments, the default Gap opening penalty is 10.0 and the default gap extension penalty is 0.5; default scoring matrices are Blossum62 for proteins and DNAFull for DNA). "BESTFIT" performs an optimal alignment of the best segment of similarity between two sequences and inserts gaps to maximize the number of matches using the local homology algorithm of Smith and Waterman (Smith and Waterman, Advances in Applied Mathematics, 2:482-489, 1981, Smith et al., Nucleic Acids Research 11:2205-2220, 1983). When sequences have a substantially different overall lengths, local alignments, such as those using the Smith Waterman algorithm, are preferred.

As used herein "sequence identity" refers to the extent to which two optimally aligned polynucleotide or peptide sequences are invariant throughout a window of alignment of components, e.g., nucleotides or amino acids. An "identity fraction" for aligned segments of a test sequence and a reference sequence is the number of identical components which are shared by the two aligned sequences divided by the total number of components in reference sequence segment, i.e., the entire reference sequence or a smaller defined part of the reference sequence. "Percent identity" is the identity fraction times 100.

Useful methods for determining sequence identity are also disclosed in Guide to Huge Computers, Martin J. Bishop, ed., Academic Press, San Diego, 1994, and Carillo, H., and Lipton, D., Applied Math (1988) 48:1073. More particularly, preferred computer programs for determining sequence identity include the Basic Local Alignment Search Tool (BLAST) programs which are publicly available from National Center Biotechnology Information (NCBI) at the National Library of Medicine, National Institute of Health, Bethesda, Md. 20894; see BLAST Manual, Altschul et al., NCBI, NLM, NIH; Altschul et al., J. Mol. Biol. 215:403-410 (1990); version 2.0 or higher of BLAST programs allows the introduction of gaps (deletions and insertions) into alignments; for peptide sequence BLASTX can be used to determine sequence identity; and, for polynucleotide sequence BLASTN can be used to determine sequence identity.

Alternatively percentage similarity or identity may be determined by searching against public databases, using algorithms such as FASTA, BLAST, etc. Thus, the nucleic acid and protein sequences of the present invention can further be used as a "query sequence" to perform a search against public databases to, for example, identify other family members or related sequences. Such searches can be performed using the BLASTn and BLASTx programs (version 2.0) of Altschul, et al. (1990) J. Mol. Biol. 215:403-10. BLAST nucleotide searches can be performed with the NBLAST program, score=100, wordlength=12 to obtain nucleotide sequences homologous to oxidoreductase nucleic acid molecules of the invention. BLAST protein searches can be performed with the BLASTx program, score=50, wordlength=3 to obtain amino acid sequences homologous to protein molecules of the invention. To obtain gapped alignments for comparison purposes, Gapped BLAST can be utilized as described in Altschul et al., (1997) Nucleic Acids Res. 25 (17): 3389-3402. When utilizing BLAST and Gapped BLAST programs, the default parameters of the respective programs (e.g., BLASTx and BLASTn) can be used. See the homepage of the National Center for Biotechnology Information at http://www.ncbi.nlm.nih.gov/.

The term "sexual plant reproduction" as used herein refers to a developmental pathway where a (e.g. diploid) somatic cell referred to as the "megaspore mother cell" undergoes meiosis to produce four reduced megaspores. One of these megaspores divides mitotically to form the megagametophyte (also known as the embryo sac), which contains a reduced egg cell (i.e. cell having a reduced number of chromosomes compared to the mother) and two reduced polar nuclei. Fertilization of the egg cell by one sperm cell of the pollen grain generates a (e.g. diploid) embryo, while fertilization of the two polar nuclei by the second sperm cell generates the (e.g. triploid) endosperm (process referred to as double fertilization).

The term "megaspore mother cell" or "megasporocyte" as used herein refers to a cell that produces megaspores by reduction, usually meiosis, to create four haploid megaspores which will develop into female gametophytes. In angiosperms (also known as flowering plants), the megaspore mother cell produces a megaspore that develops into a megagametophyte through two distinct processes including megasporogenesis (formation of the megaspore in the nucellus, or megasporangium), and megagametogenesis (development of the megaspore into the megagametophyte).

The term "asexual plant reproduction" as used herein is a process by which plant reproduction is achieved without fertilization and without the fusion of gametes. Asexual reproduction produces new individuals, genetically identical to the parent plants and to each other, except when mutations or somatic recombinations occur. Plants have two main types of asexual reproduction including vegetative reproduction (i.e. involves budding, tillering, etc of a vegetative piece of the original plant) and apomixis.

The term "apomixis" as used herein refers to the formation of seeds by asexual processes. One form of apomixis is characterized by: 1) apomeiosis, which refers to the formation of unreduced embryo sacs in the ovary, and 2) parthenogenesis, which refers to the development of the unreduced egg into an embryo. A few hundred wild plant species feature apomictic reproduction and propagate asexually. Apomeiosis is a process that results into the production of unreduced egg cells, with the same chromosome number and identical or highly similar genotype as the somatic tissue of the mother plant. The unreduced egg cells can be derived from an unreduced megaspore (diplospory) or from a somatic initial cell (apospory). In the case of diplospory, megasporogenesis is replaced by a mitotic division or by a modified meiosis. The modified meiosis is preferably of the first division restitution type, without recombination. Alternatively the modified meiosis can be of the second division restitution type. In a preferred embodiment, apomeiosis is of the diplosporous type affecting the first meiotic division.

Apomixis is known to occur in different forms including at least two forms known as gametophytic apomixis and sporophytic apomixis (also referred to as adventive embryony). Examples of plants where gametophytic apomixis occurs include dandelion (*Taraxacum* sp.), hawkweed (*Hieracium* sp.), Kentucky blue grass (*Poa pratensis*), eastern gamagrass (*Tripsacum dactyloides*) and others. Examples of plants where sporophytic apomixis occurs include citrus (*Citrus* sp.) mangosteen (Garcinia mangostana) and others.

The term "diplospory" as used herein refers to a situation where an unreduced embryo sac is derived from the megaspore mother cell either directly by mitotic division or by aborted meiotic events. Three major types of diplospory have been reported, named after the plants in which they occur, and they are the *Taraxacum*, *Ixeris* and *Antennaria* types. In the *Taraxacum* type, the meiotic prophase is initiated but then the process is aborted resulting in two unreduced dyads one of which gives rise to the embryo sac by mitotic division. In the *Ixeris* type, two further mitotic divisions of the nuclei to give rise to an eight-nucleate embryo sac follow equational division following meiotic prophase. The *Taraxacum* and *Ixeris* types are known as meiotic diplospory because they involve modifications of meiosis. By contrast, in the *Antennaria* type, referred to as mitotic diplospory, the megaspore mother cell does not initiate meiosis and directly divides three times to produce the unreduced embryo sac. In gametophytic apomixis by diplospory, an unreduced gametophyte is produced from an unreduced megaspore. This unreduced megaspore results from either a mitotic-like division (mitotic displory) or a modified meiosis (meiotic displory). In both gametophytic apomixis by apospory and gametophytic apomixis by diplospory, the unreduced egg cell develops parthenogenetically into an embryo. Apomixis in *Taraxacum* is of the diplosporous type, which means that the first female reduction division (meiosis I) is skipped, resulting in two unreduced megaspores with the same genotypes as the mother plant. One of these megaspores degenerates and the other surviving unreduced megaspore gives rise to the unreduced megagametophyte (or embryo sac), containing an unreduced egg cell. This unreduced egg cell develops without fertilization into an embryo with the same genotype as the mother plant. The seeds resulting from the process of gametophytic apomixis are referred to as apomictic seeds.

The term "diplospory function" refers to the capability to induce diplospory in a plant, preferably in the female ovary, preferably in a megaspore mother cell and/or in a female gamete. Thus a plant in which diplospory function is introduced, is capable of performing the diplospory process, i.e. producing unreduced gametes via a meiosis I restitution.

The term "apomictic seeds" as used herein refers to seeds, which are obtained from apomictic plant species or by plants or crops induced to undergo apomixis, particularly gametophytic apomixis through diplospory. Apomictic seeds are characterised in that they are a clone and genetically identical to the parent plant and germinate plants that are capable of true breeding. In the present invention, the "apomictic seeds" also refers to "clonal apomictic seeds".

The term "apomictic plant(s)" as used herein, refers to a plant that reproduce itself asexually, without fertilization. An apomictic plant may be a sexual plant that has been modified to become apomictic, e.g. a sexual plant, which has for instance been genetically modified with one or more of the parthenogenesis genes as taught herein so as to obtain an apomictic plant, or a plant that is the progeny of an apomictic plant. In that case, apomictically produced offspring are genetically identical to the parent plant.

A "clone" of a cell, plant, plant part or seed is characterized in that they are genetically identical to their siblings as well as to the parent plant from which they are derived. Genomic DNA sequences of individual clones are nearly identical, however, mutations may cause minor differences.

The term "true breeding" or "true breeding organism" (also known as pure-bred organism) as used herein refers to an organism that always passes down a certain phenotypic trait unchanged or nearly unchanged to its offspring. An organism is referred to as true breeding for each trait to which this applies, and the term "true breeding" is also used to describe individual genetic traits.

The term "F1 hybrid' (or filial 1 hybrid) as used herein refers to the first filial generation of offspring of distinctly different parental types. The parental types may or may not be inbred lines. F1 hybrids are used in genetics, and in selective breeding, where it may appear as F1 crossbreed. The offspring of distinctly different parental types produce a new, uniform phenotype with a combination of characteristics from the parents. F1 hybrids are associated with distinct advantages such as heterosis, and thus are highly desired in agricultural practice. In an embodiment of the invention, the methods, genes, proteins, variants or fragments thereof as taught herein can be used to fix the genotype of F1 hybrids, regardless of its genetic complexity, and allows production of organisms that can breed true in one step.

The term "pollination" or "pollinating" as used herein refers to the process by which pollen is transferred from the anther (male part) to the stigma (female part) of the plant, thereby enabling fertilization and reproduction. It is unique to the angiosperms, the flower-bearing plants. Each pollen grain is a male haploid gametophyte, adapted to being transported to the female gametophyte, where it can effect fertilization by producing the male gamete (or gametes), in the process of double fertilization. A successful angiosperm pollen grain (gametophyte) containing the male gametes is transported to the stigma, where it germinates and its pollen tube grows down the style to the ovary. Its two gametes travel down the tube to where the gametophyte(s) containing the female gametes are held within the carpel. One nucleus fuses with the polar bodies to produce the endosperm tissues, and the other with the ovule to produce the embryo.

The term "parthenogenesis" as used herein refers to a form of asexual reproduction in which growth and development of embryos occur without fertilization. The genes and proteins of the invention can, preferably in combination with a diplosporous factor, for instance a gene or chemical factor, produce apomictic offspring.

The term "parthenogenesis phenotype" as used herein refers to the ability of a plant and/or its offspring to grow and develop an embryo from an egg cell without fertilization.

The term "pyramiding or stacking gene" as used herein, refers to the process of combining related or unrelated genes from different parental line into one plant, which underlie desirable or favourable traits (e.g. disease resistance traits, colour, drought resistance, pest resistance, etc.). Pyramiding or stacking gene can be performed using traditional breeding methods or can be accelerated by using molecular markers to identify and keep plants that contain the desired allele combination and discard those that do not have the desired allele combination. In an embodiment of the present invention, the parthenogenesis genes as taught herein may be advantageously used in gene pyramiding or stacking program to produce apomictic plants or to introduce apomixis in sexual crops.

In this document and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one". It is further understood that, when referring to "sequences" herein, generally the actual physical molecules with a certain sequence of subunits (e.g. amino acids) are referred to.

As used herein, the term "plant" includes plant cells, plant tissues or organs, plant protoplasts, plant cell tissue cultures from which plants can be regenerated, plant calli, plant cell clumps, and plant cells that are intact in plants, or parts of plants, such as embryos, pollen, ovules, fruit, flowers, leaves (e.g. harvested lettuce crops), seeds, roots, root tips and the like.

DETAILED DESCRIPTION OF THE INVENTION

The present invention provides a method for producing a mutant gene, wherein the mutant gene is functional in parthenogenesis. Preferably, the method comprises a step of mutating the promoter sequence of a sexual variant of the parthenogenesis gene indicated herein as the par allele to increase expression of the encoded PAR protein. The resulting mutant gene may be considered a Par allele as it is capable of inducing the parthenogenesis phenotype to a plant. In case the par allele is an endogenous allele of a plant or plant cell lacking a dominant Par allele, the method of the invention results in the transformation of a plant or plant cell not showing parthenogenesis into a plant or plant cell showing parthenogenesis by modification of the promoter of said par allele. The present invention provides a method to convert the sexual par allele into a parthenogenetic Par allele, by modification of the promoter sequence of the par allele. The present invention provides a method for producing a mutant gene functional in parthenogenesis, comprising the steps of:
- (a) providing a gene comprising a sequence encoding a PAR protein operably linked to a promoter; and
- (b) modifying the promoter by modifying the sequence upstream of the sequence encoding the PAR protein to increase expression of the encoded PAR protein, preferably in the mature female gametophyte.

More in particular, the present invention provides a method for producing a mutant gene functional in parthenogenesis, comprising the steps of:
- (a) providing a gene comprising a sequence encoding a PAR protein operably linked to a promoter comprising one or more transcription factor MYB binding sites; and
- (b) modifying the promoter by modifying the sequence upstream of the one or more transcription factor MYB binding sites to increase expression of the encoded PAR protein, preferably in the mature female gametophyte.

The sequence upstream of the sequence encoding a PAR protein, preferably upstream one or more transcription factor MYB binding sites, may be modified by introducing an enhancer sequence that enhances expression of the PAR protein and/or by removing a repressor sequence that represses expression of the PAR protein. Preferably, an enhancer sequence is inserted, preferably a female gametophyte-specific enhancer sequence. Said insert may be a MITE sequence as defined herein. Alternatively or in addition, the promoter sequence upstream of the sequence encoding a PAR protein, preferably upstream one or more MYB binding sites, is altered by (random) mutagenesis resulting in one or more nucleotide substitutions, insertions and/or deletions, to introduce one or more enhancer sequences and/or to increase expression of the encoded PAR protein.

In addition or alternatively, the present invention provides a method for producing a mutant gene functional in parthenogenesis, comprising the steps of:
- (a) providing a gene comprising a sequence encoding a PAR protein operably linked to a promoter comprising one or more transcription factor MYB binding sites; and
- (b) modifying the promoter by modifying at least one of the one or more transcription factor MYB binding sites to increase expression of the encoded PAR protein.

Preferably, the modified promoter of the mutant gene of the invention results, when present in a plant, in increased expression of the PAR protein encoded by the coding sequence operably linked to said promoter, as compared to the unmodified counterpart, i.e. the (endogenous or native) promoter from which the promoter of the invention is obtained as defined herein. Preferably, said increased expression is at least in the egg cell of the plant comprising the modified promoter and/or mutant gene of the invention. Preferably, the increase in expression is an increase of at least 10, 20, 30, 40, 50, 60, 70, 80, 90 or 100% as compared to the original non-mutant gene (i.e. the gene of step (a) of the method of the invention).

In an embodiment the gene encoding a PAR protein in step a) is not a gene originating from *Arabidopsis thaliana*. In an embodiment, the mutant gene of the invention does not comprise a mutant promoter derived from *Arabidopsis thaliana* DAZ3 having a mutation in one or more of the MYB binding sites.

The gene provided in step (a) is a parthenogenesis gene, preferably a sexual variant of the gene, i.e. a par allele. As the resulting mutant gene is functional in parthenogenesis, the method of the invention may also be considered as a method for converting a sexual allele of a parthenogenesis gene (par allele) into an allele that is functional in parthenogenesis (Par allele).

A transcription factor MYB binding site (also indicated herein as "MYB binding site") is a sequence within a promoter recognized and bound by the transcription factor MYB. MYB proteins are a family of DNA binding proteins comprising varying numbers of MYB domain repeats conferring their ability to bind DNA at a MYB binding site and thereby regulating transcription.

The inventors identified one or more MYB binding sites in a region of about 50-150 bps upstream of the start codon of the par allele. A MYB binding site is defined herein as a sequence of preferably 7 nucleotides that preferably has the nucleotide sequence of NACCNNN, preferably AACCNNN, more preferably AACCGNN, even more preferably AACCG[C/T]N, even more preferably AACCG[C/T]C, and may be AACCGCC, AACCGTC or [T/A]AACCGCC (Borg et al., 2011). Preferably one or more MYB binding site is located between about 60-140 bps, 70-130 bps, 80-120 bps or 90-110 bps upstream of the start codon of the sequence encoding the PAR protein, preferably at most about 200, 190, 180, 170, 160 or 150, 140, 130, 120 or 110 nucleotides upstream of the start codon, even more preferably the 3' terminus of the one or more, preferably two, MYB binding site is located 85, 86, 87, 88, 89, 90, 91, 92, 93, 94, 95, 96, 97, 98, 99, 100, 101, 102, 103, 104, 105, 106, 107, 108, 109 or 110 nucleotides upstream of the start codon of the sequence encoding the PAR protein. In some instances, two MYB binding sites are located in said region. For instance, in lettuce (*Lactuca sativa*) a first MYB binding site is located at position 117-110 nucleotides upstream of the ATG start codon and a second MYB binding site is located at the position 104-98 nucleotides upstream of the of the ATG start codon.

The MYB binding site preferably acts as a binding site of the transcription factor MYB, wherein the MYB transcription factor is an R2R3 transcription factor or an R2R3-MYB transcription factor, wherein said transcription factor MYB may be, or may be variant, homologue or orthologue of, DUO1 (UniProtKB accession A0A178VEK7). The transcription factor preferably has at least 80%, 85%, 90%, 95%, 96%, 97%, 98%, 99% or 100% sequence identity with SEQ ID NO: 62.

In addition or alternatively, the invention may also be considered as a method for producing a mutant gene capable of inducing the parthenogenetic phenotype to a plant, wherein said method comprises the steps of:
- (a) providing a gene comprising a sequence encoding a PAR protein, wherein the sequence is operably linked to a promoter, wherein the promoter optionally comprises one or more transcription factor MYB binding sites; and (b) modifying the promoter to increase expression of the encoded PAR protein, preferably by at least one of:
i) introducing an insert in the promoter sequence upstream of the start codon of the sequence encoding a PAR protein as defined herein, even more preferably upstream or directly upstream of the one or more MYB binding sites as defined herein, to increase expression of the encoded PAR protein preferably by introducing an enhancer sequence or removing a repressor sequence;
ii) introducing a substitution and/or deletion in the promoter sequence upstream of the start codon of the sequence encoding a PAR protein as defined herein, even more preferably upstream or directly upstream of the one or more MYB binding sites as defined herein, wherein the substitution and/or deletion increases expression of the encoded PAR protein preferably by introducing an enhancer sequence or removing a repressor sequence; and
(iii) a combination of (i) and (ii).

Modifying the promoter in the method of the invention may be performed using any conventional method known in the art, such as, but not limited to, introducing an insert or a deletion in the promoter directly upstream of the one or more MYB binding sites as defined herein preferably by random or targeted mutagenesis, optionally through homologous recombination.

Optionally, the insert, substitution or deletion in the promoter may modify or remove one or more MYB binding sites as defined herein.

Hence the invention may also be considered a method for producing a mutant gene capable of inducing the parthenogenetic phenotype to a plant, wherein said method comprises the steps of:
(a) providing a gene comprising a sequence encoding a PAR protein, wherein the sequence is operably linked to a promoter comprising one or more transcription factor MYB binding sites; and
(b) modifying the promoter by modifying the sequence upstream of the one or more transcription factor MYB binding sites to increase expression of the encoded PAR protein by introducing an insert or a deletion in the promoter directly upstream of the one or more MYB binding sites in the promoter as defined herein.

In addition, or alternative, the method of the invention may comprise modifying the promoter by inducing, modifying or removing one or more MYB binding sites as defined herein.

In case the promoter comprises one or more, preferably two, MYB binding sites as defined herein, optionally these one or more, preferably two, MYB binding sites are modified or removed to reduce binding of the transcription factor MYB and/or an insert or deletion is introduced upstream of these one or more MYB binding sites. Modification of a MYB binding site in the method of the invention may be a modification of 1, 2, 3, 4, 5, 6, or 7 nucleotides, preferably of 1, 2 or 3 nucleotides, even more preferably of 1 nucleotide, such that the sequence is no longer a MYB binding site. Preferably said modification is at least a mutation (nucleotide exchange, insertion or deletion) located at the first, second, third, fourth or fifth position of the 7 nucleotides long MYB binding motif as indicated above, i.e. a modification of at least one of the A, A, C, C and G of the motif AACCGNN. Preferably, said modification is at least a mutation (nucleotide exchange, insertion or deletion) located at the first, second, third or fourth position of the 7 nucleotides long MYB binding motif as indicated above, i.e. a modification of at least one of the A, A, C and C of the motive AACCGNN, optionally, a modification of two, three or all four the nucleotides on these positions.

Preferably, the modification results in a decreased or abolished binding of the transcription factor MYB to the MYB binding site. Preferably, the binding affinity is decreased at least about 10%, 20%, 30%, 40%, 50%, 60%, 70%, 80%, 90%, 95%, or 100% when tested under suitable experimental conditions, e.g. as described in Kelemen et al., supra. Optionally, the modification of a MYB binding site may be the deletion of said MYB binding site. Said modification may be performed by random mutagenesis (for instance by chemical or radiation mutagenesis) or targeted mutagenesis (for instance CRISPR-endonuclease mediated mutagenesis). Optionally, multiple (two, three or more) MYB binding sites present in the gene are modified as defined herein in the method of the invention. Optionally, the mutant gene comprises a modified promoter of *Lactuca sativa*, wherein said promoter comprises or consists of the sequence of SEQ ID NO: 17. Optionally, the mutant gene comprises said promoter operably linked to the sequence encoding a *Lactuca sativa* PAR protein, preferably said coding sequence comprises or consists of the sequence of SEQ ID NO: 33. Optionally, the mutant gene comprises or consists of the sequence of SEQ ID NO: 35. The invention also comprises a plant or plant cell, preferably a *Lactuca sativa* plant or plant cell, comprising the mutant gene and/or construct.

In an embodiment, the promoter of a sexual gene, preferably the par gene, may be modified by introducing an insert upstream of the one or more MYB binding sites. The insert may be introduced in close vicinity or directly next to the one or more MYB binding sites. The distance between the insert and the MYB binding site, or in case of multiple MYB binding site, the MYB binding site located most upstream from the coding sequence, is preferably at most 10, 9, 8, 7, 6, 5, 4, 3, 2, 1 or 0 nucleotides. Preferably, the insert is introduced directly upstream of the one or more MYB binding sites. The insert that may be introduced in the promoter of the gene in the method of the invention, preferably comprises a nucleic acid insert, preferably a double-stranded DNA insert, wherein said insert has a length of between 50 and 2000 bp, between 100 and 1900 bp, between 200 and 1800 bp, between 300 and 1700 bp, between 400 and 1600 bp, between 500 and 1500 bp, between 600 and 1400 bp, between 1000 and 1400, between 1200 and 1400, or between 1300 and 1400 bp. Even more preferably, said insert has a length of about 1300 bp. Alternatively or in addition, the insert is between about 1-50 bp, between about 5-30 bp or in between about 10-20 bp. Preferably, said insert is introduced within a promoter upstream (5') of the MYB binding site as defined herein, preferably such that the distance between the MYB binding site and the insert, preferably 3'-end of the insert, is between 0-200 bps, preferably at most 0, 10, 20, 50, 60, 70, 80, 90, 100, 110, 120, 130, 140, 150, 160, 170, 180, 190 or 200 bps. Preferably, said insert is localized such that 3' end nucleotide of the insert is at a position that is homologous to the position of nucleotide 1798 of SEQ ID NO: 2 and/or of nucleotide 1798 of SEQ ID NO: 5. Preferably, said insert is devoid of an open reading frame.

Said insert may be a non-autonomous transposable element, preferably a hAT-derived non-autonomous transposon element. The insert may comprise an enhancer element, preferably a female gametophyte-specific enhancer element. Even more preferably said insert is a Miniature Inverted-Repeat Transposable Elements (MITE) or MITE-like sequence, wherein said MITE or MITE-like sequence is a non-autonomous element, preferably a non-autonomous transposable element, characterized that contains an internal sequence devoid of an open reading frame, that is flanked by terminal inverted repeats (TIRs) which in turn are flanked by small direct repeats (target site duplications, TSDs). The TIRs may have the sequence CAGGGCCGG and/or CCGGCCCTG. The TSD may have the sequence ACTGCTAC. For a further description of MITE, TIR and sequences, referred is to Guo et al, Scientific Reports. 2017 Jun. 1; 7(1):2634 which is incorporated herein by reference. Said insert, preferably said MITE or MITE-like sequence, may have at least about 50%, 60%, 70%, 80%, 90%, 95%, 98%, 99% or more identity to SEQ ID NO: 60. The insert may be introduced synthetically, by recombination and/or targeted genome editing.

Optionally, the mutant gene comprises a modified promoter of *Lactuca sativa*, wherein said promoter comprises or consists of the sequence of SEQ ID NO: 18. Optionally, the mutant gene comprises said promoter operably linked to the sequence encoding a *Lactuca sativa* PAR protein, preferably said coding sequence comprises or consists of the sequence of SEQ ID NO: 33. Optionally, the mutant gene comprises or consists of the sequence of SEQ ID NO: 36. Optionally, the mutant gene comprises a modified promoter of *Lactuca sativa*, wherein said promoter comprises or consists of the sequence of SEQ ID NO: 18 and said promoter is operably linked to the sequence encoding a *Taraxacum officinale* PAR protein, preferably said coding sequence comprises or consists of the sequence of SEQ ID NO: 3. Optionally, the mutant gene comprises or consists of the sequence of SEQ ID NO: 64. The invention also comprises a plant or plant cell, preferably a *Lactuca sativa* plant or plant cell, comprising the mutant gene and/or construct.

Optionally the mutant gene comprises a Par promoter of *Taraxacum officinale*, wherein said promoter comprises or consists of the sequence of SEQ ID NO: 2. Optionally, the mutant gene comprises said promoter operably linked to the sequence encoding a PAR protein, wherein said PAR protein is not the (native) *Taraxacum officinale* PAR protein. Optionally, the mutant gene comprises said promoter operably linked to the sequence encoding an orthologous PAR protein as defined herein above. Optionally, the mutant gene comprises a Par promoter of *Taraxacum officinale*, wherein said promoter comprises or consists of the sequence of SEQ ID NO: 2, and wherein the promoter is operably linked to the sequence encoding a *Lactuca sativa* PAR protein, preferably said coding sequence comprises or consists of the sequence of SEQ ID NO: 33. Optionally, the mutant gene comprises or consists of the sequence of SEQ ID NO: 65.

In another embodiment, the promoter of a sexual gene, preferably the par gene, may be modified by introducing a deletion upstream of the one or more MYB binding sites. The deletion may be introduced in close vicinity or directly next to the one or more MYB binding sites. The distance between the deletion and the MYB binding site, or in case of multiple MYB binding site, the MYB binding site located most upstream from the coding sequence, is preferably at most 200, 150, 50, 40, 30, 20, 10, 9, 8, 7, 6, 5, 4, 3, 2 or 1 nucleotide. Preferably, the deletion is introduced directly upstream of the one or more MYB binding sites. The deletion that may be introduced in the promoter of the gene in the method of the invention, preferably comprises a nucleic acid deletion, preferably a double-stranded DNA deletion, wherein said deletion has a length of between 10 and 1000 bp, between 50 and 900 bp, between 100 and 800 bp, between 200 and 700 bp, between 350 and 600 bp, preferably about 400 bp. Preferably, said deletion is devoid of an open reading frame. The deletion may be introduced by recombination and/or targeted or random genome editing. Optionally, the mutant gene comprises a modified promoter of *Lactuca sativa*, wherein said promoter comprises or consists of the sequence of SEQ ID NO: 20.

Optionally, the mutant gene comprises said promoter operably linked to the sequence encoding a *Lactuca sativa* PAR protein, preferably said coding sequence comprises or consists of the sequence of SEQ ID NO: 33. Optionally, the mutant gene comprises or consists of the sequence of SEQ ID NO: 61. The invention also comprises a plant or plant cell, preferably a *Lactuca sativa* plant or plant cell, comprising the mutant gene and/or construct.

Preferably, the gene of step a) of the method of the invention, and the mutant gene as obtainable by the method of the invention is, or is part of, a nucleic acid molecule, preferably a DNA molecule, even more preferably a genomic DNA molecule. Optionally, said genomic DNA molecule is in a plant cell, preferably a plant protoplast. Modification of the promoter of the sexual gene by the method of the invention and when located in a plant cell, may result in a significant increase in parthenogenesis phenotype of the plant derived from said plant cell as compared to a control plant, wherein preferably the control plant does not show the parthenogenesis phenotype while the plant comprising the mutant gene of the invention shows the parthenogenesis phenotype. The control plant preferably only differs from the plant derived from said plant cell in that the promoter of the par allele is not modified as defined herein. Preferably, the control plant or control plant cell only differs from respectively a plant cell or plant of the invention in that the control plant or control plant cell does not comprise a genetic modification as defined herein.

Preferably, the gene of step (a) is a par allele and modification of the promoter of the par allele as defined herein and when located in a plant cell that is not capable of parthenogenesis, results in a plant that shows the parthenogenesis phenotype. As the mutant gene obtainable by the method of the invention is functional in parthenogenesis, the mutant gene may be considered a Par allele, and the method of the invention may also be considered a method to convert a par allele into a Par allele.

Optionally, modification of the promoter by the method of the invention affects binding of the transcription factor MYB to the promoter, resulting in increased expression of the PAR protein encoded by the gene comprising the promoter. Optionally, the modification results in decreased or abolished binding of the transcription factor MYB. Binding of the transcription factor MYB to the promoter can be evaluated by any assay suitable known by the person skilled in the art, such as, but not limited to in vivo yeast one-hybrid systems (e.g. see Kelemen et al., PLOS One. 2015; 10(10): e0141044).

Random mutagenesis may be, but is not limited to, chemical mutagenesis, gamma radiation, X-ray or fast neutron radiation. Non-limiting examples of chemical mutagenesis include, but are not limited to, EMS (ethyl methanesulfonate), MMS (methyl methanesulfonate), NaN3 (sodium azide) D), ENU (N-ethyl-N-nitrosourea), AzaC (azacytidine) and NQO (4-nitroquinoline 1-oxide). Optionally, mutagenesis systems such as TILLING (Targeting Induced Local Lesions IN Genomics; McCallum et al., 2000, Nat Biotech 18:455, and McCallum et al. 2000, Plant Physiol. 123, 439-442, both incorporated herein by reference) may be used to generate plant lines with a modified gene as defined herein. TILLING uses traditional chemical mutagenesis (e.g. EMS mutagenesis) followed by high-throughput screening for mutations. Thus, plants, seeds and tissues comprising a gene having one or more of the desired mutations may be obtained using TILLING. Targeted mutagenesis is mutagenesis that may be designed to alter a specific nucleotide or nucleic acid sequence. Targeted mutagenesis may be selected from, but is not limited to, a technique selected from oligo-directed mutagenesis, RNA-guided endonucleases (e.g. the CRISPR-technology), TALENs or Zinc finger technology and combinations thereof.

Optionally, the gene of step (a) of the method of the invention is a natural sequence. The gene of step (a) of the method of the invention preferably comprises or consists of a promoter operably linked to a sequence encoding a PAR protein optionally followed by a 3'UTR sequence. The gene provided in step (a) may be part of a plant cell, preferably a plant protoplast, that does not comprise a parthenogenetic allele of a parthenogenesis gene. Preferably said plant cell or protoplast is non-parthenogenetic, i.e. a plant regenerated from said cell or protoplast does not show the parthenogenetic phenotype. Put differently, the gene provided in step (a) is preferably comprised within a plant cell, preferably a plant protoplast, wherein a mutation as defined herein results in an induced or increased parthenogenesis of the plant cell, i.e. a plant regenerated from said mutated cell or protoplast shows the parthenogenetic phenotype.

The gene provided in step (a) of the method of the invention may be a native gene preferably as naturally present in a plant cell. Native sequences are sequences found in nature and are also indicated herein as "wild type" or "natural". Therefore, in this embodiment, the promoter, the coding sequence and the optional 3'UTR are from a single plant species.

Alternatively, the gene provided in step (a) of the method of the invention is a non-natural and/or synthetic gene also denominated herein as a chimeric gene. Optionally, in said chimeric gene, the promoter is operably linked to a coding sequence encoding a PAR protein and/or 3'UTR, wherein said coding sequence and/or 3'UTR is heterologous to the promoter. As a non-limiting example, the promoter may be of another plant species as the coding sequence and/or 3'UTR. Optionally, the promoter and 3'UTR are from a single plant species, and the coding sequence is from another plant species.

Preferably, the gene provided in step (a) of the method of the invention is present in a plant cell or protoplast. Therefore, the method of the invention may comprise a step of providing a protoplast or plant cell comprising the gene of step (a) preceding the step of modifying the promoter of the gene. Preferably, the gene is an endogenous gene that is present in the genome of the protoplast or plant cell. Preferably said protoplast or plant cell is isolated from a plant, preferably of a non-parthenogenetic plant. Preferably said plant does not have a Par allele in its genome. Preferably, the promoter of the gene provided in step (a) that is within the protoplast or plant cell, is modified as defined herein by targeted or random mutagenesis, preferably targeted mutagenesis.

In a particular embodiment of the method of the invention, the plant cell comprising the gene of step (a) may be located in a plant seed. Preferably said seed does not have a Par allele in its genome. Preferably, the promoter of the gene that is within said seed is modified in the method of the invention by targeted or random mutagenesis, preferably random mutagenesis.

After the step of modifying the promoter of the gene, the method of the invention may comprise the step of regenerating a plant from said protoplast or the step of growing a plant from said seed.

In addition, the method of the invention may comprise a step of screening and/or genotyping. Genotyping may be performed by sequencing at least part of the promoter after the modification step (optionally preceded by PCR amplification of genomic DNA and/or a target sequence comprising the promoter of interest), or by any genomic variation analysis method or molecular marker assay known in the art, such as, but not limited to, Sequence Based Genotyping (SBG) or KeyGene® SNPSelect analysis. Also "event specific" PCR diagnostic methods can be developed, where the PCR primers are based on the plant DNA flanking the modification, see U.S. Pat. No. 6,563,026. Similarly, event specific AFLP fingerprints or RFLP fingerprints may be developed which identify the transgenic plant or any plant, seed, tissue or cells derived there from. Genotyping may be performed either directly after the modification step or after growing a callus, a tissue or a plant from the protoplast or seed.

Screening for functionality in parthenogenesis may be assessed directly by comparing the ability of the plant (indicated herein as a test plant) comprising the mutant gene obtained by the method of the invention to grow and develop an embryo from an unfertilized egg cell. Preferably, this ability is compared to such ability of a control plant that preferably only differs from the test plant it does not comprise the mutant gene obtained by the method of the invention. Preferably, said control plant is a plant not comprising a Par allele.

Alternatively or in addition, functionality in parthenogenesis of the mutant gene obtained by the method of the invention can be assessed by complementation of a plant having loss-of-apomixis plant with a construct comprising the mutant gene of the invention. Such loss-of-apomixis plant may be a *Taraxacum officinale* isolate A68 that has been modified to lose the apomictic phenotype by modifying the functional Par allele (e.g. by deletion or knocking out). Such loss-of-apomixis plant may be a *Taraxacum officinale* isolate A68 that comprises a Par allele wherein SEQ ID NO: 23 (encoding PAR protein of SEQ ID NO: 32) as defined herein has been modified to any one of SEQ ID NO: 24-27 to encode the protein of SEQ ID NO: 28-31, respectively (see Table 1). Such loss of apomixis plant of *Taraxacum officinale* isolate A68 may be obtained by targeted genome editing using a CRISPR-Cas9/guide RNA complex, wherein said guide RNA (also indicated herein as gRNA) comprises the target specific sequence of SEQ ID NO: 19, as exemplified herein. Deletion of the Par allele of *Taraxacum officinale* isolate A68 results in loss-of-parthenogenesis and therefore in loss-of-apomixis. The mutant gene obtained by the method of the invention has the capability to induce parthenogenesis, and the apomictic phenotype will be restored (or rescued) upon introduction or transfection of a construct or vector comprising said mutant gene. For *Taraxacum officinale* isolate A68, high seed set in the absence of cross pollination is a clear indication for apomixis. Selfing in this isolate can be excluded as an alternative explanation, because due to an unbalanced triploid male and female meiosis, sexually produced egg cells and pollen grains will have a very low fertility. Preferably, in a complementation assay described above, the mutant gene of the invention is capable of restoring the apomixis in the loss-of-function plant as opposed to the original non-mutant gene. Preferably, said capability means that apomixis is restored in at least 1 out of 200, 1 out of 100, 10 out of 100, 20 out of 100, 30 out of 100, 40 out of 100, 50 out of 100, 60 out of 100, 70 out of 100, 80 out of 100, 90 out of 100 or all loss-of-function plants transformed with the mutant gene show apomixes, preferably as compared to less than 1 out of 500, 1 out of 600, 1 out of 700, 1 out of 800, 1 out of 900 or 1 out 1000 plants transformed with the original non-mutant gene (i.e. the gene provided in step a) of the method of the invention).

The invention also provides a mutant gene obtained by or obtainable by a method of the invention. Preferably, the mutant gene (only) differs from the endogenous or native gene in that it comprises an insert or deletion and/or one or more modified or removed MYB binding sites in the promoter as defined herein. Preferably, the mutant gene of the invention comprising the modified promoter as defined herein is capable of inducing the parthenogenesis phenotype to a plant. In other words, preferably a mutant gene comprising the modified promoter of the invention is functional in parthenogenesis.

Optionally, the gene of step (a) of the method of the invention and/or the mutant gene obtained by the method of the invention is, or is part of, an isolated nucleic acid molecule or nucleic acid construct or (expression) vector. The invention also provides for such isolated nucleic acid molecule, construct or (expression) vector comprising said mutant gene, wherein said construct or vector is capable of converting the mutant gene to a plant upon transfection of said plant with said construct of vector. Said nucleic acid molecule may be, but is not limited to, DNA, and may be, or may be derived of, genomic DNA. The invention also provides for the use of a mutant gene of the invention and/or an isolated nucleic acid, construct or vector comprising said mutant gene for increasing or inducing the parthenogenesis phenotype to a protoplast, plant cell or plant.

The mutant gene of the invention may be a chimeric gene as defined herein, that is optionally part of a genetic construct or nucleic acid vector. The mutant gene of the invention is optionally comprised in an isolated nucleic acid, construct or vector. In one embodiment of the invention, the nucleic acid comprising or consisting of the mutant gene of the invention may be used to make a construct, and/or a vector comprising this nucleic acid for transfer of the nucleic acid into a host cell and production of a functional (preferably capable of inducing parthenogenesis) protein encoded by said nucleic acid in host cells.

Vectors suitable for the introduction of the mutant gene of the invention in plant cells are herein referred to as i.e. "expression vectors". Host cells are preferably plant cells. The construction of a mutant gene, construct and/or vector for, optionally transient but preferably stable, introduction of a mutant gene sequence into the genome of a host cells is generally known in the art.

The invention also provides a plant cell, plant protoplast, plant tissue, seed or plant comprising mutant gene obtained by or obtainable by the method of the invention, and/or comprising the nucleic acid molecule or vector.

The invention also provides a plant cell, plant protoplast, plant tissue, seed or plant comprising the mutant gene, nucleic acid molecule, construct or vector comprising the mutant gene as defined herein. Optionally, said plant cell, plant protoplast, plant tissue, seed or plant is capable of apomeiosis, preferably apomixis.

Preferably, a nucleic acid of the invention is an isolated nucleic acid. In an embodiment, the nucleic acid of the invention may originate from *Taraxacum* lines (e.g. *Taraxacum officinale* sensu lato) or from other plant species. In one embodiment, the nucleic acid of the invention is from a different origin than from *Taraxacum* or *Taraxacum officinale* sensu lato.

Optionally, the nucleic acid or nucleic acid construct of the invention comprising or consisting of the mutant gene obtained by or obtainable by the method of the invention, can be stably inserted into the nuclear genome of a single plant cell, and the so-transformed plant cell can be used to produce a transformed plant that has an altered phenotype, i.e. a parthenogenetic phenotype. In a non-limiting example, a T-DNA vector, comprising the mutant gene as taught herein, in *Agrobacterium tumefaciens* can be used to transform the plant cell, and thereafter, a transformed plant can be regenerated from the transformed plant cell using the procedures described, for example, in EP0116718, EP0270822, PCT publication WO84/02913 and published European Patent application EP0242246 and in Gould et al. (1991). The construction of a T-DNA vector for *Agrobacterium* mediated plant transformation is well known in the art. The T-DNA vector may be either a binary vector as described in EP0120561 and EP0120515 or a co-integrate vector which can integrate into the *Agrobacterium* Ti-plasmid by homologous recombination, as described in EP0116718. Lettuce transformation protocols have been described in, for example, Michelmore et al. (1987) and Chupeau et al. (1989).

Border sequences are described in Gielen et al. (1984). Of course, other types of vectors can be used to transform the plant cell, using procedures such as direct gene transfer (as described, for example in EP0223247), pollen mediated transformation (as described, for example in EP0270356 and WO85/01856), protoplast transformation as, for example, described in U.S. Pat. No. 4,684,611, plant RNA virus-mediated transformation (as described, for example in EP0067553 and U.S. Pat. No. 4,407,956), liposome-mediated transformation (as described, for example in U.S. Pat. No. 4,536,475), and other methods.

In a further embodiment, the mutant gene of the invention may be introduced by somatic hybridization. Somatic hybridization may be done by protoplast fusion (e.g. see Holmes, 2018).

The mutant gene of the invention can also be integrated in the genome for instance by using one or more specific endonucleases (such as a CRISPR-endonuclease/guide RNA complex) for introducing double strand breaks at the appropriate site in the genome and a donor construct comprising the mutant gene of the invention for integration in the genome. The skilled person knows how to design such CRISPR-endonuclease/guide RNA complex for introducing a double strand break and donor construct suitable for integration (for a review, see Bortesi and Fischer, 2015).

Likewise, selection and regeneration of transformed plants from transformed cells is well known in the art. Obviously, for different species and even for different varieties or cultivars of a single species, protocols are specifically adapted for regenerating transformants at high frequency. The invention also encompasses progeny of the transformed plants showing parthenogenesis and comprising the mutant gene of the invention.

Besides transformation of the nuclear genome, also transformation of the plastid genome, preferably chloroplast genome, is included in the invention. One advantage of plastid genome transformation is that the risk of spread of the transgene(s) can be reduced. Plastid genome transformation can be carried out as known in the art, see e.g. Sidorov et al. (1999) or Lutz et al. (2004).

The resulting transformed plant can be used in a conventional plant breeding scheme to produce more transformed plants containing the mutant gene. Single copy transformants can be selected, using e.g. Southern Blot analysis or PCR based methods or the Invader® Technology assay (Third Wave Technologies, Inc.). Transformed cells and plants can easily be distinguished from non-transformed ones by the presence of the mutant gene of the invention, characterized in comprising the modified promoter as defined herein. The sequences of the plant DNA flanking the insertion site of the mutant gene can also be sequenced, whereby an "Event specific" detection method can be developed, for routine use. See for example WO0141558, which describes elite event detection kits (such as PCR detection kits) based for example on the integrated sequence and the flanking (genomic) sequence.

In one embodiment, the invention encompasses a mutant gene that is derived from a par allele originating from a plant that is non-parthenogenetic (and non-apomictic) by nature, and is modified by the method of the invention. Such plant may be a wild or cultivated plant. Said mutant gene is preferably obtained by modification of the promoter by the method of the invention, and is characterized in that it comprises an insert or deletion in the promoter and/or one or more modified or removed MYB binding sites in the promoter as defined herein.

In one embodiment, the mutant gene of the invention, or nucleic acid, vector or construct comprising said mutant gene, has a (genetically) dominant function, preferably provided by (over) expressing a functional protein having the amino acid sequence SEQ ID NO: 1, or a variant or functional fragment thereof, such as an orthologue or fragment thereof found in another plant (i.e. other than *Taraxacum* or *Taraxacum officinale* sensu lato).

Preferably, the mutant gene of the invention, or nucleic acid, vector or construct comprising said mutant gene, encodes a protein or functional fragment(s) thereof which, when produced in the plant, is functional and induces and/or enhances parthenogenesis.

Preferably, the modified promoter, mutant gene, nucleic acid, vector and/or construct do not occur naturally, i.e. do not occur in nature.

The gene provided in step (a) of the method of the invention may be an endogenous gene present in the genome of a plant cell or protoplast. Preferably, said plant cell or protoplast is part of or is isolated from a plant (indicated herein as the originating plant) not having the parthenogenesis phenotype. The plant cell or protoplast comprising the mutant gene obtained by the method of the invention may be part of or regenerate into a plant having the parthenogenesis phenotype or showing a significant increase in parthenogenesis phenotype as compared to the originating plant. Therefore, the present invention also provides a method for converting the parthenogenesis phenotype to a plant or a method for increasing the parthenogenesis phenotype to a plant. In other words, the method of the invention provides for producing a parthenogenetic plant.

Therefore, the invention provides a method for producing a parthenogenetic plant, comprising the steps of:
(A) regenerating and/or growing a plant tissue or a plant from the plant cell or protoplast comprising the mutant gene obtainable by a method for producing a mutant gene as defined herein; and
(B) optionally, screening and/or genotyping the plant tissue or plant obtained in step (A).

Hence, the present invention also provides a method for producing a parthenogenetic plant, wherein said method comprises the steps of:
a) providing one or more plants, plant protoplasts, plant cells, plant tissues or plant seeds comprising a gene encoding a PAR protein operably linked to a promoter, wherein the promoter preferably comprises one or more transcription factor MYB binding sites;
b) modifying the promoter by modifying at least one of the one or more transcription factor MYB binding sites and/or the sequence upstream of the one or more transcription factor MYB binding sites to increase expression of the encoded PAR protein;
c) optionally, growing one or more plants from the modified plant protoplasts, plant cells, plant tissues or seeds obtained in step b); and
d) optionally, screening and/or genotyping the plant protoplasts, plant cells, plant tissues or seeds obtained in step b) or the plant obtained in step b) or c).

Alternatively or in addition, the present invention provides a method for producing a parthenogenetic plant, wherein said method comprises the steps of:
a) providing one or more plants, plant protoplasts, plant cells, plant tissues or plant seeds comprising a gene encoding a PAR protein operably linked to a promoter optionally comprising one or more transcription factor MYB binding sites;
(b) modifying the promoter to increase expression of the encoded PAR protein, preferably by at least one of:
  i) introducing an insert in the promoter sequence upstream of the start codon of the sequence encoding a PAR protein as defined herein, preferably upstream or directly upstream of the one or more transcription factor MYB binding sites, wherein the insert preferably introduces an enhancer sequence or removes a repressor sequence;
  ii) introducing a substitution and/or deletion the promoter sequence upstream of the start codon of the sequence encoding a PAR protein as defined herein, preferably upstream or directly upstream of the one or more transcription factor MYB binding sites, wherein the substitution and/or deletion preferably introduces an enhancer sequence or removes a repressor sequence; and
  (iii) a combination of (i) and (ii).
c) optionally, growing one or more plants from the modified plant protoplasts, plant cells, plant tissues or seeds obtained in step b); and
d) optionally, screening and/or genotyping the plant protoplasts, plant cells, plant tissues or seeds obtained in step b) or the plant obtained in step b) or c).

The parthenogenetic plant produced by a method of the invention may be a plant having a normal meiotic function, i.e. not showing apomeiosis, preferably not being diplosporous and/or not showing diplospory. Preferably the gametophyte of said plant may have a reduced ploidy as compared to its somatic cells. In case of a diploid plant (i.e. having diploid somatic cells), said reduced ploidy may be mono-haploid. Upon induction of parthenogenesis to a plant via the method of the present invention, a gametophyte of said plant may develop in a plant with reduced ploidy, preferably a haploid plant. Hence a method of the invention may be a method of producing a plant with a reduced ploidy, preferably a method of producing a haploid plant. The method preferably comprises the steps of providing a parthenogenetic plant obtainable by a method as defined above, and a subsequent step of allowing said plant to produce seed without fertilization, allowing one or more of said seed to germinate and regenerate into a plant of reduced ploidy, preferably a haploid plant. Said method may comprise the steps of inducing parthenogenesis as defined herein, followed by allowing said plant to produce seed without fertilization, and allowing one or more of said seeds to germinate and regenerate into a plant of reduced ploidy, preferably into a haploid plant (a plant with haploid somatic cells).

A genome with reduced ploidy, preferably a haploid genome, may be doubled spontaneously or induced, preferably by chemical treatment. A preferred chemical treatment is e.g. described in Touchell D H et al, Front Plant Sci. 2020 Jun. 3; 11:722, which is incorporated herein by reference. The chemical treatment may be a treatment with at least one of colchicine, oryzalin, trifluralin and nitrous oxide. Chemical treatment of a plant preferably results in a plant with a doubled haploid genome.

A doubled mono-haploid plant is a plant that has achieved homozygosity at all loci and that can be obtained by whole genome duplication of a mono-haploid genome, preferably using a method as described herein. Such fully homozygous plants are amongst others commercially important for use as parent plants in the production of F1 hybrid seeds. Hence, the invention also provides for a method of producing doubled mono-haploid plants comprising the steps of producing a parthenogenetic plant as defined herein, optionally comprising the step of chemically inducing genome duplication, selecting doubled mono-haploid seed, and optionally allowing said seed to germinate and regenerate into a doubled haploid plant.

The method of the invention is not limited to the production of a doubled mono-haploid plant. The method as described herein is equally suitable for the production other doubled haploid plants, such as, but not limited to, doubled di-haploid, doubled tri-haploid, doubled tetra-haploid, doubled penta-haploid and doubled hexa-haploid plants.

As a non-limiting example, in polyploid crops (e.g. a tetraploid *Solanum tuberosum*), the method of the invention can be used for the production of di-haploid offspring. The degree of heterozygosity of these di-haploids will be much lower than that of the polyploid parents. Selection at the di-haploid level will therefore be much more efficient than at the tetraploid level. The method of the invention can further be used to generate mono-haploids from these di-haploids that are completely homozygous. Di-haploids may facilitate the construction of genetic maps and enable the assembly of phased whole-genome sequences. Valuable traits of interest of a wild diploid species may be introgressed through the use of di-haploids from cultivars produced by the method of the invention. The obtained di-haploids with valuable introgressed traits can be made doubled di-haploid e.g. using a chemical treatment as described herein above, thereby allowing the introgression of the trait of interest into the tetraploid cultivars. The skilled person readily understands that a similar method may be used for the production of a diploid, triploid, pentaploid, hexaploid, heptaploid, septaploid etc. cultivars having an introgressed trait of interest of a wild species.

Preferably, the gene encoding the PAR protein in step a) is a par allele. Preferably, the promoter of the gene is modified in step b) as defined herein, thereby converting a par allele into a Par allele. As the Par allele may be dominant, altering a single par allele into a Par allele of a plant or plant cell, or introducing a mutant gene of the invention in a plant or plant cell for instance by transfection of said plant or plant cell with a vector comprising said mutant gene, can be sufficient to convert a plant from a sexual phenotype to a parthenogenesis phenotype, i.e. resulting in a plant and/or offspring thereof that is capable of growing and developing an embryo from an egg cell without fertilization. Therefore, preferably a single sexual gene, preferably an endogenous gene, present in a plant cell is modified by the method of the invention. Optionally, multiple genes, preferably endogenous genes, present in a plant cell are modified by the method of the invention.

In case the modified promoter is present in a plant cell or protoplast, said plant cell or protoplast may be part of or regenerate into a plant that is thereby converted from having a non-parthenogenesis phenotype into a plant having the parthenogenesis phenotype. Therefore, the present invention also provides a method for conferring the parthenogenesis phenotype to a plant not showing the parthenogenesis phenotype by modifying the promoter of a par allele. In other words, the method of the invention is a method to transform a plant not showing parthenogenesis into a plant showing parthenogenesis. Preferably, the one or more plants, plant protoplasts, plant cells, plant tissues or plant seeds of step a) lack a Par allele and/or or do not show the parthenogenetic phenotype. Similarly, the method of the invention is a method to transform a plant showing limited parthenogenesis into a plant having increased parthenogenesis. The increase or induction of parthenogenesis preferably means that at least 1 out of 200, 1 out of 100, 10 out of 100, 20 out of 100, 30 out of 100, 40 out of 100, 50 out of 100, 60 out of 100, 70 out of 100, 80 out of 100, 90 out of 100 or all plants transformed with the mutant gene of the invention show parthenogenesis, preferably as compared to less than 1 out of 500, 1 out of 600, 1 out of 700, 1 out of 800, 1 out of 900 or 1 out 1000 plants transformed with the original non-mutant gene (i.e. the gene provided in step a) of the method of the invention).

Preferably, the gene of step a) of the method of the invention is a native gene. Optionally, the gene to be modified by the method of the invention is a par allele of *Taraxacum officinale* or any one of the orthologous parthenogenesis genes as defined herein. Preferably said par allele is present in a plant, plant, plant protoplast, plant cell, plant tissue or plant seed that lacks a Par allele and is therefore does not have the parthenogenesis phenotype. By conferring said par allele into a Par allele, the method of the invention preferably results in the transformation of a plant not having the parthogenesis phenotype into a plant having the parthenogenesis phenotype.

Optionally multiple plants, plant protoplasts, plant cells, plant tissues or plant seeds are provided in step a) and after step b) one or more plants, plant protoplasts, plant cells, plant tissues or plant seeds are selected that comprise the modification of the invention, i.e. the insert or deletion and/or modified or removed one or more MYB binding sites, preferably determined by genotyping and/or screening as defined herein. Screening in step B) may thus be screening for the parthenogenesis phenotype.

Apart from genetically modifying a naturally occurring par allele in a plant cell (that may be part of a plant tissue, plant seed or whole plant) or plant protoplast to confer said par allele to a Par allele, and growing and/or developing said cell or protoplast into a parthenogenetic plant, a parthenogenetic plant may also be obtained by transforming a plant or plant cell with a nucleic acid, construct or vector comprising the mutant gene of the invention, i.e. that comprises the modified promoter operably linked to a coding sequence encoding a PAR protein as defined herein, optionally linked to a 3'UTR sequence.

The mutant gene obtained by the method of the invention can be introduced in one or more plant cells by transforming, introgression, somatic hybridization and/or protoplast fusion. Such mutant gene may be located on an exogenous nucleic acid, i.e. a nucleic acid not occurring in said plant cell in nature.

Therefore, the present invention also provides a method for producing a parthenogenetic plant, wherein said method comprises the steps of:
  a. providing one or more plants, plant protoplasts, plant cells, plant tissues or plant seeds;
  b. transforming the one or more plants, plant protoplasts, plant cells, plant tissues or plant seeds with a nucleic acid construct comprising the mutant gene of the present invention;
  c. optionally, growing one or more plants from the plant protoplasts, plant cells, plant tissues or seeds transformed in step b); and
  d. optionally, screening and/or genotyping the plant protoplasts, plant cells, plant tissues or seeds obtained in step b) or the plant obtained in step b) or c).

Preferably, the one or more plants of step a. lack a Par allele and/or do not show the parthenogenetic phenotype.

In a further aspect, the present invention relates to plants (including e.g. plant cells, organs, seeds and plant parts), as obtained by any of the methods defined above. Preferably, these are parthenogenetic plants or show increased parthenogenesis as compared to a native or unmodified plant. Preferably, the plant of the invention is obtained by a technical means, preferably by a method as described herein. Such technical means are well-known to the skilled person and include genetic modifications, such as e.g. at least one of random mutagenesis, targeted mutagenesis and nucleic acid insertions or deletions.

Preferably, the plant of the invention is not obtained by an essentially biological process. Preferably, the plant of the invention is not exclusively obtained by an essentially biological process. Preferably, the plant of the invention is not obtained, preferably not directly obtained, by any essentially biological process that introduces parthenogenesis in a plant. Preferably, the plant of the invention is not exclusively obtained by any essentially biological process that introduces parthenogenesis in a plant. Preferably, the plant of the invention is not a naturally occurring plant, i.e. is not a plant that occurs in nature.

In an embodiment, the promoter of the gene of the method of the invention is an upstream transcription regulatory region, e.g. within about 2000 bp upstream of the translation start codon and/or transcription start site of the gene and can be isolated from apomictic plants and/or other plants using known methods, such as TAIL-PCR (Liu et al., 1995; Liu et al., 2005), Linker-PCR, or Inverse PCR (IPCR). A chimeric gene as defined herein may be produced by linking the promoter to a coding sequence as taught herein, preferably having the amino acid sequence of SEQ ID NO: 1, or functional variant and/or fragment thereof, which is optionally subsequently linked upstream (i.e. 5') of a suitable 3' end non-translated region ("3' end" or 3'UTR). Suitable 3' ends include those of the CaMV 35S gene ("3' 35S"), the nopaline synthase gene ("3' nos") (Depicker et al., 1982), the octopine synthase gene ("3' ocs") (Gielen et al., 1984) and the T-DNA gene 7 ("3' gene 7") (Velten and Schell, 1985), which act as 3'-untranslated DNA sequences in transformed plant cells, and others. In one embodiment, a 3'UTR of a native parthenogenesis gene is used, or a 3'UTR derived therefrom. For example, any 3'UTR derived from SEQ ID NO: 4, or a variant or fragment thereof, may be used. The 3'UTR may have the nucleotide sequence of SEQ ID NO: 4.

Introduction of the T-DNA vector into *Agrobacterium* can be carried out using known methods, such as electroporation or triparental mating.

A mutant gene as taught herein, can optionally be inserted in the plant genome as a hybrid gene sequence linked in-frame to a (U.S. Pat. No. 5,254,799; Vaeck et al., 1987) gene encoding a selectable or scorable marker, such as for example the neo (or nptII) gene (EP0242236) encoding kanamycin resistance, so that the plant that comprises the nucleic acid is easily detectable.

Optionally, the mutant gene of the invention can be changed to modify possibly (further) transcription factor binding sites, preferably to modify binding sites for transcription factors that repress gene transcription.

In one embodiment, the PAR protein encoded by the nucleic acid of the invention as taught herein is co-expressed with other proteins which control, preferably enhance or induce, parthenogenesis, apomeiosis or apomixis in a single host, optionally under control of different promoters. Such other gene may be the gene for conferring apomeiosis, such as diplospory e.g. as described in WO2017/039452 A1, which is incorporated herein by reference.

In another embodiment, the mutant gene of the invention is introgressed in germplasm that preferably comprises other genes of interest, such as the gene for conferring apomeiosis (e.g. the gene for diplospory). Via crossing and selection, hybrids are produced wherein several genes of interest may be stacked.

Optionally, the plant mutated or transformed by the method of the invention is a plant that is capable of apomeiosis. Preferably a plant capable of apomeiosis is modified to comprise a mutant gene functional in parthenogenesis as defined herein. Such mutation or modification will then result in an apomictic plant or plant cell. In that case, the screening in step B) of the method of producing a parthenogenetic plant as defined herein may be for the apomictic phenotype. A plant cell capable of apomeiosis may be obtained by introduction a nucleic acid capable of conferring apomeiosis. Optionally said nucleic acid is introduced in a plant cell before, together or after the introduction of a mutant gene of the present invention.

The invention also provides a method of producing an apomictic hybrid seed, comprising the steps of:
  (1) cross-fertilizing a sexually reproducing first plant with the pollen of a second plant to produce F1 hybrid seeds; and
  (2) optionally selecting from the said F1 seeds a seed that comprise the apomictic phenotype;
wherein said first and/or second plant is capable of apomeiosis and wherein said second plant is a parthenogenetic plant obtained or obtainable by the method of the invention, and wherein preferably said selecting is performed by genotyping. Optionally, said method further comprises the step of selecting from the said F1, seeds that comprise the apomictic phenotype, preferably by genotyping, and optionally growing at least one F1 plant from said F1 hybrid seed.

Preferably, for selection purposes but also for weed control options, the transgenic plants of the invention are also transformed with a DNA encoding a protein conferring resistance to herbicide, such as a broad-spectrum herbicide, for example herbicides based on glufosinate ammonium as active ingredient (e.g. Liberty® or BASTA; resistance is conferred by the PAT or bar gene; see EP 0 242 236 and EP 0 242 246) or glyphosate (e.g. RoundUp®; resistance is conferred by EPSPS genes, see e.g. EPO 508 909 and EP 0

507 698). Using herbicide resistance genes (or other genes conferring a desired phenotype) as selectable marker further has the advantage that the introduction of antibiotic resistance genes can be avoided.

Alternatively or in addition, other selectable marker genes may be used, such as antibiotic resistance genes. As it is generally not accepted to retain antibiotic resistance genes in the transformed host plants, these genes can be removed again following selection of the transformants. Different technologies exist for removal of transgenes. One method to achieve removal is by flanking the transgene with lox sites and, following selection, crossing the transformed plant with a CRE recombinase-expressing plant (see e.g. EP506763B1). Site specific recombination results in excision of the marker gene. Another site specific recombination system is the FLP/FRT system described in EP686191 and U.S. Pat. No. 5,527,695. Site specific recombination systems such as CRE/LOX and FLP/FRT may also be used for gene stacking purposes. Further, one-component excision systems have been described, see e.g. WO9737012 or WO9500555).

Preferably, the mutant gene of the invention is used to generate transgenic plant cells, plants, plant seeds, etc. and any derivatives/progeny thereof, with an enhanced parthenogenetic phenotype. Preferably, the transgenic plants of the invention comprise enhanced parthenogenesis compared to the unmodified control plant. Thus, for example transgenic lettuce plants comprise enhanced parthenogenesis are provided. Thus, a plant comprising a mutant gene of the invention shows a significant increase in parthenogenesis, as compared to the same plant not comprising said mutant gene. The enhanced parthenogenesis phenotype can be fine-tuned by expressing a suitable amount of the protein encoded by the mutant gene of the invention capable of inducing parthenogenesis at a suitable time and/or location. Such fine-tuning may be done by determining the most appropriate promoter modification and/or by selecting transgenic "events" which show the desired expression level.

Transformants, hybrids or inbreds expressing desired levels of the protein encoded by the mutant gene of the invention are selected by e.g. analysing copy number (Southern blot analysis), mRNA transcript levels (e.g. RT-PCR using primer pairs capable of amplifying the protein encoded by the mutant gene of the invention or flanking primers) or by analysing the presence and level of parthenogenesis protein in various tissues (e.g. SDS-PAGE; ELISA assays, etc). Single copy transformants may be selected, for instance for regulatory reasons, and the sequences flanking the site of insertion of the mutant gene is analysed, preferably sequenced to characterize the "event". Transgenic events resulting in high or moderate expression of the protein encoded by the mutant gene of the invention are selected for further development until a high performing elite event with a stable transgene is obtained.

Transformants comprising a mutant gene of the invention, may also comprise (other) transgenes, such as genes conferring disease resistance or conferring tolerance to other biotic and/or abiotic stresses, or conferring diplospory. To obtain such plants with "stacked" transgenes, other transgenes may either be introduced into said transformants, or said transformants may be transformed subsequently with one or more other genes, or alternatively several chimeric genes may be used to transform a plant line or variety. For example, several transgenes may be present on a single vector, or may be present on different vectors which are co-transformed.

In one embodiment the following genes are combined with the mutant gene of the invention: known disease resistance genes, especially genes conferring enhanced resistance to necrotrophic pathogens, virus resistance genes, insect resistance genes, abiotic stress resistance genes (e.g. drought tolerance, salt tolerance, heat- or cold tolerance, etc.), herbicide resistance genes, and the like. The stacked transformants may thus have an even broader biotic and/or abiotic stress tolerance, to pathogen resistance, insect resistance, nematode resistance, salinity, cold stress, heat stress, water stress, etc.

Whole plants, plant parts (e.g. seeds, cells, tissues), and plant products (e.g. fruits) and progeny of any of the plants described herein are encompassed herein and can be identified by the presence of the mutant gene, for example by PCR analysis using total genomic DNA as template and using PCR primer pairs specific for the mutant gene of the invention and/or by using genomic variation analysis such as, but not limited to, Sequence Based Genotyping (SBG) or KeyGene® SNPSelect analysis. Also "event specific" PCR diagnostic methods can be developed, where the PCR primers are based on the plant DNA flanking the inserted modification or transgene, see U.S. Pat. No. 6,563,026. Similarly, event specific AFLP fingerprints or RFLP fingerprints may be developed which identify the transgenic or mutant plant of the invention, or any plant, seed, tissue or cells derived there from.

It is understood that the transgenic or mutant plants according to the invention preferably do not show non-desired phenotypes, such as yield reduction, enhanced susceptibility to diseases (especially to necrotrophs) or undesired architectural changes (dwarfing, deformations) etc. and that, if such phenotypes are seen in the primary transformants, these can be removed by conventional methods. Any of the transgenic or mutant plants described herein may be heterozygous, homozygous or hemizygous for the mutant gene.

The invention also pertains to a plant, seed, plant part (e.g. a plant cell) and plant product obtained or obtainable by the method as detailed herein, preferably comprising the mutant gene of the invention, the nucleic acid of the invention and/or the construct of the invention. Preferably said mutant gene, nucleic acid and/or construct is capable of inducing parthenogenesis and/or functional in parthenogenesis, as detailed herein. The plant of the invention preferably is of a species listed herein as suitable host plant. Such method to obtain a plant of the invention include, but is not limited to, random or targeted mutagenesis, introgression of the mutant gene of the invention from a plant into progeny, and/or transformation of plant cells by a mutant gene of the invention, and subsequent regeneration of a plant from said plant cell.

Preferably the plant, plant part and/or plant product is not of the species *Taraxacum officinale* sensu lato, comprising a mutant gene of the invention. Preferably, the plant, plant part and/or plant product is an eudicot. Said plant or plant cell preferably is of a species listed herein as suitable host plant, preferably from the family selected from the group consisting of Brassicaceae, Cucurbitaceae, Fabaceae, Gramineae, Solanaceae and Asteraceae (Compositae).

Preferably the plant, plant part and/or plant product comprising the mutant gene of the invention is obtained by genetic modification or by introgression, wherein preferably said mutant gene is located in its genome. Preferably said plant, plant part and/or plant product is capable of parthenogenesis and/or shows parthenogenesis. Even more preferably said plant, plant part and/or plant product is further capable of apomeiosis. The invention provides seed, plant parts or plant products of a plant or plant cell of the invention.

The invention also pertains to plant parts and plant products derived from the plant of the invention, wherein the plant parts and/or plant products comprise the mutant gene of the invention as defined herein, the nucleic acid of the invention as defined herein and/or the construct of the invention as defined herein, which may be fragments as defined herein that allow for assessing the presence of such protein, mutant gene, nucleic acid or construct in the plant from which the plant part of plant product is derived. Such parts and/or products may be seed or fruit and/or products derived therefrom (e.g. sugars or protein). Such parts, products and/or products derived therefrom may be non-propagating material.

Any plant may be a suitable host, but most preferably the host plant species should be a plant species which would benefit from enhanced parthenogenesis. Suitable hosts include any plant species. Particularly, cultivars or breeding lines having otherwise good agronomic characteristics are preferred. The skilled person knows how to test whether the mutant gene as taught herein, and/or variants or fragments thereof, can confer the required increase or reduction of parthenogenesis onto the host plant, by generating transgenic plants and assessing parthenogenesis, together with suitable control plants.

Suitable host plants include for example hosts which belong to the Brassicaceae, Cucurbitaceae, Fabaceae, Gramineae, Solanaceae, Asteraceae (Compositae), Rosaceae or Poaceae.

In a preferred embodiment, the host plant may be a plant species selected from the group consisting of the genera *Taraxacum, Lactuca, Pisum, Capsicum, Solanum, Cucumis, Zea, Gossypium, Glycine, Tryticum, Oryza* and *Sorghum.*

In a preferred embodiment, the plant, plant part, plant cell or seed as taught herein is from a species selected from the group consisting of the genera *Taraxacum, Lactuca, Pisum, Capsicum, Solanum, Cucumis, Zea, Gossypium, Glycine, Triticum, Oryza, Allium, Brassica, Helianthus, Beta, Cichorium, Chrysanthemum, Pennisetum, Secale, Hordeum, Medicago, Phaseolus, Rosa, Lilium, Coffea, Linum, Canabis, Cassava, Daucus, Cucurbita, Citrullus,* and *Sorghum.*

Suitable host plants include for example maize/corn (*Zea* species), wheat (*Triticum* species), barley (e.g. *Hordeum vulgare*), oat (e.g. *Avena sativa*), sorghum (*Sorghum bicolor*), rye (*Secale cereale*), soybean (*Glycine* spp, e.g. *G. max*), cotton (*Gossypium* species, e.g. *G. hirsutum, G. barbadense*), *Brassica* spp. (e.g. *B. napus, B. juncea, B. oleracea, B. rapa*, etc), sunflower (*Helianthus annus*), safflower, yam, cassava, alfalfa (*Medicago sativa*), rice (*Oryza* species, e.g. *O. sativa* indica cultivar-group or *japonica* cultivar-group), forage grasses, pearl millet (*Pennisetum* spp. e.g. *P. glaucum*), tree species (*Pinus*, poplar, fir, plantain, etc), tea, coffea, oil palm, coconut, vegetable species, such as pea, zucchini, beans (e.g. *Phaseolus* species), hot pepper, cucumber, artichoke, asparagus, eggplant, broccoli, garlic, leek, lettuce, onion, radish, turnip, tomato, potato, Brussels sprouts, carrot, cauliflower, chicory, celery, spinach, endive, fennel, beet, fleshy fruit bearing plants (grapes, peaches, plums, strawberry, mango, apple, plum, cherry, apricot, banana, blackberry, blueberry, citrus, kiwi, figs, lemon, lime, nectarines, raspberry, watermelon, orange, grapefruit, etc.), ornamental species (e.g. Rose, *Petunia, Chrysanthemum, Lily, Gerbera* species), herbs (mint, parsley, basil, thyme, etc.), woody trees (e.g. species of *Populus, Salix, Quercus, Eucalyptus*), fibre species e.g. flax (*Linum usitatissimum*) and hemp (*Cannabis sativa*).

A mutant gene obtained or obtainable by the method of the invention or a nucleic acid of the invention comprising said mutant gene may be used for conferring parthenogenesis, for conferring apomixis for increasing ploidy and/or for producing a double haploid. Preferably said use is in plant biotechnology and/or breeding, i.e. in/on plant or plant cells.

Parthenogenesis is an element of apomixis and a gene for parthenogenesis could be used in combination with a gene for apomeiosis (e.g. diplospory) to generate apomixis, preferably to use it for the applications listed herein. These genes can be introduced into sexual crops by transformation, introgression or by modifying endogenous suitable genes thereby converting them in apomeiotic (or diplosporous) genes. Knowledge of the structure and function of the apomixis genes can also be used to modify endogenous sexual reproduction genes in such a way that they become apomixis genes. The preferred use would be to bring the apomixis genes under a inducible promoter such that apomixis can be switched off when sexual reproduction generates new genotypes and switched on when apomixis is needed to propagate the elite genotypes.

The mutant gene of the invention can be used as a component of apomixis. Both apomeiosis and parthenogenesis are required for functional gametophytic apomixis. Apomeiosis can be achieved by a combination of mutations affecting meiosis (Crismani et al., 2013), with the outcome of chromosomal non-reduction in megaspores, i.e., mitosis rather than meiosis. Somatic cells that assume a gametophytic fate through epigenetic alterations (Grimanelli, 2012) also result in unreduced spore-like cells that potentially can give rise to unreduced gametes (egg cells). In another embodiment, apomeiosis is achieved by transgenic or non-transgenic expression of a natural apomeiosis gene. By whatever means unreduced egg cells are formed, proper temporal and spatial expression from the mutant gene of the invention can induce the egg cells to behave as zygotes and divide in the absence of fertilization.

A mutant gene of the invention could be used in entirely new ways, e.g. not directly as tool in apomixis. For example whereas in apomixis both parthenogenesis and apomeiosis are combined in a single plant, the use of apomeiosis in one generation and the use of parthenogenesis in the next generation would link sexual gene pools of a crop at the diploid and at the polyploid level, by going up in ploidy level by apomeiosis and going down in ploidy level by parthenogenesis. This is very useful because polyploid populations may be better for mutation induction because they can tolerate more mutations. Polyploid plants can also be more vigorous. However diploid populations are better for selection and diploid crosses are better for genetic mapping, the construction of BAC libraries etc. Parthenogenesis in polyploids may generate haploids which can be crossed with diploids. Diplospory in diploids generates unreduced 2n egg cells which can be fertilized by pollen from polyploids to produce polyploid offspring. Thus, an alternation of apomeiosis and parthenogenesis in different breeding generations links the diploid and the polyploid gene pools.

Another use of the mutant gene of the invention without apomeiosis, is the production of haploid offspring, which could be used for the production of haploids and by genome doubling of doubled haploids (DHs) (e.g. spontaneous genome doubling, colchicine, sodium azide or other chemicals). Doubled haploids can be used as parents to produce sexual F1 hybrids. Doubled haploids is the fastest methods to make plants homozygous. With doubled haploids plants can be made homozygous, whereas with the second fastest method, selfing, it takes 5-7 generations to reach a sufficiently high level of homozygosity in diploid plants. There are several methods to produce doubled haploids. In some plant species haploids can be generated by microspore culture. Other methods are the production of haploid embryos (gynogenesis) by pollination with irradiated pollen (melon), or the pollination with specific pollinator stocks (maize, potato). These methods have their limitations, such as costs, recalcitrance of genotypes, labour intensity etc. In some crops no methods for haploid production exist (e.g. tomato). With the dominant allele of the parthenogenesis gene the frequency of gynogenesis could be significantly increased, reducing the costs of haploid production.

The following non-limiting Examples illustrate the different embodiments of the invention. Unless stated otherwise in the Examples, all recombinant DNA techniques are carried out according to standard protocols as described in Sambrook et al. (1989), and Sambrook and Russell (2001); and in Volumes 1 and 2 of Ausubel et al. (1994). Standard materials and methods for plant molecular work are described in Plant Molecular Biology Labfax (1993) by R. D. D. Croy, jointly published by BIOS Scientific Publications Ltd (UK) and Blackwell Scientific Publications, UK.

TABLE 1

Overview of SEQ ID NOs used herein.

| SEQ ID NO | Name |
|---|---|
| 1 | Par allele protein *Taraxacum officinale* |
| 2 | Par allele promoter *Taraxacum officinale* |
| 3 | Par allele coding sequence *Taraxacum officinale* |
| 4 | Par allele 3'UTR *Taraxacum officinale* |
| 5 | Par allele gene *Taraxacum officinale* |
| 6 | par allele-1 protein *Taraxacum officinale* |
| 7 | par allele-1 promoter *Taraxacum officinale* |
| 8 | par allele-1 coding sequence *Taraxacum officinale* |
| 9 | par allele-1 3'UTR gene *Taraxacum officinale* |
| 10 | par allele-1 gene *Taraxacum officinale* |
| 11 | par allele-2 protein *Taraxacum officinale* |
| 12 | par allele-2 promoter *Taraxacum officinale* |
| 13 | par allele-2 coding sequence *Taraxacum officinale* |
| 14 | par allele-2 3'UTR gene *Taraxacum officinale* |
| 15 | par allele-2 gene *Taraxacum officinale* |
| 16 | *Lactuca sativa* LSAT_8X112340 promoter |
| 17 | *Lactuca sativa* LSAT_8X112340 promoter without 2 MYB binding sites |
| 18 | *Lactuca sativa* LSAT_8X112340 promoter with *Taraxacum officinale* Par allele MITE insertion |
| 19 | gene specific part of guide RNA-1 for Par allele |
| 20 | *Lactuca sativa* LSAT_8X112340 promoter with deletion |
| 21 | *Helianthus annuus*_XR_002563155.1 |
| 22 | *Lactuca sativa* _PLY80414.1 |
| 23 | nucleotides 325-360 of the Par allele (wild type) |
| 24 | mutated sequence of nucleotides 325-360 of the Par allele (1 bp insertion) |
| 25 | mutated sequence of nucleotides 325-360 of the Par allele (1 bp insertion) |
| 26 | mutated sequence of nucleotides 325-360 of the Par allele (1 bp deletion) |
| 27 | mutated sequence of nucleotides 325-360 of the Par allele (3 bp deletion) |
| 28 | encoded amino acid sequence of SEQ ID NO: 24 |
| 29 | encoded amino acid sequence of SEQ ID NO: 25 |
| 30 | encoded amino acid sequence of SEQ ID NO: 26 |
| 31 | encoded amino acid sequence of SEQ ID NO: 27 |
| 32 | encoded amino acid sequence of SEQ ID NO: 23 |
| 33 | *Lactuca sativa* LSAT_8X112340 coding sequence |
| 34 | LsPromoter_LsCoding sequence_To3'UTR |
| 35 | LsPromoter-without-MYB-sites_LsCoding sequence_To3'UTR |
| 36 | LsPromoter-with-MITE-insert_LsCoding sequence_To3'UTR |
| 37 | CXXCXXXXXXX[K/R]AXXGHX[R/N]XH K2-2 zinc finger domain |
| 38 | CXXCXXXXXXX[X]XXXGHXRXH zinc finger domain consensus sequence |
| 39 | *Cichorium endivia* PAR protein |
| 40 | *Hieracium praealtum* of aurantiacum PAR protein |
| 41 | *Senecio cambrensis* PAR protein |
| 42 | *Hevea brasiliensis* PAR protein |
| 43 | *Cucurbita moschata* PAR protein |
| 44 | *Eutrema salsugineum* PAR protein |
| 45 | *Arachis ipaensis* PAR protein |
| 46 | *Cajanus cajan* PAR protein |
| 47 | *Brassica_rapa* PAR protein |
| 48 | *Lagenaria siceraria* PAR protein |
| 49 | *Arachis ipaensis* PAR protein |
| 50 | *Prunus_persica* PAR protein |
| 51 | Glycine max PAR protein |
| 52 | Glycine max PAR protein |
| 53 | Glycine max PAR protein |
| 54 | Glycine max PAR protein |
| 55 | *Cicer arietinum*_fabales PAR protein |
| 56 | *Cicer arietinum* PAR protein |
| 57 | *Cicer arietinum* PAR protein |
| 58 | EAR motif |
| 59 | EAR motif |

TABLE 1-continued

Overview of SEQ ID NOs used herein.

| SEQ ID NO | Name |
|---|---|
| 60 | Tar-MITE insert |
| 61 | LsPromoter-with-deletion__LsCoding sequence__To3'UTR |
| 62 | *Arabidopsis thaliana* DUO1 |
| 63 | LsPromoter__ToCoding sequence__To3'UTR |
| 64 | LsPromoter-with-MITE-insert__ToCoding sequence__To3'UTR |
| 65 | ToPromoter__LsCoding sequence__To3'UTR |

LEGENDS TO THE FIGURES

FIGS. 1A-1G. Complementation and transformation experiments in the *Taraxacum* CRISPR/Cas9 Loss of Parthenogenesis mutant and sexual lettuce. FIG. 1A) Different promoter-gene constructs used for complementation of the *Taraxacum* LOP mutant and the number of successfully complemented lines. Shown are the ToPar promoter and the sexual homolog from lettuce (Lspar) and the *Arabidopsis* egg cell (EC1.1) promoter with the *Taraxacum* Par gene. FIG. 1B) Similar for transformation of lettuce with the *Taraxacum* ToPar gene driven by *Arabidopsis* egg cell EC1.1 promoter). FIG. 1C), FIG. 1D), FIG. 1E), Embryo-like structures in decapitated inflorescences of lettuce transformed with a pEC1.1::Par construct. FIG. 1C) Embryo sac from control non-transformed lettuce 75h after decapitation. Unfertilized egg cell (ec) and central cell (cc) nuclei are visible. FIG. 1D) Embryo sac with developing embryo-like structures 75h after decapitation. FIG. 1E) Embryo sac with multiple embryo-like structures. Asterisks show individual embryo-like structures. FIG. 1F) Flow cytometry analysis of embryo sacs from control non-transformed lettuce five days after self-pollination. FIG. 1G), Flow cytometry analysis of embryo sacs from transgenic lettuce carrying pEC1.1::Par construct five days after decapitation.

FIG. 2. Polymorphisms in the *Taraxacum* Parlpar promoters. ClustalW alignment of the region 350 bp upstream of the ATG start codon (underlined) of the Par allele and three sexual alleles: par-1 and par-2 of *Taraxacum officinale* (Topar) and of the sexual allele of the rubber dandelion *Taraxacum koksaghyz* (Tkpar). The 1335 bp MITE insertion has been removed from the ToPar promoter. The 6 bp direct repeat, which is the insertion site of the MITE, is underlined. Of the 13 SNPs, three are between the PAR promoter the sexual promoters (in bold and underlined); ten occur between the sexual promoters.

EXAMPLES

Example 1

Induction of Parthenogenesis by the Par Promoter

To test if the *Taraxacum* Par promoter plays a role in the genetic control of parthenogenesis, we tested whether it could be combined with a Par coding sequence homologue from a sexual species to induce parthenogenesis. The *Taraxacum* Par promoter was used to drive the expression of a homologous gene (Lspar) from lettuce, a related Asteraceae species and an important vegetable crop plant. This construct was transformed into a self-incompatible, tetraploid *Taraxacum* CRISPR/Cas9 Loss of Parthenogenesis (LOP) mutant that was derived from a cross between the 3×PAR CRISPR mutant derived from the A68 line, with pollen from diploid plant FCH72, and that cannot produce viable seeds. As the Par allele is dominant, testing was performed on the primary transformed plants (TO). Remarkably the Par.:Lspar construct led to seed formation and tetraploid (due to presence of the dominant Diplospory gene) offspring in four independent transformants (Table 2). This demonstrates that the *Taraxacum* Par promoter can invoke a lettuce gene to induce parthenogenesis. No genetic polymorphisms specific to the ToPar coding sequence (when compared to the sexual alleles par1 and par2) were found in the lettuce gene, ruling out coding sequence polymorphisms as being causal for parthenogenesis. Moving upstream from the Par ATG start site, the MITE insertion represents the first genetic polymorphism that is unique to the apomictic allele when compared to three sexual alleles from dandelion (par1, par2 and par$^{TKS}$; FIG. 2). Only 13 SNPs are found between the four *Taraxacum* promoters in the 350 bp upstream of the ATG (when the MITE is excised from the PAR allele) of which only three are Par-allele specific. Taken together this provides strong evidence that the functional difference between the dandelion alleles of the Par gene is caused by the promoter and not by the coding sequence. As previously demonstrated, a different construct, where the Par gene is expressed under the egg cell specific *Arabidopsis* EC1 (pEC1::Par) promoter, can also lead to complementation of the CRISPR/Cas9 LOP mutant, consistent with the hypothesis that egg cell expression of PAR can cause parthenogenesis (see Example 2 of PCT/EP2020/064991 and Table 3).

This experiment proves that the *Taraxacum* Par promoter driving expression of a sexual lettuce gene rescues the parthenogenetic phenotype in a loss-of-parthenogenesis *Taraxacum* plant. In other words, the *Taraxacum* Par promoter driving expression of a sexual lettuce gene is capable of inducing parthenogenesis.

TABLE 2

Apomixis complementation of the *T. officinale*
4x CRISPR/Cas9 PAR deletion mutant with the ToPar
promoter fused with the lettuce Lspar gene.
Primary transformants were grown in the greenhouse, seeds collected
and germination tests of up to three seed-heads (SH; 30 seeds per
seed-head) performed. All progeny plants tested contained the PCR
marker for the dominant DIP gene indicating recombination and
reduction did not occur in female meiosis. Ploidy level of progenies
was measured by flow cytometry (FCM). Seedlings produced by
parthenogenesis are tetraploid; hexaploid (6x) seedlings result
from self-fertilization (a tetraploid diplosporous egg cell
fertilized by a reduced diploid pollen grain). Four of the eight
lines produced parthenogenetic tetraploid offspring. Although
*T. officinale* is self-incompatible it is known that the SI
system can be leaky (Morita et al. 1990; and Tas and Van Dijk,
1999). Occasionally hexaploid progeny were observed from a control
plant transformed with a 35S::GUS construct, indicating that self-
fertilization can (rarely) occur in this genetic background. This
can explain the single hexaploid offspring of the non-
complementing line yellow 12b.

| plant | SH1 | SH2 | SH3 | # Seedlings | FCM analyzed | 4x | 6x | DIP positive |
|---|---|---|---|---|---|---|---|---|
| 1 | − | − | − | 0 (90) | | | | |
| 2 | − | + | − | 0 (90) | | | | |
| 3 | − | + | | 7 (60) | 3 | 3 | | 3 |
| 4 | + | + | + | 15 (90) | 9 | 9 | | 9 |
| 5 | − | − | + | 6 (90) | 1 | | 1 | 1 |
| 6 | + | + | + | 12 (90) | 4 | 4 | | 4 |
| 7 | + | + | | 15 (60) | 8 | 8 | | 8 |
| 8 | − | − | − | 0 (90) | | | | |
| Total | | | | 55 (660) (8.3%) | 25 | 24 | 1 | 25 |

TABLE 3

Apomixis complementation of the *T. officinale* 4x
CRISPR/Cas9 PAR deletion mutant by the ToPAR gene under
the Arabidopsis EC1.1 promoter. See Table 2 for an explanation.
Among the plants transformed with the complementation construct
one plant produced four 6x seedlings due to selfing.

| plant | SH1 | SH2 | SH3 | # Seedlings | FCM analyzed | 4x | 6x | DIP positive |
|---|---|---|---|---|---|---|---|---|
| 1 | + | − | − | 4 (90) | 4 | 4 | | 4 |
| 5 | + | − | − | 7 (90) | | | | |
| 3 | + | | | 3 (30) | 2 | 2 | | 2 |
| 4 | − | − | − | 0 (90) | | | | |
| 5 | + | + | + | 11 (90) | 4 | | 4 | 4 |
| 6 | + | − | − | 5 (90) | 3 | 3 | | 3 |
| 7 | + | | | 5 (30) | 3 | 3 | | 3 |
| 8 | − | − | − | 0 (90) | | | | |
| 9 | + | | | 10 (30) | 3 | 3 | | 3 |
| Total | | | | 45 (630) (7.1%) | 19 | 15 | 4 | 19 |

Example 2

Plant Material

For this experiment, wild type lettuce: Iceberg type, Legacy, Takii Japan and Red Romaine type, Baker Creek Heirloom Seeds was used.

Dna Construct

A binary vector is constructed with a T-DNA region comprising the construct represented by SEQ ID NO: 34 consisting of the following consecutive elements: a LSAT_8X112340 promoter of *Lactuca sativa* (SEQ ID NO: 16) driving expression of the LSAT_8X112340 CDS sequence of *Lactuca sativa* (SEQ ID NO: 33), followed by the first 1000 bases of 3' UTR of the Par allele gene of *Taraxacum officinale* (the first 1000 bases of SEQ ID NO: 4), followed by a 35S terminator and a neomycin phosphotransferase gene (nptII) for selection. Suitable technologies to generate such a binary vector are Gateway®, Golden Gate or Gibson Assembly® (for an example, see Ma et al., 2015). Transgenic lines harbouring this T-DNA are numbered with the code pKG20001.

A second binary vector is constructed with a T-DNA region comprising the construct represented by SEQ ID NO: 35 consisting of the following consecutive elements: a LSAT_8X112340 promoter of *Lactuca sativa* amended to remove two MYB binding sites having the sequences AACCGCCA and AACCGTC (SEQ ID NO: 17) driving expression of the LSAT_8X112340 CDS sequence of *Lactuca sativa* (SEQ ID NO: 33), followed by the first 1000 bases of 3' UTR of the Par allele gene of *Taraxacum officinale* (the first 1000 bases of SEQ ID NO: 4), followed by a 35S terminator and a neomycin phosphotransferase gene (nptII) for selection. Suitable technologies to generate such a binary vector are Gateway®, Golden Gate or Gibson Assembly® (for an example, see Ma et al., 2015). Transgenic lines harbouring this T-DNA are numbered with the code pKG20002.

A third binary vector is constructed with a T-DNA region comprising the construct represented by SEQ ID NO: 36 that consists of the following consecutive elements: a LSAT_8X112340 promoter of *Lactuca sativa* with an insertion of the Par allele gene of *Taraxacum officinale* MITE promoter element (SEQ ID NO: 18) driving expression of the LSAT_8X112340 CDS sequence of *Lactuca sativa* (SEQ ID NO: 33) followed by the first 1000 bases of 3' UTR of the Par allele gene of *Taraxacum officinale* (the first 1000 bases of SEQ ID NO: 4), followed by a 35S terminator and a neomycin phosphotransferase gene (nptII) for selection. Suitable technologies to generate such a binary vector are Gateway®, Golden Gate or Gibson Assembly® (for an example, see Ma et al., 2015). Transgenic lines harbouring this T-DNA are numbered with the code pKG20003.

A fourth binary vector is constructed with a T-DNA region comprising the construct represented by SEQ ID NO: 61 that consists of the following consecutive elements: a LSAT_8X112340 promoter of *Lactuca sativa* with a deletion upstream of the two MYB binding sites (SEQ ID NO: 20) driving expression of the LSAT_8X112340 CDS sequence of *Lactuca sativa* (SEQ ID NO: 33) followed by the first 1000 bases of 3' UTR of the Par allele gene of *Taraxacum officinale* (the first 1000 bases of SEQ ID NO: 4), followed by a 35S terminator and a neomycin phosphotransferase gene (nptII) for selection. Suitable technologies to generate such a binary vector are Gateway®, Golden Gate or Gibson Assembly® (for an example, see Ma et al., 2015). Transgenic lines harbouring this T-DNA are numbered with the code pKG20003.

Plant Transformation Method

*Agrobacterium* transformation is performed by genotype-independent transformation of lettuce using *Agrobacterium tumefaciens*. Such methods are well-known in the art and e.g. taught in Curtis et al. (1994). Any other method suitable for genetic transformation of lettuce may be used to produce plants harbouring the desired T-DNA, such as described in Michelmore et al. (1987) or Chupeau et al. (1989).

Results

Plants that are positively tested for presence of the transgene as described under section "DNA construct" above, are evaluated for occurrence of parthenogenesis. As the trait is dominant, testing is performed on the primary transformed plants (TO). In the absence of cross or self-fertilization, parthenogenetic egg cells develop into embryos. In order to prevent any fertilization of the plants harboring the transgene, plants are grown in a greenhouse and prior to microscopic observation, all flowers are manually emasculated. Emasculation is performed by clipping the involucre before the corolla has grown. Parthenogenesis is detected in non-apomictic plants microscopically by Nomarski Differential Interference Microscopy (DIC) of cleared ovules. Here, the clearing method using chloral hydrate is applied; a method commonly used to clear ovules of plants for microscopic imaging (see e.g. Franks R G, 2016). At 75 hours post emasculation, flower buds are harvested and ovules are cleared with chloral hydrate. In transgenic lines of pKG20002 and pKG20003 multiple embryos may be observed in these cleared ovules. Flow cytometry on pools of embryo sacs can show that these embryos are haploid. In non-transformed control plants and in evaluated transgenic lines of pKG20001, which are emasculated and imaged in the same way, no embryos were observed at all.

These results will demonstrate that either inserting the MITE promoter element from the Par allele gene of *Taraxacum officinale* or removing MYB binding sites from the LSAT_8X112340 promoter of *Lactuca sativa* is sufficient to modify the expression as such that the LSAT_8X112340 gene can induce haploid embryo formation in lettuce.

Example 3

Plant Material

For this experiment, wild type lettuce: Red Romaine type, Baker Creek Heirloom Seeds was used.

DNA Construct

A binary vector was constructed with a T-DNA region comprising the construct represented by SEQ ID NO: 63 consisting of the following consecutive elements: a LSAT_8X112340 promoter of *Lactuca sativa* (SEQ ID NO: 16) driving expression of the Par CDS sequence of *Taraxacum officinale* (SEQ ID NO: 3), followed by the first 1000 bases of 3' UTR of the Par allele gene of *Taraxacum officinale* (the first 1000 bases of SEQ ID NO: 4), followed by a 35S terminator and a neomycin phosphotransferase gene (nptII) for selection. Suitable technologies to generate such a binary vector are Gateway®, Golden Gate or Gibson Assembly® (for an example, see Ma et al., 2015). Transgenic lines harbouring this T-DNA are numbered with the code pKG20004.

A second binary vector was constructed with a T-DNA region comprising the construct represented by SEQ ID NO: 64 consisting of the following consecutive elements: a LSAT_8X112340 promoter of *Lactuca sativa* with an insertion of the Par allele gene of *Taraxacum officinale* MITE promoter element (SEQ ID NO: 18) driving expression of the Par CDS sequence of *Taraxacum officinale* (SEQ ID NO: 3) followed by the first 1000 bases of 3' UTR of the Par allele gene of *Taraxacum officinale* (the first 1000 bases of SEQ ID NO: 4), followed by a 35S terminator and a neomycin phosphotransferase gene (nptII) for selection. Suitable technologies to generate such a binary vector are Gateway®, Golden Gate or Gibson Assembly® (for an example, see Ma et al., 2015). Transgenic lines harbouring this T-DNA are numbered with the code pKG20006.

A third vector was constructed with a T-DNA region comprising the construct represented by SEQ ID NO: 65 consisting of the following consecutive elements: a Par allele promoter of *Taraxacum officinale* (SEQ ID NO: 2) driving expression of the LSAT_8X112340 CDS sequence of *Lactuca sativa* (SEQ ID NO: 33), followed by the first 1000 bases of 3' UTR of the Par allele gene of *Taraxacum officinale* (the first 1000 bases of SEQ ID NO: 4), followed by a 35S terminator and a neomycin phosphotransferase gene (nptII) for selection. Suitable technologies to generate such a binary vector are Gateway®, Golden Gate or Gibson Assembly® (for an example, see Ma et al., 2015). Transgenic lines harbouring this T-DNA are numbered with the code pKG20008.

Plant Transformation Method

*Agrobacterium* transformation is performed by genotype-independent transformation of lettuce using *Agrobacterium tumefaciens*. Such methods are well-known in the art and e.g. taught in Curtis et al. (1994). Any other method suitable for genetic transformation of lettuce may be used to produce plants harbouring the desired T-DNA, such as described in Michelmore et al. (1987) or Chupeau et al. (1989).

Results

Plants that positively tested for presence of the transgene as described under section "DNA construct" above, were evaluated for occurrence of parthenogenesis. As the trait is dominant, testing was performed on the primary transformed plants (T0). In the absence of cross or self-fertilization, parthenogenetic egg cells develop into embryos. In order to prevent any fertilization of the plants harboring the transgene, plants were grown in a greenhouse and prior to microscopic observation, all flowers were manually emasculated. Emasculation was performed by clipping the involucre before the corolla has grown. Parthenogenesis was detected in non-apomictic plants microscopically by Nomarski Differential Interference Microscopy (DIC) of cleared ovules. Here, the clearing method using chloral hydrate was applied; a method commonly used to clear ovules of plants for microscopic imaging (see e.g. Franks R G. 2016). At 75 hours post emasculation, flower buds were harvested and ovules are cleared with chloral hydrate. In transgenic lines of pKG20005, pKG20006, pKG20007 and pKG20008 multiple embryos were observed in these cleared ovules (see table 3). Flow cytometry on pools of embryo sacs can show that these embryos are haploid. In standard GUS construct transformed control plants and in evaluated transgenic lines of pKG20004, which were emasculated and imaged in the same way, no embryos were observed at all.

These results demonstrated that a MITE promoter element from the Par allele gene of *Taraxacum officinale* is sufficient to modify the expression, such that the LSAT_8X112340 gene can induce haploid embryo formation in lettuce. This is a clear example of inducing parthenogenesis in lettuce by promoter modifications of the lettuce LSAT_8X112340 gene as in the absence of cross or self-fertilization, egg cells developed into embryos.

TABLE 3 embryo observations in flower buds at 75 hours post emasculation of lettuce transgenic lines. The indication "yes" means that in all buds there is at least one embryo.

| | Phenotyping | |
|---|---|---|
| Construct - Plant ID | number of buds checked | embryos found in all buds |
| GUS construct control 1 | 9 | no |
| GUS construct control 2 | 4 | no |
| GUS construct control 3 | 11 | no |
| GUS construct control 4 | 8 | no |
| GUS construct control 5 | 6 | no |
| GUS construct control 6 | 7 | no |
| GUS construct control 7 | 7 | no |

TABLE 3-continued embryo observations in flower buds at 75 hours post emasculation of lettuce transgenic lines. The indication "yes" means that in all buds there is at least one embryo.

| Construct - Plant ID | Phenotyping | |
|---|---|---|
| | number of buds checked | embryos found in all buds |
| pKG20004 -1 | 6 | no |
| pKG20004 -2 | 11 | no |
| pKG20004 -3 | 9 | no |
| pKG20004 -4 | 14 | no |
| pKG20004 -5 | 6 | no |
| pKG20004 -6 | 7 | no |
| pKG20004 -7 | 8 | no |
| pKG20004 -8 | 8 | no |
| pKG20004 -9 | 4 | no |
| pKG20006 -1 | 4 | yes |
| pKG20006 -2 | 18 | yes |
| pKG20006 -3 | 14 | yes |
| pKG20008 -1 | 16 | yes |
| pKG20008 -2 | 9 | no |
| pKG20008 -3 | 8 | yes |
| pKG20008 -4 | 8 | no |
| pKG20008 -5 | 7 | no |

REFERENCES

An et al. (1996) Plant J. 10, 107
Asker, S. (1979) Progress in apomixis research. Hereditas 91 (2): 231-240.
Asker, S. E. and Jerling, L. (1990) Apomixis in Plants. CRC Press, Boca Raton.
Ausubel et al. (1994) Current Protocols in Molecular Biology, Volumes 1 and 2, Current Protocols, USA
Barrell and Grossniklaus (2005) Confocal microscopy of whole ovules for analysis of reproductive development: the elongate1 mutant affects meiosis II. Plant Journal 34:309-320.
Bicknell and Koltunow 2004 Understanding apomixis: recent advances and remaining conundrums. The Plant Cell 16: S228-S245.
Borevitz, J. O., Liang, D., Plouffe, D., Chang, H.-S., Zhu, T., Weigel, D., Berry, C. C., Winzeler, E. and Chory, J. (2003) Large-scale identification of single-feature polymorphisms in *Arabidopsis*. Genome Res. 13:513-523.
Bortesi, L. and Fischer, R. (2015) The CRISPR/Cas9 system for plant genome editing and beyond. Biotechnology Advanced 33 (1): 41-52.
Borg et al. (2011) The R2R3 MYB Transcription Factor DUO1 Activates a Male Germline-Specific Regulon Essential for Sperm Cell Differentiation in *Arabidopsis*. The Plant Cell 23 (2): 534-549
Chupeau et al. (1989) Transgenic plants of lettuce (*Lactuca sativa*) obtained through electroporation of protoplasts. Bio/Technology 7, 503-508.
Crismani W. et al. (2013) J. Exp. Bot. 64:55-65.
Curtis I S et al. (1994) J. Exp. Bot. 45.10:1441-1449.
Daniell, H. (2002) Molecular strategies for gene containment in transgenic crops. Nature biotechnology 20:581-586.
Depicker A. and Van Montagu M. (1997) Post-transcriptional gene silencing in plants. Current Opinion in Cell Biology 9:373-382.
Depicker et al. (1982) J. Mol. Appl. Genetics 1, 561-573.
Englbrecht et al. (2004) BMC Genomics, 5 (1): 39
Franks R G (2016) Methods Mol Biol. 2016; 1457:1-7
Gielen et al. (1984) EMBO J 3, 835-845.
Guo et al, Scientific reports. 2017 Jun. 1; 7(1):2634.
Gould et al. (1991) Plant Physiol. 95, 426-434.
Grimanelli D. (2012) Curr. Opin. Plant Biol. 15:57-62.
Hashimshony, T., Senderovich, N., Avital, G. et al. CEL-Seq2: sensitive highly-multiplexed single-cell RNA-Seq. Genome Biol 17, 77 (2016).
Hashimshony T, Wagner F, Sher N, Yanai I. CEL-Seq: single-cell RNA-Seq by multiplexed linear amplification. Cell Rep. 2012; 2 (3): 666-673.
Henikoff and Henikoff (1992) PNAS 89, 915-919.
Hermsen, J. G. Th. (1980) Breeding for apomixis in potato: Pursuing a utopian scheme. Euphytica 29:595-607.
Holmes, M (2018) Historical Studies in the Natural Sciences, 48 (1).pp. 1-23.ISSN 1939-1811
Hull and Howell (1987) Virology 86, 482-493.
Kagale et al., (2010) Plant Physiology, 152:1009-1134.
Liu et al. (1995) Genomics 25 (3): 674-81.
Liu et al. (2005) Methods Mol. Biol. 286:341-8.
Lutz K A et al. (2004) Plant J. 37 (6): 906-13.
Ma, Xingliang, et al. "A robust CRISPR/Cas9 system for convenient, high-efficiency multiplex genome editing in monocot and dicot plants." Molecular plant 8.8 (2015): 1274-1284.
McPherson at al. (2000) PCR-Basics: From Background to Bench, First Edition, Springer Verlag, Germany.
Michelmore, R. W., Marsh, E., Seely, S. and Landry, B. (1987) Transformation of lettuce (*Lactuca sativa*) mediated by *Agrobacterium tumefaciens*. Plant Cell Rep. 6:439-442.
Michelmore, R. W., Paran, I. and Kesseli, R. V. (1991) Identification of markers linked to disease resistance genes by bulked segregant analysis: a rapid method to detect markers in specific genomic regions using segregating populations. Proc. Natl. Acad. Sci. 88:9828-9832.
Morgan, R., Ozias-Akins, P., and Hanna, W. W. (1998) Seed set in an apomictic BC3 pearl millet. Int. J. Plant Sci. 159, 89-97.
Morita, T. Menken, S. G. J. and Sterk, A. A. (1990) Hybridization between European and Asian dandelions (*Taraxacum* section Ruderalia and section *Mongolica*): 1. Crossability and breakdown of self-incompatibility. New Phytol. 114, 519-529.
Ozias-Akins, P. and P. J. van Dijk. (2007) Mendelian genetics of apomixis in plants. Annu. Rev. Genet. 41:509-537.
Park et al. (1997) J.Biol. Chem. 272, 6876-6881.
Plant Molecular Biology Labfax (1993) by R. D. D. Croy, jointly published by BIOS Scientific Publications Ltd (UK) and Blackwell Scientific Publications, UK.
Sambrook and Russell (2001) Molecular Cloning: A Laboratory Manual, Third Edition, Cold Spring Harbor Laboratory Press, NY.
Sambrook et al. (1989) Molecular Cloning: A Laboratory Manual, Second Edition, Cold Spring Harbor Laboratory Press.
Savidan Y. (2001) Transfer of apomixis through wide crosses. In: Savidan Y, Carman J, Dresselhaus T, editors. The flowering of apomixis: From mechanisms to genetic engineering. Mexico: CIMMYT, IRD; pp. 153-167.
Sidorov V A et al. (1999) Plant J. 19:209-216.
Smith T F, Waterman M S (1981) J. Mol. Biol 147 (1); 195-7.
Tas I. C. Q. and Van Dijk, P. J. (1999) Heredity (Edinb). 83, 707-714
Vaeck et al. (1987) Nature 328, 33-37.
Van Baarlen, De Jong, J. H., and Van Dijk, P. J. (2002) Comparative cyto-embryological investigations of sexual and apomictic dandelions (*Taraxacum*) and their apomictic hybrids. Sex Plant Reprod 15:31-38.

Van Dijk, P. J., Rigola, D. and Schauer, S. E. "Plant breeding: surprisingly, less sex is better." Current Biology 26.3 (2016): R122-R124.

Velten and Schell (1985) Nucleic Acids Research 13, 6981-6998.

Vielle-Calzada, J-Ph., B. L. Burson, E. C Bashaw, and M. A. Hussey 1995. Early fertilization events in the sexual an aposporous egg apparatus of *Pennisetum ciliare* (L.) Link, The Plant Journal 8 (2): 309-316.

Yang, J. et al. (2018) PlantEAR: Functional Analysis Platform for Plant EAR Motif-Containing Proteins. Front. Genet.

The invention claimed is:

1. A method of producing a mutant gene capable of inducing a parthenogenesis phenotype, the method comprising:
   (a) providing a gene comprising a sequence encoding a PAR protein of SEQ ID NO: 1, 6 or 11, or any orthologue thereof, operably linked to a promoter comprising one or more transcription factor MYB binding sites, wherein the PAR protein is characterized in that it comprises a zinc finger C2H2-type domain having the consensus amino acid sequence of SEQ ID NO: 37 and an EAR motif having the consensus amino acid sequence of SEQ ID NO: 58 or 59; and
   (b) modifying the promoter by modifying the sequence upstream of the one or more MYB binding sites to increase transcription of the encoded PAR protein, wherein the modifying comprises at least one of:
   inserting a sequence of between 50 and 2000 base pairs; and
   deleting a sequence of between 10 and 1000 base pairs, and wherein said insertion and/or deletion is at most 200 base pairs upstream of the MYB binding site of the one or more MYB binding site located most upstream from the coding sequence.

2. The method according to claim 1, wherein the modifying comprises introducing the insert or deletion into the promoter directly upstream of the one or more MYB binding sites.

3. The method according to claim 1, wherein the promoter is modified by random or targeted mutagenesis.

4. The method according to claim 1, wherein the gene is comprised within a plant cell.

5. The method according to claim 4, wherein the plant cell is a plant protoplast.

6. The method according to claim 4, wherein the mutant gene induces or increases parthenogenesis in the plant cell.

7. The method according to claim 1, wherein the gene is an endogenous gene.

8. The method according to claim 1, wherein the gene is a transgene that is optionally a native or a chimeric gene.

9. A mutant gene capable of inducing the parthenogenesis phenotype comprising a sequence encoding a PAR protein of SEQ ID NO: 1, 6 or 11, or any orthologue thereof, wherein the mutant gene comprises a modification as defined in claim 1.

10. A nucleic acid molecule, construct or vector comprising the mutant gene of claim 9.

11. A plant cell comprising the mutant gene of claim 9.

12. The plant cell according to claim 11, which is a plant protoplast.

13. A plant comprising the mutant gene of claim 7, wherein the plant is a parthenogenetic plant.

14. A plant obtainable by producing a mutant gene as defined in claim 1.

15. The plant according to claim 14, wherein the plant is capable of apomeiosis.

16. The plant according to claim 15, which is apomictic.

17. A method for producing a parthenogenetic plant, comprising:
   (a) regenerating and/or growing a plant tissue or a plant from the plant cell of claim 11; and optionally,
   (b) screening and/or genotyping the plant tissue or plant obtained in (a).

18. The method according to claim 17, wherein the mutant gene of (a) is comprised in a plant cell capable of apomeiosis.

19. The method according to claim 18, wherein the plant cell is a plant protoplast.

20. A method for producing an apomictic F1 hybrid seed, comprising:
   (i) cross-fertilizing a sexually reproducing first plant with the pollen of a second plant to produce F1 hybrid seeds, wherein the second plant comprises the mutant gene of claim 7, and wherein the first and/or second plant is capable of apomeiosis; and optionally
   (ii) selecting from the F1 hybrid seed, seeds that comprise the apomictic phenotype.

* * * * *